US012052349B2

(12) United States Patent
Badrinarayanan et al.

(10) Patent No.: US 12,052,349 B2
(45) Date of Patent: Jul. 30, 2024

(54) ROUND-EFFICIENT FULLY SECURE SOLITARY MULTI-PARTY COMPUTATION WITH HONEST MAJORITY

(71) Applicant: VISA INTERNATIONAL SERVICE ASSOCIATION, San Francisco, CA (US)

(72) Inventors: Saikrishna Badrinarayanan, Fremont, CA (US); Pratyay Mukherjee, Sunnyvale, CA (US); Divya Ravi, Mountain View, CA (US); Peihan Miao, Chicago, IL (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/453,945

(22) Filed: Aug. 22, 2023

(65) Prior Publication Data
US 2023/0396420 A1    Dec. 7, 2023

Related U.S. Application Data

(63) Continuation of application No. 17/330,234, filed on May 25, 2021, now Pat. No. 11,784,803.
(Continued)

(51) Int. Cl.
*H04L 9/08*  (2006.01)
*H04L 9/30*  (2006.01)
*H04L 9/32*  (2006.01)

(52) U.S. Cl.
CPC ............ *H04L 9/085* (2013.01); *H04L 9/0833* (2013.01); *H04L 9/30* (2013.01); *H04L 9/3247* (2013.01)

(58) Field of Classification Search
None
See application file for complete search history.

(56) References Cited

U.S. PATENT DOCUMENTS 7,937,270 B2 *  5/2011  Smaragdis ............. H04L 9/008
                                                  704/256
9,158,925 B2 * 10/2015  Kamara .................. G06F 21/60
(Continued)

OTHER PUBLICATIONS

U.S. Appl. No. 17/330,234, "Corrected Notice of Allowability", Aug. 11, 2023, 4 pages.
(Continued)

*Primary Examiner* — Bradley W Holder
(74) *Attorney, Agent, or Firm* — Kilpatrick Townsend & Stockton LLP

(57) ABSTRACT

Several round-efficient solitary multi-party computation protocols with guaranteed output delivery are disclosed. A plurality of input devices and an output device can collectively perform a computation using methods such as fully homomorphic encryption. The output of the computation is only known to the output device. Some number of these devices may be corrupt. However, even in the presence of corrupt devices, the output device can still either generate a correct output or identify that the computation was compromised. These protocols operate under different assumptions regarding the communication infrastructure (e.g., broadcast vs point-to-point), the number of participating devices, and the number of corrupt devices. These protocols are round-efficient in that they require a minimal number of communication rounds to calculate the result of the multi-party computation.

20 Claims, 15 Drawing Sheets

Related U.S. Application Data

(60) Provisional application No. 63/088,336, filed on Oct. 6, 2020, provisional application No. 63/030,133, filed on May 26, 2020.

(56) References Cited

U.S. PATENT DOCUMENTS

| | | |
|---|---|---|
| 9,467,451 B1 | 10/2016 | Baron et al. |
| 9,577,829 B1 * | 2/2017 | Roth ................. G06F 21/60 |
| 10,554,384 B2 | 2/2020 | Bhagwan et al. |
| 2011/0040820 A1 * | 2/2011 | Rane ................. G06F 7/5057 |
| | | 708/441 |

OTHER PUBLICATIONS

U.S. Appl. No. 17/330,234, Notice of Allowance, Mailed on May 26, 2023, 21 pages.

Gordon et al., "Constant-Round MPC with Fairness and Guarantee of Output Delivery", Annual Cryptology Conference, Available online At: https://link.springer.com/chapter/10.1007/978-3-662-48000-7_4, 2015, 26 pages.

* cited by examiner

CRS: Let crs ← NIZK.Setup($1^\lambda$) be the common reference string.
PKI Setup:
302
- For each $i \in [n]$, generate $(pk_i, sk_i)$ ← dTFHE.DistGen($1^\lambda, 1^d, i; r_i$), $(vkey_i, skey_i)$ ← Gen($1^\lambda$).
- Public keys: $pk = (pk_1 \| \cdots \| pk_n)$ and $\{vkey_i\}_{i\in[n]}$.
- Secret keys: $(sk_i, r_i, skey_i)$ for party $P_i$.

Inputs: For each $i \in [n-1]$, party $P_i$ has an input $x_i \in \{0,1\}^\lambda$.
Protocol:
- Round 1: For each $i \in [n-1]$, party $P_i$ does the following:
304    1. Compute $[\![x_i]\!]$ ← dTFHE.Enc($pk, x_i; \rho_i$).
306    2. Compute $\pi_i$ ← NIZK.Prove(crs, $st_i$, $wit_i$) for $st_i \in L_1$ where $st_i = ([\![x_i]\!], pk)$ and $wit_i = (x_i, \rho_i)$.
308    3. Compute $\sigma_i$ ← Sign($skey_i, ([\![x_i]\!], \pi_i)$).
310    4. Send $([\![x_i]\!], \pi_i, \sigma_i)$ to every party $P_j$ where $j \in [n-1]\setminus\{i\}$.
- Round 2: For each $i \in [n-1]$, party $P_i$ does the following:
312    1. For each $j \in [n-1]\setminus\{i\}$, verify the following:
  - $P_i$ received $([\![x_j]\!], \pi_j, \sigma_j)$ from party $P_j$ in Round 1.
  - NIZK.Verify(crs, $\pi_j$, $st_j$) = 1.
  - Verify($vkey_j, ([\![x_j]\!], \pi_j), \sigma_j$) = 1.
314    2. If any of the above isn't true, then send $x_i$ to $Q$. Otherwise,
316      (a) Compute $[\![y]\!]$ ← dTFHE.Eval($pk, f, [\![x_1]\!], \ldots, [\![x_{n-1}]\!]$).
318      (b) Compute $[\![y{:}sk_i]\!]$ ← dTFHE.PartialDec($sk_i, [\![y]\!]$).
320      (c) Compute $\pi_i^{dec}$ ← NIZK.Prove(crs, $st_i^{dec}$, $wit_i^{dec}$) for $st_i^{dec} \in L_2$ where $st_i^{dec} = ([\![y{:}sk_i]\!], [\![y]\!], pk_i, i)$ and $wit_i^{dec} = (sk_i, r_i)$.
322      (d) Send $\left(\{([\![x_j]\!], \pi_j, \sigma_j)\}_{j\in[n-1]}, [\![y]\!], [\![y{:}sk_i]\!], \pi_i^{dec}\right)$ to $Q$.
- Output Computation: $Q$ does the following:
324    1. For each $i \in [n-1]$, verify the following:
  - $Q$ received $\left(\{([\![x_j]\!], \pi_j, \sigma_j)\}_{j\in[n-1]}, [\![y]\!], [\![y{:}sk_i]\!], \pi_i^{dec}\right)$ from party $P_i$ in Round 2.
  - NIZK.Verify(crs, $\pi_j$, $st_j$) = 1 and Verify($vkey_j, ([\![x_j]\!], \pi_j), \sigma_j$) = 1 for all $j \in [n-1]$.
  - $[\![y]\!]$ = dTFHE.Eval($pk, f, [\![x_1]\!], \ldots, [\![x_{n-1}]\!]$).
  - NIZK.Verify(crs, $\pi_i^{dec}$, $st_i^{dec}$) = 1.
    2. If the above is true for any $i \in [n-1]$ (if it holds for multiple parties, pick the smallest $i$), then
       (a) Let $\left(\{([\![x_j]\!], \pi_j, \sigma_j)\}_{j\in[n-1]}, [\![y]\!], [\![y{:}sk_i]\!], \pi_i^{dec}\right)$ be the message $Q$ received from $P_i$ in Round 2.
326      (b) Compute $[\![y{:}sk_n]\!]$ ← dTFHE.PartialDec($sk_n, [\![y]\!]$).
328      (c) Compute $y$ ← dTFHE.Combine($pk, \{[\![y{:}sk_i]\!], [\![y{:}sk_n]\!]\}$) and output $y$.
    3. Otherwise, $Q$ must have received $x_i$ from $P_i$ for at least $n-2$ parties.
330      - If $Q$ received $x_i$ from $P_i$ for all $i \in [n-1]$, then output $f(x_1, \ldots, x_{n-1})$.
       - Otherwise, $Q$ did not receive the input from $P_j$, then output $f(x_1, \ldots, x_{j-1}, \bot, x_{j+1}, \ldots, x_{n-1})$.

*FIG. 4*

CRS: Send crs ← NIZK.Setup($1^\lambda$) to every party.
PKI Setup:

- For each $i \in [n]$: sample $(pk_i, sk_i) \leftarrow$ dTFHE.DistGen($1^\lambda, 1^d, i; r_i$) and $(vkey_i, skey_i) \leftarrow$ Gen($1^\lambda$).
- 702  Public key: $pk = pk_1 \| \cdots \| pk_n$ and $\{vkey_i\}_{i \in [n]}$.
- Secret keys: $(sk_i, r_i, skey_i)$ to party $P_i$ for each $i \in [n]$.

Inputs: For each $i \in [n]$, party $P_i$ has an input $x_i \in \{0,1\}^\lambda$.
Protocol:

1. Round 1: For each $i \in [n]$:
   - 704  $P_i$ computes $[\![x_i]\!] \leftarrow$ dTFHE.Enc($pk, x_i; \rho_i$) using randomness $\rho_i$, $\pi_i \leftarrow$
   - 706  NIZK.Prove(crs, $st_i$, $wit_i$) for $st_i \in L_1$ where $st_i = ([\![x_i]\!], pk)$ and $wit_i = (x_i, \rho_i)$.
   - 708
   - 710  Then, compute $\sigma_i \leftarrow$ Sign($skey_i$, ($[\![x_i]\!], \pi_i$)) and send ($[\![x_i]\!], \pi_i, \sigma_i$) to every party.
- 712  2. Round 2: For each $i \in [n]$, $P_i$ sends all the messages it received in Round 1 to party $P_n (= Q)$.
3. Round 3: Party $P_n (= Q)$ does the following:
   - 714  Define strings msg, $ct_1, \ldots, ct_n$ as $\bot$.
   - For each $i \in [n]$, let $\{([\![x_j]\!]^{i \to n}, \pi_j^{i \to n}, \sigma_j^{i \to n})\}_{j \in [n] \setminus \{i\}}$ denote the message received from $P_i$ in Round 2 and $([\![x_i]\!]^{i \to n}, \pi_i^{i \to n}, \sigma_i^{i \to n})$ denote the message received from $P_i$ in Round 1.
   - For each $j \in [n]$, do the following:
   - 716  − Let $\{([\![x_j]\!]^{1 \to n}, \pi_j^{1 \to n}, \sigma_j^{1 \to n}), \ldots, ([\![x_j]\!]^{n \to n}, \pi_j^{n \to n}, \sigma_j^{n \to n})\}$ be the messages received across both rounds on behalf of party $P_j$.
   - 718  − Pick the lowest $i_1$ such that Verify($vkey_j$, ($[\![x_j]\!]^{i_1 \to n}, \pi_j^{i_1 \to n}$), $\sigma_j^{i_1 \to n}$) = 1 and NIZK.Verify(crs, $\pi_j^{i_1 \to n}$, $st_j$) = 1 for $st_j \in L_1$ where $st_j = ([\![x_j]\!]^{i_1 \to n}, pk)$. Set $ct_j :=$
   - 720  $[\![x_j]\!]^{i_1 \to n}$ and msg := msg $\|$ "Party j" $\| ([\![x_j]\!]^{i_1 \to n}, \pi_j^{i_1 \to n}, \sigma_j^{i_1 \to n})$.
   - 722  − If no such $i_1$ exists, set msg = msg $\|$ "Party j" $\| \bot$.
   - 724 726  Compute $\sigma_{msg} \leftarrow$ Sign($skey_n$, msg). Send (msg, $\sigma_{msg}$) to all parties.
   - 728  Set $[\![y]\!]$ = dTFHE.Eval($pk, f, ct_1, \ldots, ct_n$).[7]
- 730  4. Round 4: For each $i \in [n-1]$, $P_i$ sends the message received from $Q$ in Round 3 to every party.
5. Round 5: For each $i \in [n-1]$, $P_i$ does the following:
   - Let $\{(msg^{j \to i}, \sigma_{msg}^{j \to i})\}_{j \in [n-1] \setminus \{i\}}$ be the messages received in Round 4 and $(msg^{n \to i}, \sigma_{msg}^{n \to i})$ be the message from $Q$ in Round 3.
   - 732  If Verify($vkey_n$, $msg^{n \to i}$, $\sigma_{msg}^{n \to i}$) $\neq 1$ (OR) $msg^{n \to i}$ is not of the form ("Party 1"$\|m_1\| \ldots \|$
   - 734  "Party n" $\| m_n$), send $\bot$ to $Q$ and end the round.
   - 736 738  Output $\bot$ to $Q$ and end the round if there exists $j \neq n$ such that:
     − $msg^{j \to i} \neq msg^{n \to i}$ (AND)
     − Verify($vkey_n$, $msg^{j \to i}$, $\sigma_{msg}^{j \to i}$) = 1 (AND)
     − $msg^{j \to i}$ is of the form ("Party 1" $\| m_1, \ldots, \|$ "Party n" $\| m_n$) This third check is to ensure that a corrupt $P_j$ doesn't re-use a valid signature sent by $Q$ in the first round as its message in Round 4.
   - Define strings $ct_1, \ldots, ct_n$.
   - Parse $msg^{n \to i}$ as ("Party 1" $\| m_1, \ldots, \|$ "Party n" $\| m_n$).

*FIG. 9*

- For each $j \in [n]$, do the following:
  - If in Round 1, $P_i$ received $(x_j, \pi_j, \sigma_j)$ from $P_j$ such that $\text{Verify}(\text{vkey}_j, (x_j, \pi_j), \sigma_j) = 1$ and 740 $\text{NIZK.Verify}(\pi_j, \text{st}_j) = 1$ for $\text{st}_j \in L_1$ where $\text{st}_j = (x_j, \text{pk})$, set $\text{bit}_j = 1$. Else, set $\text{bit}_j = 0$.
  - If $m_j = \perp$:
    * If $\text{bit}_j = 1$, send $\perp$ to $Q$ and end the round.
  742       * Else, set $\text{ct}_j = \perp$.
  - If $m_j = (\llbracket x_j \rrbracket^{i_1 \to n}, \pi_j^{i_1 \to n}, \sigma_j^{i_1 \to n})$:
    * If $\text{Verify}(\text{vkey}_j, (\llbracket x_j \rrbracket^{i_1 \to n}, \pi_j^{i_1 \to n}), \sigma_j^{i_1 \to n}) = 1$ and $\text{NIZK.Verify}(\text{crs}, \pi_j^{i_1 \to n}, \text{st}_j) = 1$
      for $\text{st}_j \in L_1$ where $\text{st}_j = (\llbracket x_j \rrbracket^{i_1 \to n}, \text{pk})$, set $\text{ct}_j = \llbracket x_j \rrbracket^{i_1 \to n}$
    * Else, send $\perp$ to $Q$ and end the round.
744 - Compute $\llbracket y \rrbracket \leftarrow \text{dTFHE.Eval}(\text{pk}, f, \text{ct}_1, \ldots, \text{ct}_n)$.
746 - Compute $\llbracket y{:}\text{sk}_i \rrbracket \leftarrow \text{dTFHE.PartialDec}(\text{sk}_i, \llbracket y \rrbracket)$ and $\pi_i^{\text{dec}} \leftarrow \text{NIZK.Prove}(\text{crs}, \text{st}_i^{\text{dec}}, \text{wit}_i^{\text{dec}})$
748     for $\text{st}_i^{\text{dec}} \in L_2$ where $\text{st}_i^{\text{dec}} = (\llbracket y{:}\text{sk}_i \rrbracket, \llbracket y \rrbracket, \text{pk}_i, i)$ and $\text{wit}_i^{\text{dec}} = (\text{sk}_i, r_i)$.
750 - Send $(\llbracket y{:}\text{sk}_i \rrbracket, \pi_i^{\text{dec}})$ to $Q$.

6. Output Computation: $Q$ does the following:
   - Recall the value $\llbracket y \rrbracket$ computed in Round 3.
752 - For each $i \in [n]$, if $\text{NIZK.Verify}(\text{crs}, \pi_i^{\text{dec}}, \text{st}_i^{\text{dec}}) \neq 1$ for $\text{st}_i^{\text{dec}} \in L_2$ where $\text{st}_i^{\text{dec}} = (\llbracket y{:}\text{sk}_i \rrbracket, \llbracket y \rrbracket, \text{pk}_i, i)$, discard $\llbracket y{:}\text{sk}_i \rrbracket$.
754 - Output $y \leftarrow \text{dTFHE.Combine}(\text{pk}, \{\llbracket y{:}\text{sk}_i \rrbracket\}_{i \in S})$ where $S$ contains the set of non-discarded values from the previous step.

*FIG. 10*

Rearrangement of Parties

ROUND-EFFICIENT FULLY SECURE SOLITARY MULTI-PARTY COMPUTATION WITH HONEST MAJORITY

CROSS-REFERENCE TO RELATED APPLICATIONS

This application is a continuation application of U.S. application Ser. No. 17/330,234, filed May 25, 2021, which claims the benefit of the filing date of U.S. Provisional Application No. 63/030,133 filed May 26, 2020, entitled "ON THE ROUND COMPLEXITY OF FULLY SECURE SOLITARY MPC WITH HONEST MAJORITY," and U.S. Provisional Application No. 63/088,336, filed Oct. 6, 2020, entitled "ON THE ROUND COMPLEXITY OF FULLY SECURE SOLITARY MPC WITH HONEST MAJORITY," which are herein incorporated by reference in their entirety for all purposes.

BACKGROUND

Secure multi-party computations (MPC) are cryptographic methods used to calculate the output of a function without revealing the inputs. Secure MPC can be used when one or more parties want to keep their inputs private, but still know the output of the computation. A secure solitary MPC is a type of MPC where only one party, the "output party" receives the output of the multi-party computation.

Secure MPC, including solitary MPC, when implemented on computer systems, usually takes longer to perform than the analogous "non-secure" multi-party computation (i.e., where the parties transmit their respective inputs direct to one another). Sometimes these secure multi-party computations are many orders of magnitude slower. Usually, this is because the computer systems need to perform several rounds of communications involving computationally intensive cryptographic operations. Over networks such as the Internet, where participating computers may be a significant distance from one another, this can introduce large delays due to latency. As a result, solitary secure MPC protocols are often too slow for many real world applications.

Thus, there is a need to improve the round efficiency of solitary secure multi-party computations to address speed and latency issues.

SUMMARY

Embodiments of the present disclosure are directed to techniques (protocols) that can be used to perform solitary multi-party computations, e.g., with guaranteed output deliver in the honest majority setting. These protocols can operate under different configurations or assumptions about the participating devices and the communication infrastructure or communication protocols that the participating devices use to communicate. For example, some protocols can use broadcasting communication infrastructure. Using broadcasting infrastructure, a participating device can broadcast identical data to all other participating devices. Other protocols can use of public key infrastructure (PKI) and point-to-point channels. Using point-to-point channels, each participating device can transmit data individually and directly to other participating devices. A PKI and point-to-point based protocol may involve participating devices verifying that each device sent out consistent data to each other device. This may not be necessary in a broadcast protocol where identical data are broadcast to each device.

One embodiment is directed to a method for performing a secure multi-party computation comprising performing, by an input device of a plurality of input devices comprising the input device and one or more other input devices: encrypting an input share with a public key to form an encrypted input; signing the encrypted input with a signing key to form a signature; transmitting a tuple comprising the encrypted input and the signature to the one or more other input devices; receiving one or more other tuples from the one or more other input devices, each other tuple of the one or more other tuples comprising another encrypted input and another signature, the input device thereby receiving one or more other encrypted inputs and one or more other signatures from the one or more other input devices; verifying that the input device received another tuple from each of the one or more other input devices; verifying the one or more other signatures using the one or more other encrypted inputs and one or more verification keys; determining a plurality of valid encrypted inputs based on the encrypted input and the one or more other encrypted inputs; computing a first encrypted output using the plurality of valid encrypted inputs; partially decrypting the first encrypted output with a first secret key share to generate a first partially decrypted output; and transmitting a second tuple comprising the first partially decrypted output and the first encrypted output to a receiving device, wherein the receiving device combines the first partially decrypted output, a second partially decrypted output generated by the receiving device, and one or more other first partially decrypted outputs received by the receiving device from the one or more other input devices, thereby generating a decrypted output.

Another embodiment is directed to a method for performing a secure multi-party computation comprising performing, by a receiving device: receiving, from a plurality of input devices, a first plurality of tuples, each first tuple of the first plurality of tuples comprising: an encrypted input, the encrypted input comprising an input share encrypted by an input device of the plurality of input devices using a public key, a signature, the signature generated by the input device by signing the encrypted input with a signing key; receiving, from the plurality of input devices, a plurality of additional tuples, each additional tuple of the plurality of additional tuples comprising: a first encrypted output and a partially decrypted output, wherein the partially decrypted output is partially decrypted by a corresponding input device of the plurality of input devices using a secret key share corresponding to the corresponding input device; verifying that the receiving device received a first tuple from each of the plurality of input devices; verifying, for each tuple of the first plurality of tuples, each signature using a corresponding verification key; calculating a second encrypted output using a plurality of encrypted inputs corresponding to the first plurality of tuples; partially decrypting the second encrypted output using a receiving secret key share, thereby generating a second partially decrypted output; and combining the second partially decrypted output and a plurality of partially decrypted outputs corresponding to the plurality of additional tuples, thereby generating a decrypted output.

Another embodiment is directed to a method for performing a secure multi-party computation comprising performing, by an input device of a plurality of input devices comprising the input device and a plurality of other input devices: generating a first encrypted input by encrypting an input share using a public key; transmitting, to the plurality of other input devices, a first tuple comprising the first encrypted input; receiving, from the plurality of other input devices, a plurality of other first tuples, each other first tuple of the plurality of other first tuples comprising another first encrypted input; generating a garbled circuit, wherein the garbled circuit uses a plurality of first sets of garbled circuit labels to produce a first partially decrypted output, the first partially decrypted output corresponding to the first encrypted input and a plurality of other first encrypted inputs corresponding to the plurality of other first tuples; generating a first set of garbled circuit labels corresponding to the first encrypted input and the garbled circuit; performing a plurality of intermediate protocols, each intermediate protocol corresponding to a different excluded input device of the plurality of other input devices, each intermediate protocol comprising: generating and transmitting to a receiving device, a second partially decrypted output by performing an intermediate multi-party computation with the receiving device and the plurality of other input devices excluding the different excluded input device, the second partially decrypted output comprising a partially decrypted plurality of second sets of garbled circuit labels corresponding to an excluded encrypted input generated by the different excluded input device, the garbled circuit, and a plurality of other garbled circuits, the plurality of other garbled circuits generated by the plurality of other input devices excluding the different excluded input device, the receiving device thereby receiving a plurality of second partially decrypted outputs corresponding to each intermediate protocol of the plurality of intermediate protocols; and transmitting, to the receiving device, the garbled circuit and the first set of garbled circuit labels, wherein the receiving device also receives a plurality of other garbled circuits and a plurality of other first sets of garbled circuit labels from the plurality of other input devices, thereby enabling the receiving device to: combine the plurality of second partially decrypted outputs to produce a second plurality of garbled circuit labels, generate a plurality of first partially decrypted outputs by evaluating the garbled circuit and the plurality of other garbled circuits using the first set of garbled circuit labels, the plurality of other first sets of garbled circuit labels, and the second plurality of garbled circuit labels, and produce a decrypted output by combining the plurality of first partially decrypted outputs.

These and other embodiments of the disclosure are described in detail below. For example, other embodiments are directed to systems, devices, and computer readable media associated with the methods and protocols described herein.

Prior to discussing specific embodiments of the invention, some terms may be described in detail.

TERMS

A "server computer" may include a powerful computer or cluster of computers. For example, the server computer can include a large mainframe, a minicomputer cluster, or a group of servers functioning as a unit. In one example, the server computer can include a database server coupled to a web server. The server computer may comprise one or more computational apparatuses and may use any of a variety of computing structures, arrangements, and compilations for servicing the requests from one or more client computers.

A "memory" may be any suitable device or devices that may store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may refer to any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

The term "cryptographic key" may include data used in encryption or decryption. For example, a cryptographic key may refer to a product of two large prime numbers. A cryptographic key may be used in a cryptosystem such as RSA (Rivest, Shamir, Adleman) or AES (Advanced Encryption Standard), and may be used to encrypt plaintext and produce a ciphertext output, or decrypt ciphertext and produce a plaintext output. Cryptographic keys may be symmetrical, in which case the same key is used for encryption and decryption, or asymmetrical, in which case different keys are used for encryption and decryption.

The term "plaintext" may refer to text that is in unencrypted or plain form. For example, this may refer to text that can be interpreted by a human or a computer without any processing, such as the phrase "hello, how are you?" Numbers or other symbols may also qualify as plaintext.

The term "ciphertext" may refer to text that is in an encrypted form. For example, this could refer to text that must be decrypted before it can be interpreted by a human or computer. Ciphertexts may be generated using any cryptographic algorithm or cryptosystem, such as RSA, AES, or a decentralized threshold fully homomorphic encryption (dTFHE) scheme.

The term "public key infrastructure" (PKI) may refer to an arrangement that binds public keys with respective identities of entities (e.g., participating devices). A PKI may include sets of roles, policies, hardware, software, and procedures needed to create, manage, distribute, use, store and revoke digital certificates and manage public-key encryption. PKI may be used to establish secure "point-to-point" channels, over which two participating devices can securely communicate.

The term "broadcast" may refer to methods for transmitting a message to multiple receivers simultaneously. A broadcast may allow verification of the "sender" or "broadcaster." A broadcast protocol contrasts with a point-to-point protocol, in which senders communicate with exactly one receiver.

The term "multi-party computation" may refer to a computation that is performed by multiple parties. Some or all of the parties may provide inputs to the multi-party computation. The parties can collectively calculate the output of the multi-party computation. In "solitary" multi-party computations, only one party, the "output party" determines the output of the computation. In a "secure multi-party computation," the parties may not share information or other inputs with one another.

The term "garbled circuit" may refer to a cryptographic protocol that can be used to perform secure computation between multiple parties, i.e., secure multi-party computation. A garbled circuit can be used to evaluate a function over private inputs (i.e., inputs that are not shared among the participating parties. In garbled circuits, functions are sometimes described as Boolean circuits.

The term "garbled circuit labels" may refer to labels corresponding to an input to a garbled circuit. For example, a set of garbled circuit labels may correspond to a first party's input to a garbled circuit. Garbled circuit labels may be used in place of the first party's input to the garbled circuit. In this way, the function associated with the garbled circuit can be calculated without directly using the first party's input.

The term "partial computation" may refer to part of a computation. Multiple partial computations may be combined to produce the output of the computation. For example, the volume of multiple solids may comprise partial computations used to calculate the total volume of those solids. Partial computations may be generated by multiple parties or cryptographic devices participating in a multi-party computation.

The term "participating device" may refer to a device that participates in a multi-party computation. Participating devices can comprise devices such as server computers, desktop computers, laptop computers, smartphones, smart watches, tablets, wearable devices, smart cars, IoT devices, etc. Participating devices can include "input devices," devices that contribute inputs (e.g., digital data, such as numerical data) to the multi-party computation, and "output devices," devices that receive the output of the multi-party computation. An output device may also be an input device, that is, the output device may contribute an input to the multi-party computation. Typically, a multi-party computation comprises multiple input devices and a single output device. A participating device can be "honest" or "dishonest." An honest participating device (e.g., an honest input device) can follow the multi-party computation protocol correctly and entirely. A dishonest participating device may perform some steps of the multi-party computation protocol incorrectly, e.g., by sending fraudulent or erroneous data to other participating devices. A dishonest participating device may be directed by an "adversary," e.g., a hacker or fraudster.

The term "zero-knowledge proof" may refer to a protocol or method by which one party can prove something about a value without communicating any other information about the value. The term zero-knowledge proof may also refer to data that can be used to perform this protocol or method, e.g., a party can generate a proof π and transmit it to other parties. These other parties can verify the proof in order to determine its validity. As an example, a zero-knowledge proof can be used to prove that a party knows of a secret value (such as a cryptographic key). As another example, a zero-knowledge proof can be used to demonstrate that data was encrypted correctly without requiring that the data be decrypted.

The term "tuple" may refer to a finite ordered list or sequence of elements, such as digital data elements. A tuple may comprise, for example, a digital data element and a digital signature, used to verify the source or authenticity of the digital data element. Tuples may be communicated between computers over networks such as the Internet.

The terms "signature," "digital signature," or "verification signature" may refer to data used to verify the authenticity of data using cryptography. A computer may digitally sign data by encrypting that data using a cryptographic key known only to that computer (e.g., a private key). Other computers may verify the signature by decrypting the data using a publically known cryptographic key corresponding to that computer (i.e., a public key). A verification signature may be used to verify either the source of the signed data or the veracity of the signed data.

BRIEF DESCRIPTION OF THE DRAWINGS

FIG. 4 shows an exemplary PKI-based MPC protocol (protocol 2) according to some embodiments.

FIG. 9 shows a first part of an exemplary general PKI-based MPC protocol (protocol 4) according to some embodiments.

FIG. 10 shows a second part of an exemplary general PKI-based MPC protocol (protocol 4) according to some embodiments

DETAILED DESCRIPTION

Figure 1:
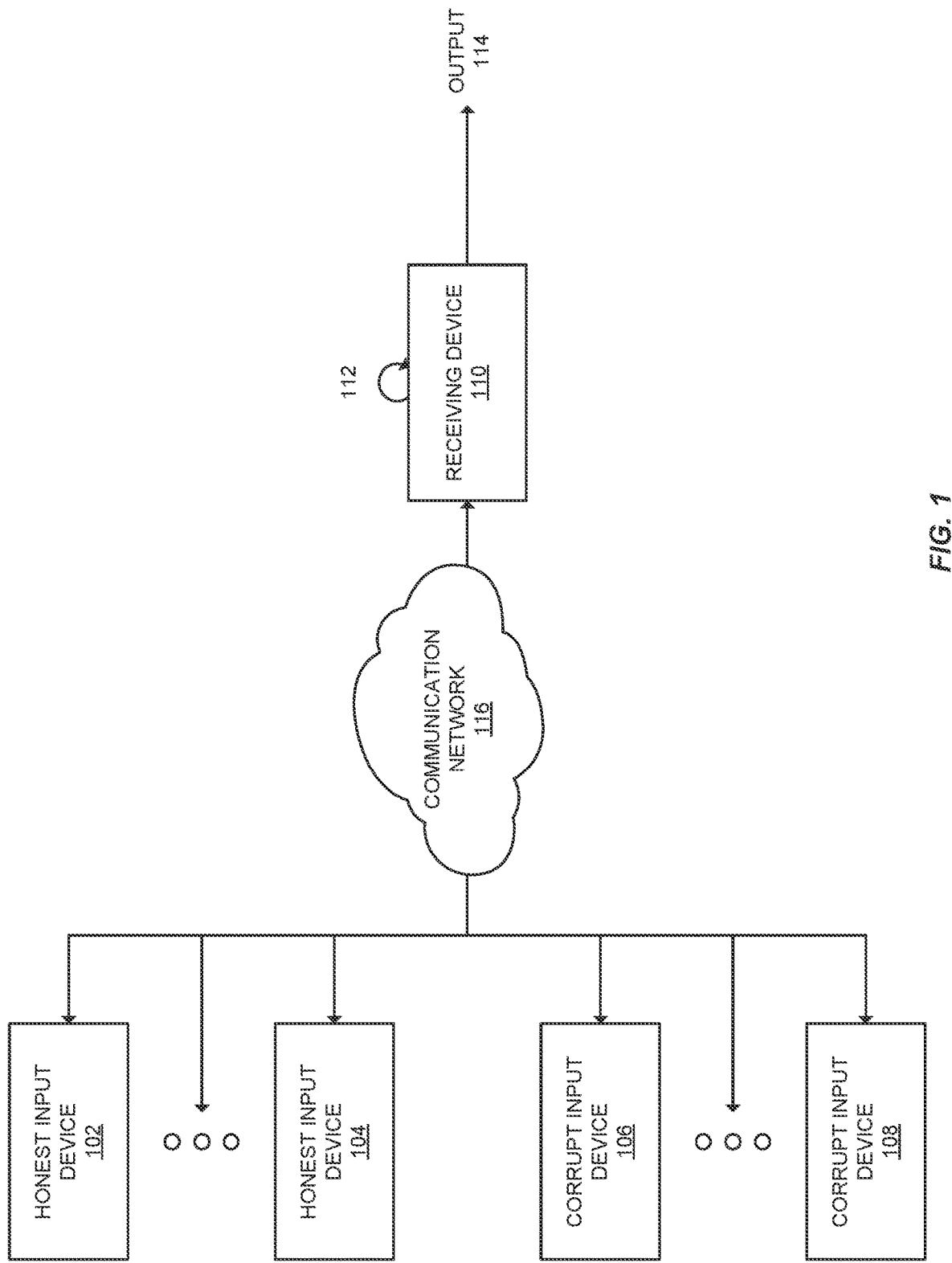
FIG. 1 shows a system diagram corresponding to an exemplary multi-party computation system according to some embodiments.

Embodiments of the present disclosure are directed to techniques (protocols) that can be used to perform solitary multi-party computations, e.g., with guaranteed output deliver in the honest majority setting. Using these protocols, a plurality of computers can participate in a multi-party computation in order to calculate an output that is known only to the "receiving device" (sometimes referred to as the "output device"). "Honest majority" means that a majority of the participating computers are behaving honestly, i.e., following the protocols exactly, without attempting to deceive or mislead other participating computers (e.g., by sending different data packets to different computers, when the data packets should be identical). "Guaranteed output delivery" means that, provided the protocol is not aborted by one or more participants, the output device is guaranteed to receive a correct output to the multi-party computation, even if one or more of the input devices are dishonest.

An example secure MPC relates to purchases of expensive goods, such as a house. A buyer may want to know if they can afford the house (to avoid wasting the buyer's time), without disclosing their assets to the seller (for their privacy and to avoid weakening their bargaining position). Likewise, the seller may want to know if the buyer can afford the house (to avoid wasting the seller's time) without forcing the seller to commit to a particular price (to avoid weakening their bargaining position). The buyer can input the maximum they are willing to pay, and the seller can input the minimum they are willing to receive, and the secure MPC can output a binary value ("TRUE" or "FALSE") indicating whether they should negotiate a sale. Neither party has to reveal their assets, valuations, or preferences. As such, both parties can enter the negotiation in a strong, fair, bargaining position.

As an example of secure solitary MPC, a university (the output party) can perform a statistical study (computation) on the health of individuals. The university could contact primary care providers (input parties) for health data (inputs) related to their patients. Normally, the primary care providers cannot provide this information, because it violates patient confidentiality. However, using a multi-party computation, the university could determine the results of their study without requiring the primary care providers to reveal their patients' information. For example, the university could determine that 40% of patients in a particular city have high blood pressure without learning blood pressure measurements corresponding to any individual patients The protocols in the present disclosure may vary based on different assumptions or configurations of participating devices. These may include, for example, the number of participating devices and assumptions regarding the number of dishonest or corrupt devices participating in the multi-party computation. For example, some protocols operate under the assumption that at most one participant device is dishonest. Another protocol operates under the assumption that two or less participants out of five participants are dishonest. Another protocol operates under the assumption that an arbitrary minority of participants are dishonest. The multi-party computation protocols described herein also vary based on whether the output device (i.e., the solitary device that receives the output of the multi-party computation) also contributes an input to the multi-party computation or not.

However, although the multi-party computation protocols described herein vary in the ways described above, they all can achieve guaranteed output delivery, and can involve a minimal number of communication rounds dependent on the assumptions relating to, or configuration of, the participating devices and the infrastructure used to communicate between them. As such, the protocols described herein are highly-efficient, and reduce the amount of time needed to perform secure multi-party computations. These protocols are well suited to high-latency applications, where reducing the number of communication rounds the total amount of time needed to perform secure multi-party computations. Further, by providing for a number of different protocols, each operating under different conditions or assumptions, embodiments provide additional efficiency improvements, by enabling protocols to be selected based on the needs or security requirements of users. For example, if a user knows that at most one of the participating devices is dishonest, the user can use one protocol that only requires two rounds to complete, rather than using a "more secure" protocol (i.e., one that can operate with more dishonest participants) that takes five rounds to complete.

While many embodiments are described below, the present disclosure specifically identifies five protocols, labelled protocols 1-5. These protocols are described throughout the specification, and specifically described in Sections III.D and IV.E-H. Protocol 1 is a three round protocol designed for a broadcast-based setting. Protocol 2 is a two round protocol in a PKI-based setting, where there is at most one corrupt device and the receiving device does not have an input. Protocol 3 is a three round protocol in a PKI-based setting where there is at most one corrupt device and the receiving device provides an input. Protocol 4 is a five round protocol in a PKI-based setting with any honest majority of participating devices. Protocol 5 is a three round protocol in a PKI-based setting with exactly five participating devices, at most two of which are corrupt.

I. OVERVIEW AND PRELIMINARIES

As stated above, this disclosure relates to the problem of secure multiparty computation for functionalities where only one party receives the output, which are referred to as solitary MPC. Recently, Halevi et al. (TCC 2019) studied fully secure solitary MPC (with guaranteed output delivery) and showed impossibility of such protocols for certain functionalities when there is no honest majority among the parties.

As such, this disclosure relates to fully secure solitary MPC in the honest majority setting and focus on its round complexity. A broadcast channel or public key infrastructure (PKI) setup is necessary for such protocols. Therefore, this disclosure studies the following settings and asks the question: Can fully secure solitary MPC be achieved in fewer rounds than fully secure standard MPC where all parties receive the output?

When there is a broadcast channel and no PKI, this disclosure shows that the exact round complexity of fully secure solitary MPC is 3, which is the same as fully secure standard MPC. Further, this disclosure proves that there is not a three round protocol where only the first and third rounds make use of a broadcast channel.

When there is PKI and no broadcast channel however, this disclosure shows more positive results, including an upper bound of 5 rounds for any honest majority. This is superior to the lower bound of $\Omega(t)$ (t is the number of corrupt parties) for fully secure standard MPC in the exact same setting. This disclosure complements this by showing a lower bound of 4 rounds whenever t≥3.

Additionally, for the special case t=1, when the output receiving party does not have an input to the function, this disclosure shows an upper bound of 2 rounds, which is optimal. However, when the output receiving party has an input to the function, this disclosure shows a lower bound of 3, matching an upper bound from prior works. Further, when t=2, this disclosure shows a lower bound of 3 rounds (an upper bound of 4 follows from prior works).

All of these results assume the existence of a common reference string (CRS) and pairwise-private channels. the upper bounds use a decentralized threshold fully homomorphic encryption (dTFHE) scheme (which can be built from the learning with errors (LWE) assumption).

A. Introduction

Secure multiparty computation (MPC) [Yao86, GMW87] allows a set of mutually distrusting parties to jointly compute any function on their private data in a way that the participants do not learn anything about the inputs except the output of the function. The strongest possible security notion for MPC is guaranteed output delivery, which states that all honest parties are guaranteed to receive their outputs no matter how the corrupt parties behave. An MPC protocol achieving guaranteed output delivery is often called a fully secure protocol. A seminal work of Cleve [Cle86] showed that it is impossible to construct an MPC protocol with guaranteed output delivery unless a majority of the parties are honest.

Solitary MPC. Recently, Halevi et al. [HIK+19] initiated the study of MPC protocols with guaranteed output delivery for a special class of functionalities, called solitary functionalities, which deliver the output to exactly one party. Such functionalities capture many real world applications of MPC in which parties play different roles and only one specific party wishes to learn the output. For example, consider a secure machine learning task where several entities provide training data while only one entity wishes to learn a model based on this private aggregated data. In the rest of the disclosure, such MPC protocols are referred to as solitary MPC. For clarity of exposition, protocols where all parties obtain output are referred to as standard MPC. The argument of Cleve [Cle86] does not rule out solitary MPC with guaranteed output delivery in the presence of a dishonest majority, instead showing that with a dishonest majority, it is impossible for an MPC protocol to achieve fairness, which guarantees that malicious parties cannot learn the output while preventing honest parties from learning the output. Since guaranteed output delivery implies fairness, this impossibility also holds for standard MPC with guaranteed output delivery. However, it doesn't hold for solitary MPC as fairness is clearly not an issue in the solitary MPC setting. However, Halevi et al. [HIK+19] showed that solitary MPC with guaranteed output delivery is also impossible with dishonest majority. Both impossibility results hold even when parties have access to a common reference string (CRS).

Round Complexity. An important efficiency metric of an MPC protocol is its round complexity, which quantifies the number of communication rounds required to perform the protocol. The round complexity of standard MPC has been extensively studied (see Section V for the detailed literature survey) over the last four decades culminating in recent works [CCG+19] achieving optimal round complexity from minimal assumptions. In the honest majority setting, three rounds are known to be necessary [GIKR02, PR18, GLS15] for general MPC with guaranteed output delivery, even in the presence of CRS and a broadcast channel. Matching upper bounds appear in [GLS15, ACGJ18, BJMS18]. The protocol of Gordon et al. [GLS15] requires a CRS, while the other two [ACGJ18, BJMS18] are in the plain model. A closer look at these protocols reveals that all these protocols assume the existence of a broadcast channel. This disclosure attempts to provide improvements in terms of round complexity for solitary MPC. In particular, assuming a broadcast channel and CRS, can a solitary MPC protocol with guaranteed output delivery and fewer than three rounds be built?

Unfortunately, the answer is no. This disclosure shows that in the presence of a broadcast channel and CRS, the exact round complexity for solitary MPC with guaranteed output delivery is also three. Nevertheless, broadcast channels are expensive to realize in practice: the seminal works of Dolev and Strong [DS83] and Fischer and Lynch [FL82] showed that realizing a single round of broadcast requires at least t+1 rounds of communication over pairwise-private channels, where t is the number of corrupt parties, even with a public key infrastructure (PKI) setup (note that PKI setup is in fact necessary for realizing a broadcast channel when t≥n/3 [PSL80, LSP82]). Even for randomized broadcast which has expected constant round protocols, it was shown that termination can't be guaranteed in constant rounds [KY86, CMS89]. In fact, recent works [GGJ19, CGZ20] focus on minimizing the use of broadcast in the context of building round optimal standard MPC. Motivated by that, this disclosure asks the following question: Can three round protocols be designed that minimize the use of broadcast channels to only a few of these rounds?

However, despite the goal of minimizing the use of broadcast channels, standard MPC with guaranteed output delivery implies broadcast. Therefore, any protocol without a broadcast channel (only using pairwise-private channels with PKI setup) should necessarily require $\Omega(t)$ rounds. In contrast, observe that solitary MPC with guaranteed output delivery does not imply broadcast, so the $\Omega(t)$ lower bound does not hold for achieving solitary MPC (with guaranteed output delivery) without a broadcast channel. This motivates the following questions about solitary MPC in the honest majority setting: Without broadcast, is there still an $\Omega(t)$ lower bound for the round complexity of solitary MPC with guaranteed output delivery?

B. Summary of Results

This disclosure shows in Section VI that a broadcast channel or PKI setup is also necessary to achieve solitary MPC with guaranteed output delivery for honest majority (even with a CRS). A similar argument was presented by Fitzi et al. [FGMO01] for information theoretic security and by Halevi et al. [HIK+19] for dishonest majority (in particular, t≥2n/3).

Next, the aforementioned questions are answered by studying the exact round complexity of solitary MPC with guaranteed output delivery for honest majority in two settings: (a) where there is a broadcast channel and no PKI setup; and (b) where there is PKI setup and no broadcast channel. Note that although PKI setup and broadcast channels are equivalent due to [DS83] from a feasibility perspective, realizing broadcast requires at least t+1 rounds assuming PKI and hence they are not equivalent from a round complexity perspective. For the setting where there is both broadcast channel and PKI, it is known from prior works [HLP11, GLS15] that the exact round complexity is two.

1. With Broadcast and No PKI

When there is a broadcast channel but no PKI setup, this disclosure shows a lower bound of three rounds for achieving solitary MPC with guaranteed output delivery in the honest majority setting, which is the same as the lower bound for standard MPC.

Informal Theorem 1. Assume parties have access to CRS, pairwise-private channels and a broadcast channel. Then, there exists a solitary functionality $f$ such that no two-round MPC protocol can compute $f$ with guaranteed output delivery in the honest majority setting even against a non-rushing adversary.

This lower bound is tight because it is known from previous works [GLS15, ACGJ18, BJMS18] that there is a three-round protocol for solitary MPC with guaranteed output delivery in the honest majority setting.

Towards the goal of minimizing the use of broadcast channels, it is observed that in these three round protocols, only the first two rounds require a broadcast channel while the third round messages can be sent over point-to-point channels. This disclosure shows that it is impossible to design a three round protocol in this setting where only the first and third rounds have access to a broadcast channel while the second round messages are sent only via point-to-point channels.

Informal Theorem 2. Assume parties have access to CRS, pairwise-private channels in all three rounds and a broadcast channel in rounds one and three. Then, there exists a solitary functionality $f$ such that no three-round MPC protocol can compute $f$ with guaranteed output delivery in the honest majority setting even against a non-rushing adversary.

2. With PKI and No Broadcast

When there is PKI setup and no broadcast channel, this disclosure shows that the $\Omega(t)$ lower bound for standard MPC does not hold for solitary MPC. In particular, this disclosure demonstrates a five-round protocol that works for any number of parties and achieves guaranteed output delivery against any malicious adversary with an honest majority. This protocol builds on the standard MPC protocol with guaranteed output delivery of Gordon et al. [GLS15] and uses a decentralized threshold fully homomorphic encryption (dTFHE) scheme (as defined in [BGG+18]) as the main building block, which can be built from the learning with errors (LWE) assumption.

Informal Theorem 3. Assuming LWE, there exists a five-round solitary MPC protocol with guaranteed output delivery in the presence of a PKI setup and pairwise-private channels. The protocol works for any number of parties n, any solitary functionality and is secure against a malicious rushing adversary that can corrupt any $t<n/2$ parties.

The disclosure complements this upper bound by providing a lower bound of four rounds in the same setting where the adversary corrupts at least 3 parties. This lower bound works even in the presence of a non-rushing adversary.

Informal Theorem 4. Assume a PKI setup and pairwise-private channels. There exists a solitary functionality $f$ such that no three-round MPC can compute $f$ with guaranteed output delivery when the number of corrupt parties is $3 \leq t < n/2$ even against a non-rushing adversary.

Apart from these two main results, this disclosure also studies the round complexity for scenarios when $t<3$.

Special case: $t=1$. When the number of corrupt parties is 1, consider two cases: (a) when the function $f$ involves an input from the output receiving Q, and (b) when $f$ does not involve an input from Q. In the first case, this disclosure shows a lower bound of three rounds for achieving solitary MPC with guaranteed output delivery. That is, there exists a solitary functionality $f$ (involving an input from Q) such that a minimum of three rounds are required to achieve solitary MPC with guaranteed output delivery. A three round upper bound can be achieved by combining [GLS15] and [DS83], which is elaborated upon in the technical overview (Section I.D).

In the second case where $f$ does not involve an input from Q, it is possible to achieve a protocol that uses less than three rounds. In particular, this disclosure shows a two-round protocol to achieve solitary MPC with guaranteed output delivery. The main technical tool is decentralized threshold FHE and the protocol can be based on LWE. This upper bound is also tight as known from prior work [HLP11] that two rounds are necessary.

Special case: $t=2$. When the number of corrupt parties is 2, this disclosure shows a lower bound of three rounds to compute any function $f$ (with or without input from Q). An upper bound of four rounds can also be achieved by combining [GLS15] and [DS83].

All three of the lower bounds above hold not only for PKI, but extend to arbitrary correlated randomness setup model. The results are summarized along with the known related results for the round complexity of solitary MPC with guaranteed output delivery in Table 1. All these results also assume the existence of a common reference string (CRS) and pairwise-private channels. These results are bolded.

TABLE 1

Round complexity of solitary MPC with guaranteed output delivery.

| broadcast | PKI | t(<n/2) | Q has input | lower bound | upper bound |
|---|---|---|---|---|---|
| yes | yes | * | * | 2[HLP11] | 2 [GLS15] |
| yes | no | * | * | 3 (Theorem 4.1) | 3 [GLS15, ACGJ18, BJMS18] |
| no | yes | 1 | nc | 2[HLP11] | 2 (Theorem 7.4) |
| no | yes | 1 | yes | 3 (Theorem 7.1) | 3 [GLS15] + [DS83] |
| no | yes | 2 | * | 3 (Theorem 8.1) | 4 [GLS15] + [DS83] |
| no | yes | ≥3 | * | 4 (Theorem 5.1) | 5 (Theorem 6.1) |

"*" means that the specific value of t or whether Q has input is irrelevant. This disclosure's results are bolded.

C. Overview of the Disclosure

A technical overview is provided next in Section I.D. Preliminaries including the definitions of required cryptographic building blocks are provided in Section I.E. In Section II, a system diagram of a MPC system according to some embodiments is described. In Section III results are presented for protocols that assume broadcast but no PKI. In Section IV, PKI-based protocols are described. In Section IV.A the lower bounds for PKI without broadcast is presented. In Section IV.B, a general five-round protocol (protocol 4) as an upper bound is described in the same setting. In Section IV.C and Section IV.D, results are detailed for protocols corresponding to $t=1$ and $t=2$ respectively. The detailed literature survey appears in Section V. In Section VI, the details of necessity of broadcast or PKI in this setting are provided. In Section VII, a security proof is provided for the five-round protocol (protocol 4). In Section VIII, a security proof is provided for the two-round protocol where the receiving device has no input. In Section IX, a computer system is described. Section X lists a series of references.

D. Technical Overview

1. Overview of Upper Bounds

In this subsection, a technical overview of the upper bounds is provided. It will mainly focus on the general five-round protocol in the setting with PKI and no broadcast, and briefly discuss other special cases at the end.

The starting point is the two-round protocol of Gordon et al. [GLS15] which achieves guaranteed output delivery in the presence of an honest majority and delivers output to all parties, assuming the existence of a broadcast channel and PKI setup. The protocol uses a (t+1)-out-of-n decentralized threshold fully homomorphic encryption (dTFHE) scheme, where an FHE public key pk is generated in the setup and the secret key is secret shared among the parties. The encryptions can be homomorphically evaluated and can only be jointly decrypted by at least (t+1) parties. Their two-round protocol in the broadcast model roughly works as follows. First, the PKI setup generates the dTFHE public key pk and individual secret keys $sk_i$ for each party $P_i$. In Round 1, each party $P_i$ computes an encryption of its input $x_i$ and broadcasts $[\![x_i]\!]$ ($[\![x]\!]$ is used to denote a dTFHE encryption of x). Then each party can homomorphically evaluate the function $f$ on $[\![x_1]\!], \ldots, [\![x_n]\!]$ to obtain an encryption of the output y. In Round 2, each party broadcasts a partial decryption of ⟦y⟧. At the end of this, every party can individually combine the partial decryptions to learn the output y.

One immediate observation is that since only one party $P_n(=Q)$ receives the output, the second round also works without a broadcast channel by requiring every party to only send partial decryptions directly to Q. The main challenge now is to perform the first round with pairwise-private channels instead of broadcast channels. One approach is to employ a (t+1)-round protocol to realize the broadcast functionality over pairwise-private channels [DS83], but this would result in a (t+2)-round protocol.

Even worse, there seems to be a fundamental barrier in this approach to design a constant round protocol. At a high level, to achieve guaranteed output delivery, all the honest parties should agree on a set of ciphertexts ⟦$x_1$⟧, ..., ⟦$x_n$⟧ so that they can homomorphic evaluate on the same set of ciphertexts and compute partial decryptions on the same ⟦y⟧. This already implies Byzantine agreement, which requires at least (t+1) rounds [DS83].

Circumventing the lower bound. An observation here, which also separates solitary MPC from general MPC, is that the honest parties do not need to always agree. Instead, they only need to agree when Q is honest. In other words, if the honest parties detect any dishonest behavior of Q, they can simply abort. This does not imply Byzantine agreement any more, hence there is hope to circumvent the $\Omega(t)$ lower bound.

Relying on honest Q. First, consider a simple case where honest parties only need to agree on ⟦$x_n$⟧ when Q is honest. This can be done in two rounds [GL05]. In Round 1, Q sends $x_n$ to each party (along with its signature). To ensure Q sends the same ciphertext to everyone, in Round 2, parties exchange their received messages in Round 1. If there is any inconsistency, then they detect dishonest behavior of Q, so they can abort; otherwise, all the honest parties will agree on the same ⟦$x_n$⟧ at the end of Round 2 if Q is honest. Unfortunately this simple approach does not work for every party. In particular, if honest parties want to agree on ⟦$x_i$⟧ for i≠n, they cannot simply abort when detecting inconsistent messages from $P_i$ (because they can only abort when Q is dishonest).

A next attempt is to rely on Q to send out all the ciphertexts. In Round 1, each party $P_i$ first sends an encryption ⟦$x_i$⟧ to Q. Then in Round 2, Q sends ⟦$x_1$⟧, ..., ⟦$x_n$⟧ to each party. In Round 3, parties exchange their messages received from Q. If the honest parties notice any inconsistency in Q's Round-2 messages, they can simply abort. Note that every message is sent along with the sender's signature, so a malicious Q cannot forge an honest $P_i$'s ciphertext ⟦$x_i$⟧; similarly, a malicious $P_i$ cannot forge an honest Q's Round-2 message. Therefore, all the honest parties will agree on the same set of ciphertexts at the end of Round 3 if Q is honest.

Nevertheless, a malicious Q has complete freedom to discard any honest party's input in Round 2 (pretending that these parties did not communicate to him in Round 1) and learn a function excluding these honest parties' inputs, which should not be permitted. The crux of the issue is the following: even when Q is malicious, the output of f learned by Q must be either ⊥ or include every honest party's input. This is implied by the security guarantees of the MPC protocol. In particular, in the real/ideal paradigm, a malicious Q in the ideal world can only obtain an output from the ideal functionality that computes f involving all the honest parties' inputs. Therefore, a mechanism is needed to ensure that all the honest parties' ciphertexts are picked by Q. However, the parties do not even know who are the honest parties. How can they ensure this?

Innocent until proven guilty. A solution to this problem is for every party $P_i$ to treat other parties with more leniency. That is, unless $P_i$ knows with absolute certainty that another party $P_k$ is malicious, $P_i$ would demand that the ciphertexts picked by Q must also include a ciphertext from $P_k$. To implement this mechanism, another round is added at the beginning, where each party $P_i$ sends ⟦$x_i$⟧ to every other party. Then in Round 2, each party $P_i$, besides sending ⟦$x_i$⟧ to Q, also sends all the ciphertexts he has received to Q. In Round 3, Q picks a set of ciphertexts ⟦$x_1$⟧, ..., ⟦$x_n$⟧ and sends to each party. In particular, for each party $P_k$, as long as Q received any valid ciphertext for $P_k$ (either directly from $P_k$ or from other parities), Q must include a ciphertext for $P_k$. Parties exchange messages in Round 4 to check Q's consistency as before. Finally, the following invariant is maintained for every honest party $P_i$ before sending the partial decryption in Round 5: if $P_i$ received a ciphertext ⟦$x_k$⟧ from party $P_k$ in Round 1, then the ciphertexts picked by Q must also include a ciphertext from $P_k$. This invariant allows Q to pick a different ciphertext ⟦$x'_k$⟧ (with a valid signature) if e.g. that was received by Q from $P_k$. On the other hand, this prevents the attacks discussed earlier as a malicious Q can no longer discard an honest $P_k$'s ciphertext ⟦$x_k$⟧ although $P_i$ still does not know who are the honest parties.

Achieving fully malicious security. To achieve fully malicious security, the adversary's messages need to be correctly generated. The approach taken by [GLS15] is to apply a generic round-preserving compiler [AJL+12] that transforms a semi-malicious protocol to a malicious protocol using non-interactive zero-knowledge (NIZK) proofs in the CRS model with broadcast channels. In particular, in each round, the adversary must prove (in zero-knowledge) that it is following the protocol consistently with some setting of random coins. However, this round-preserving compiler cannot be directly applied, since the parties do not have broadcast channels. This limitation introduces additional complications in the protocol design to preserve the round complexity while achieving malicious security. The reader is referred to Section IV.B.1 for more details of the protocol and other subtle issues faced in protocol design.

Special Cases. As mentioned above, the two-round protocol of Gordon et al. [GLS15] with broadcast and PKI can be transformed into a (t+2)-round protocol if the broadcast in the first round is instantiated by a (t+1)-round protocol over pairwise-private channels [DS83] and parties only send their messages to Q in the second round. For t=1 and 2, better than five rounds can be achieved. For t=1, when Q does not have input, a two-round protocol can be designed which relies on the fact that at most one party is corrupted. See Section IV.C.2 for more details.

2. Overview of Lower Bounds

At a high level, the following approach is used in the lower-bound arguments. To prove the impossibility of an r-round protocol, assume a contradiction that an r-round solitary MPC protocol Π with guaranteed output delivery exists. Next, analyze a sequence of scenarios which provided inferences regarding the properties that Π must satisfy. Exploit the guarantees of correctness, privacy and full-security (guaranteed output delivery). The strategic design of the scenarios building on these inferences lets us arrive at the final contradiction. The crux of these arguments lies in the design of scenarios in a manner that enables the distinctness in the setting in terms of the network model and the corruption thresholds to surface.

With broadcast and no PKI. For the three-round lower bound with a broadcast channel and no PKI setup, in accordance with the above, assume there exists a two-round protocol Π with guaranteed output delivery computing a three-party solitary functionality amongst parties $P_1$, $P_2$, and Q (output receiving party). The first two scenarios involving a malicious $P_2$ and passive Q respectively allow us to infer the following property of Π: Π must be such that even if $P_2$ does not communicate privately to Q in Round 1 and aborts in Round 2, Q must still be able to compute the output on a non-default input of $P_2$, say $x_2$ (here, non-default input of $P_2$ refers to the input with respect to which it interacted with $P_1$ in Round 1). This is implied by the security guarantee of guaranteed output delivery. Intuitively, this implies that Q must obtain sufficient information to compute on $x_2$ only from (i) $P_1$'s private messages in Round 2 and (ii) $P_2$'s broadcast message in Round 1. However, note that both of these are also available to $P_1$ at the end of Round 1. This leads to a final scenario, in that a passive $P_1$ can compute the residual function $f(\widetilde{x_1}, x_2, \widetilde{x_3})$ for more than one choices of ($\widetilde{x_1}, \widetilde{x_3}$), while the input of honest $P_2$ remains fixed: which is the final contradiction. Notably, this argument breaks down in the presence of a PKI, which allows Q to have some secret, such as a secret-key, under which $P_2$'s messages can be encrypted: this disables $P_1$ to recover the same information as Q after Round 1.

With PKI and no broadcast. In light of the above, the lower-bound arguments in the setting with a PKI setup and no broadcast tend to be more involved. For the four-round general lower bound that holds for $3 \le t < n/2$, it assumed that there exists a three-round protocol Π with guaranteed output delivery computing a special 7-party solitary functionality amongst parties $P_1, \ldots, P_6$ and Q. This special functionality has the property that the outputs on default and non-default inputs of $P_1$ are distinct, which is exploited in the argument. Four main scenarios are analyzed as follows. In Scenarios 1 and 2, $\{P_1, P_6\}$ are corrupt and $P_1$ does not communicate directly to anyone throughout. The difference between them is in the communication of $P_6$ in Round 2 to $\{P_2, P_3, P_4, P_5\}$: while in Scenario 1, $P_6$ acts as if he did not receive any communication from $P_1$ in Round 1; in Scenario 2, $P_6$ pretends to have received communication from $P_1$ in Round 1. It is proven via a sequence of hybrids that both scenarios must result in the same output (which must be on default input of $P_1$ as the communication in Scenario 1 is independent of $x_1$). This allows the inference of a property satisfied by Π: if $\{P_3, P_4, P_5\}$ do not receive any communication directly from $P_1$ throughout Π and only potentially receive information regarding $P_1$ indirectly via $P_6$ (say $P_6$ claims to have received authenticated information from $P_1$ which can be verified by $\{P_3, P_4, P_5\}$ due to availability of PKI), then Q obtains an output on default input of $P_1$.

Next, an orthogonal scenario (Scenario 3) is considered, where $\{P_3, P_4, P_5\}$ are corrupt and pretend as if they received no information from $P_1$ directly. Correctness of Π ensures that Q must obtain output on honest input of $P_1$ using the messages from $\{P_1, P_2, P_6\}$. Roughly speaking, the above observations enable the partitioning of parties $\{P_1, \ldots, P_6\}$ into two sets $\{P_1, P_2, P_6\}$ and $\{P_3, P_4, P_5\}$. Combining the above inferences, a final scenario is designed where adversary corrupts $\{P_1, P_2, Q\}$. Here, $P_1$ behaves honestly only to $P_6$ (among the honest parties). The communication of corrupt parties is carefully defined so that the following holds: (a) the views of $\{P_3, P_4, P_5\}$ are identically distributed to their views in Scenario 2, and (b) the views of $\{P_1, P_2, P_6\}$ are identically distributed to their views in Scenario 3. It is then demonstrated that Q can obtain output on default as well as non-default input of $P_1$ by using the communication from $\{P_3, P_4, P_5\}$ and $\{P_1, P_2, P_6\}$ selectively. Several technicalities and intermediate scenarios have been skipped in the above skeleton in the interest of highlighting the key essence of these ideas. Refer to Section IV.A for the details.

Observe that the above approach inherently demands the presence of 3 or more corruptions. The main bottleneck in extending it to t=2 arises from the sequence of hybrids between Scenario 1 and 2, which requires the presence of an additional corruption besides $\{P_1, P_6\}$ (details deferred to Section IV.A). This shows hope for better upper bounds (less than four rounds) for lower corruption thresholds. In this direction, the cases of t=1 and t=2 are investigated separately. The necessity of three rounds is shown for t=1 when Q has input and for t=2 (irrespective of whether Q has input). These lower bounds also employ the common approach outlined above but differ significantly in terms of the associated scenarios. Refer to the respective technical sections for the details. Notably, all the lower bounds also extend to arbitrary correlated randomness setup.

E. Preliminaries

1. Notation $\lambda$ is used to denote the security parameter. poly($\lambda$) denotes a polynomial function in $\lambda$. negl($\lambda$) denotes a negligible function, that is, a function $f$ such that $f(\lambda) < 1/p(\lambda)$ holds for any polynomial p(•) and sufficiently large $\lambda$. ⟦x⟧ is used to denote an encryption of x.

2. Security Model

The security of these protocols is proven based on the standard real/ideal world paradigm. Essentially, the security of a protocol is analyzed by comparing what an adversary can do in the real execution of the protocol to what it can do in an ideal execution, that is considered secure by definition (in the presence of an incorruptible trusted party). In an ideal execution, each party sends its input to the trusted party over a perfectly secure channel, the trusted party computes the function based on these inputs and sends to each party its respective output. Informally, a protocol is secure if whatever an adversary can do in the real protocol (where no trusted party exists) can be done in the above described ideal computation. The model below is formalized using text from [CL14]. Refer to [CL14] for further details.

Execution in the Real World. Throughout a real execution, all the honest parties follow the instructions of the prescribed protocol, whereas the corrupted parties receive their instructions from the adversary. Then, at the conclusion of the execution, the honest parties output their prescribed output from the protocol, the corrupted parties output nothing and the adversary outputs an (arbitrary) function of its view of the computation (which contains the views of all the corrupted parties). Without loss of generality, it is assumed that the adversary always outputs its view (and not some function of it).

Definition 3.1 (Real-model execution). Let $f$ be an n-party functionality, let π be a multiparty protocol for computing $f$ and let $\lambda$ be the security parameter. Let $\mathcal{J} \subseteq [n]$ denotes the set of indices of the parties corrupted by $\mathcal{A}$, Then, the joint execution of π under ($\mathcal{A}, \mathcal{J}$) in the real model, on input vector $\bar{x} = (x_1, \ldots x_n)$, auxiliary input z to $\mathcal{A}$ and security parameter $\lambda$, denoted $\text{Real}_{\pi, \mathcal{J}, \mathcal{A}(z)}(\bar{x}, \lambda)$ is denoted as the output vector of $P_1, \ldots, P_n$ and $\mathcal{A}$ resulting from the protocol interaction, where for every i∈$\mathcal{J}$ party $P_i$ computes its messages according to $\mathcal{A}$, and for every j∉ $\mathcal{J}$, party $P_j$ computes its messages according to π.

Execution in the Ideal World. For full security i.e., security with guaranteed output delivery, an ideal execution proceeds as follows:

Send inputs to trusted party: Each honest party $P_i$ sends its input $x_i$ to the trusted party. Maliciously corrupted parties may send the trusted party arbitrary inputs as instructed by the adversary. Let $x_{i'}$ denote the value sent by $P_{i'}$.

Trusted party answers the parties: If $x_{i'}$ is outside of the domain for $P_i$ or $P_i$ sends no input, the trusted party sets $x_{i'}$ to be default value ⊥. Next, the trusted party computes $f(x_{1'}, \ldots x_{n'}) = (y_1, \ldots, y_n)$ and sends $y_i$ to party $P_i$ for every i.

Outputs: Honest parties always output the message received from the trusted party and the corrupted parties output nothing. The adversary outputs an arbitrary function of the initial 155 $x_i\}_{i \in \mathcal{J}}$ and the messages received by the corrupted parties from the trusted party $\{y_i\}_{i \in \mathcal{J}}$, where $\mathcal{J}$ denotes the set of indices of the corrupted parties.

Definition 3.2 (Ideal-model execution with guaranteed output delivery). Let $f:(\{0,1\}^*)^n \to (\{0,1\}^*)^n$ be an n-party functionality where $f=(f_1, \ldots f_n)$. Let λ be the security parameter and $\mathcal{J} \subseteq [n]$ denotes the set of indices of the corrupted parties. Then, the joint execution of $f$ under (Sim, $\mathcal{J}$) in the ideal model, on input vector $\bar{x}=(x_1, \ldots x_n)$, auxiliary input z to Sim and security parameter λ, denoted Idea$l_{f,\mathcal{J},\text{Sim}(z)}(\bar{x}, \lambda)$ is denoted as the output vector of $P_1, \ldots, P_n$ and Sim resulting from the above described ideal process.

Security of Protocols. The security of protocols is formulated by saying that adversaries in the ideal model are able to simulate adversaries in an execution of a protocol in the real model.

Definition 3.3 Let $f:(\{0,1\}^*)^n \to (\{0,1\}^*)^n$ be an n-party functionality and let π be a protocol computing $f$. The protocol π t-securely computes f with guaranteed output delivery (guaranteed output delivery) if for every non-uniform polynomial-time adversary $\mathcal{A}$ for the real model, there exists a non-uniform probabilistic (expected) polynomial-time adversary Sim for the ideal model, such that for every $\mathcal{J} \subseteq [n]$ with |I|≤t, the following two distributions are computationally indistinguishable:

$\{R_{EA}{}^L \pi,\mathcal{J},\mathcal{A}(z)(\bar{x},\lambda)\}_{(\bar{x},z) \in (\{0,1\}^*)^{n+1}, \kappa \in \mathbb{N}}$ and $\{\text{IDEA}\ L_{f,\mathcal{J},\text{Sim}(z)}(\bar{x},\lambda)\}_{(\bar{x},z) \in (\{0,1\}^*)^{n+1}, \kappa \in \mathbb{N}}$ Solitary Output. This disclosure considers the setting where the output is delivered to only one party $Q=P_n$. That is, consider functions $f$ where $f(x_1, \ldots, x_n)=(\bot, \ldots, \bot, y_n)$.

3. Cryptographic Primitives a) Digital Signatures

A digital signature scheme consists of the following three algorithms (Gen, Sign, Verify).

(skey, vkey)←Gen($1^\lambda$). A randomized algorithm that takes the security parameter A as input, and generates a verification-key vkey and a signing key skey.

σ←Sign(skey, m). A randomized algorithm that takes a message m and signing key skey as input and outputs a signature σ.

0/1←Verify(vkey, (m, σ)). A deterministic algorithm that takes a verification key vkey and a candidate message-signature pair (m, σ) as input, and outputs 1 for a valid signature and 0 otherwise.

The following correctness and security properties should be satisfied:

Correctness. For all λ∈ ℕ, all (vkey, skey)←Gen($1^\lambda$), any message m, Verify(vkey, m, Sign(skey, m))=1.

Unforgeability. A signature scheme is unforgeable if for any PPT adversary $\mathcal{A}$, the following game outputs 1 with negligible probability (in security parameter).

Initialize. Run (vkey, skey)←Gen($1^\lambda$). Give vkey to $\mathcal{A}$. Initiate a list $\mathcal{L}=\emptyset$.

Signing queries. On query m, return σ←Sign(skey, m). Run this step as many times as $\mathcal{A}$ desires. Then, insert m into the list $\mathcal{L}$.

Output. Receive output (m*, σ*) from $\mathcal{A}$. Return 1 if and only if Verify(vkey, (m*, σ*))=1 and m*∉ $\mathcal{L}$, and 0 otherwise.

b) Simulation-Extractible NIZK

A simulation-extractible non-interactive zero-knowledge (NIZK) argument for an NP language L with relation R consists of the following randomized algorithms (NIZK. Setup, NIZK. Prove, NIZK. Verify):

crs←NIZK. Setup($1^\lambda$): Given security parameter λ, it outputs a common reference string crs.

π←NIZK. Prove(crs, st, wit): Given crs, a statement x and witness w, outputs a proof π.

0/1←NIZK. Verify(crs, st, π): Given crs, a statement x and proof π, it outputs one bit.

It should satisfy the following correctness and security properties.

Completeness. For every security parameter π∈ ℕ, and any (st, wit)∈ R,

Pr[NIZK.Verify(crs,π,st)=1:←NIZK.Prove(crs,st,wit),
  crs←NIZK.Setup($1^\lambda$)]=1−negl(λ), where the probability is over the randomness of the three algorithms.

Zero Knowledge. For any malicious verifier $\mathcal{A}_V$, there exists a PPT simulator (NIZK. Sim. Setup, NIZK. Sim. Prove) such that for all (st, wit)∈ R:

$$(crs, \pi) \stackrel{c}{\approx} (simcrs, \pi^*)$$

where crs←NIZK. Setup($1^\lambda$), π←NIZK. Prove(crs, st, wit), (simcrs, td)←NIZK. Sim. Setup($1^\lambda$), π*←NIZK. Sim. Prove (td, st) and the probability is over the randomness of all algorithms.

Simulation Extractiblity. For any PPT cheating prover $\mathcal{A}_P$, there exists a PPT extractor NIZK. Sim. Ext such that for all st:

Pr[NIZK.Verify(simcrs,π*,st)=1∧wit=NIZK.Sim.Ext
  (td,π*,st)∧(st,wit)∉ R∧(st,π*)∉ $\mathcal{L}$]=negl(λ)

where $\pi^* = \mathcal{A}_P{}^{NIZK.Sim.Prove(td,\cdot)}$(simcrs, st), (simcrs, td)←NIZK. Sim. Setup($1^\lambda$), $\mathcal{L}$ is the set of ($st_i$, $\pi_i$) responses output by the oracle NIZK. Sim. Prove(simcrs,•) that $\mathcal{A}_P$ gets access to and the probability is over the randomness of all algorithms.

Languages Used. In the solitary MPC protocols presented in Sections IV.B.1 and Sections IV.C.1, consider two NP languages $L_1$, $L_2$ for the NIZK described below.

NP Language $L_1$:

Statement st=([[ x ]], pk) Witness wit=(x, ρ)

$R_1(st, wit)=1$ iff $[\![x]\!]$=dTFHE. Enc(pk, x; ρ).

NP Language $L_2$:

Statement st=($[\![x: sk]\!]$, $[\![x]\!]$, pk, i) Witnesswit=(sk, r)

$R_2$ (st, wit)=1 iff $[\![x: sk]\!]$=dTFHE. PartialDec(sk, $[\![x]\!]$) and (pk, sk)=dTFHE. DistGen($1^\lambda$, $1^d$, i; r).

Imported Theorem 1 ([CCH+19, PS19]). Assuming LWE, there exists a Simulation-Extractible NIZK argument system for all NP languages.

c) Threshold Fully Homomorphic Encryption

A t-out-of-n decentralized threshold fully homomorphic encryption scheme is defined, as in the work of Boneh et al. [BGG+18].

Definition 3.4 (Decentralized Threshold Fully Homomorphic Encryption (dTFHE)) Let $\mathcal{P}=\{P_1, \ldots, P_n\}$ be a set of parties. A dTFHE scheme is a tuple of PPT algorithms dTFHE=(dTFHE. DistGen, dTFHE. Enc, dTFHE. PartialDec, dTFHE. Eval, dTFHE. Combine) with the following properties:

($pk_i$, $sk_i$)←dTFHE. DistGen($1^\lambda$, $1^d$, i; $r_1$): On input the security parameter λ, a depth bound d, party index i and randomness $r_i$, the distributed setup algorithm outputs a public-secret key pair ($pk_i$, $sk_i$) for party $P_i$. Denote the public key of the scheme as pk=($pk_1 \| \ldots \| pk_n$).

$[\![m]\!]$←dTFHE. Enc(pk, m): On input a public key pk, and a plaintext m in the message space $\mathcal{M}$, the encryption algorithm outputs a ciphertext $[\![m]\!]$.

$[\![y]\!]$←dTFHE. Eval(pk, C, $[\![m_1]\!], \ldots, [\![m_k]\!]$): On input a public key pk, a circuit C of depth at most d that takes k inputs each from the message space and outputs one value in the message space, and a set of ciphertexts $[\![m_1]\!], \ldots, [\![m_k]\!]$ where k=poly(λ), the evaluation algorithm outputs a ciphertext $[\![y]\!]$.

$[\![m: sk_i]\!]$←dTFHE. PartialDec($sk_i$, $[\![m]\!]$): On input a secret key share $sk_i$ and a ciphertext $[\![m]\!]$, the partial decryption algorithm outputs a partial decryption $[\![m: sk_i]\!]$.

m/⊥←dTFHE. Combine(pk, $\{[\![m: sk_i]\!]\}_{i \in S}$): On input a public key pk and a set of partial decryptions $\{[\![m: sk_i]\!]\}_{i \in S}$ where S⊆[n], the combination algorithm either outputs a plaintext m or the symbol ⊥.

As in a standard homomorphic encryption scheme, it is required that a dTFHE scheme satisfies compactness, correctness and security. These properties are described below.'

Compactness. A dTFHE scheme is said to be compact if there exists polynomials $poly_1(\cdot)$ and $poly_2(\cdot)$ for all λ, all message spaces $\mathcal{M}$ with size of each message being $poly_3(\lambda)$, all k=poly(λ), depth bound d, circuit C: $\{0,1\}^{k \cdot poly_3(\lambda)} \to \{0,1\}^\lambda$ of depth at most d and $m_i \in \mathcal{M}$ for i∈[k], the following condition holds. Let ($pk_j$, $sk_j$)←dTFHE. DistGen($1^\lambda$, $1^d$, j) for all j∈[n], pk=($pk_1 \| \ldots \| pk_n$); let $[\![m_i]\!]$←dTFHE. Enc(pk, $m_i$) for all i∈[k]; compute $[\![y]\!]$←dTFHE. Eval(pk, C, $[\![m_1]\!], \ldots, [\![m_k]\!]$) and $[\![y: sk_j]\!]$←dTFHE. PartialDec($sk_j$, $[\![y]\!]$) for j∈[n], then it holds that $\|[\![y]\!]\| \leq poly_1(\lambda, n, d)$ and $\|[\![y: sk_j]\!]\| \leq poly_2(\Delta, n, d)$.

Evaluation Correctness. Informally, a dTFHE scheme is said to be correct if recombining partial decryptions of a ciphertext output by the evaluation algorithm returns the correct evaluation of the corresponding circuit on the underlying plaintexts. Formally, a dTFHE scheme satisfies evaluation correctness if for all λ, all message spaces $\mathcal{M}$ with size of each message being $poly_3(\lambda)$, all k=poly(λ), circuit C: $\{0,1\}^{k \cdot poly_3(\lambda)} \to \{0,1\}^\lambda$ of depth at most d and $m_i \in \mathcal{M}$ for i∈[k], the following condition holds. Let ($pk_j$, $sk_j$)←dTFHE. DistGen($1^\lambda$, $1^d$, j) for all j∈[n], pk=($pk_1 \| \ldots \| pk_n$); let $[\![m]\!]$←dTFHE. Enc(pk, $m_i$) for all i∈[k] and $[\![y]\!]$←dTFHE. Eval(pk, C, $[\![m_1]\!], \ldots, [\![m_k]\!]$), for any S⊆[n], |S|=t, $\Pr[\text{dTFHE.Combine(pk,}\{\text{dTFHE.PartialDec}(sk_j, [\![y]\!])\}_{j \in S}) = C(m_1, \ldots, m_k)] \geq 1 - \text{negl}(\lambda)$.

Semantic Security. Informally, a dTFHE scheme is said to provide semantic security if a PPT adversary cannot efficiently distinguish between encryptions of arbitrarily chosen plaintext messages $m_0$ and $m_1$, even given the secret key shares corresponding to a subset S of the parties for any set S of size at most (t−1). Formally, a dTFHE scheme satisfies semantic security if for all λ, all depth bound d, message space $\mathcal{M}$, for any PPT adversary $\mathcal{A}$, the following experiment $\text{Expt}_{dTFHE,sem}(1^\lambda)$ outputs 1 with negligible probability:

$\text{Expt}_{dTFHE,sem}(1^\lambda, 1^d)$:

1. On input the security parameter $1^\lambda$, circuit depth $1^d$, the message space $\mathcal{M}$ and the number of parties n, the adversary $\mathcal{A}$ outputs a set S of size at most (t−1) and two messages $m_0, m_1 \in \mathcal{M}$.

2. The challenger generates ($pk_j$, $sk_j$)←dTFHE. DistGen($1^\lambda$, $1^d$, j) for all j∈[n], sets pk=($pk_1 \| \ldots \| pk_n$) and provides (pk, $\{sk_i\}_{i \in S}$) along with dTFHE. Enc(pk, $m_b$) to $\mathcal{A}$ where b is picked uniformly at random.

3. $\mathcal{A}$ outputs a guess b'. The experiment outputs 1 if b=b'.

Simulation Security. Informally, a dTFHE scheme is said to provide simulation security if there exists an efficient algorithm dTFHE. Sim that takes as input a circuit C, a set of ciphertexts $[\![m_1]\!], \ldots, [\![m_k]\!]$ the output of C on the corresponding plaintexts, and outputs a set of partial decryptions corresponding to some subset of parties, such that its output is computationally indistinguishable from the output of a real algorithm that homomorphically evaluates the circuit C on the ciphertexts $[\![m_1]\!], \ldots, [\![m_k]\!]$ and outputs partial decryptions using the corresponding secret key shares for the same subset of parties. In particular, the computational indistinguishability holds even when a PPT adversary is given the secret key shares corresponding to a subset S of the parties, so long as dTFHE. Sim also gets the secret key shares corresponding to the parties in S.

Formally, a dTFHE scheme satisfies simulation security if for all A, all depth bound d, message space $\mathcal{M}$, for any PPT adversary $\mathcal{A}$, there exists a simulator dTFHE. Sim such that the following two experiments $\text{Expt}_{dTFHE,Real}(1\lambda)$ and $\text{Expt}_{dTFHE,Ideal}(1\lambda)$ are computationally indistinguishable.

$\text{Expt}_{dTFHE,Real}(1^\lambda), 1^d$:

1. On input the security parameter $1^\lambda$, circuit depth d, the message space $\mathcal{M}$ and the number of parties n, the adversary $\mathcal{A}$ outputs a set S of size at most (t−1) and a set of messages $m_1, \ldots, m_k$ for k=poly(λ).

2. The challenger generates ($pk_j$, $sk_j$)←dTFHE. DistGen($1^\lambda$, $1^d$, j) for all j∈[n], sets pk=($pk_1 \| \ldots \| pk_n$) and provides (pk, $\{sk_j\}_{i \in S}$) along with $[\![m_i]\!]$←dTFHE. Enc(pk, $m_i$) for each i∈[k] to $\mathcal{A}$.

3. A issues a query with a circuit C. The challenger first computes $[\![y]\!]$←dTFHE. Eval(pk, C, $[\![m_1]\!], \ldots, [\![m_k]\!]$). Then, it outputs $\{\text{dTFHE. PartialDec}(sk_i, y)\}_{i \notin S}$ to $\mathcal{A}$.

4. At the end of the experiment, q outputs a distinguishing bit b.

$\text{Expt}_{dTFHE,Ideal}(1^\lambda), 1^d$:

1. On input the security parameter $1^\lambda$, circuit depth d, the message space $\mathcal{M}$ and the number of parties n, the adversary $\mathcal{A}$ outputs a set S of size at most (t−1) and a set of messages $m_1, \ldots, m_k$ for k=poly(λ).

2. The challenger generates $(pk_j, sk_j) \leftarrow$ dTFHE. DistGen $(1^\lambda, 1^d, j)$ for all $j \in [n]$, sets $pk=(pk_1 \| \ldots \| pk_n)$ and provides $(pk, \{sk_i\}_{i \in S})$ along with $[\![m_i]\!] \leftarrow$ dTFHE. Enc($pk, m_i$) for each $i \in [k]$ to $\mathcal{A}$.

3. $\mathcal{A}$ issues a query with a circuit C. The challenger outputs dTFHE. Sim(C, C($m_1, \ldots, m_k$), $[\![m_1]\!], \ldots, [\![m_k]\!], \{sk_i\}_{i \in S}$) to $\mathcal{A}$.

4. At the end of the experiment, $\mathcal{A}$ outputs a distinguishing bit b.

Imported Theorem 2 ([BGG+18]). Assuming LWE, there exists a TFHE scheme for every t-out-of-n threshold access structure.

F. Overview of Embodiments

As stated above, while a variety of solitary multi-party computation protocols are described herein, the present disclosure specifically identifies five protocols, labelled Protocols 1-5. These protocols are described in more detail in Sections III.D (Protocol 1) and Sections IV.E-H (Protocols 2-5 respectively).

As described in more detail below, with reference to FIG. 1, a system of participating devices (e.g., computers, smart phones, Internet of Things (IoT) devices, server computers, etc.) can perform a solitary MPC according to any of the five protocols (or any other MPC protocol described herein). These participating devices can comprise input devices, devices that provide an input to the solitary MPC, and a receiving device, a participating device that receives or produces the output to the MPC. The receiving device can also be an input device, i.e., the receiving device can provide an input to the solitary MPC.

Protocols according to embodiments can use a decentralized threshold fully homomorphic encryption (dTFHE) scheme in order to enable the participating devices to perform solitary MPC. The dTFHE scheme allows the participating devices to evaluate a function of the input shares (i.e., the inputs to the MPC) while those input shares are in encrypted form. The output of the MPC is likewise in encrypted form, and can be decrypted by the receiving device, enabling the receiving device to produce the output to the MPC.

Each participating device can possess a public key pk and a secret key share $sk_i$ corresponding to the public key and a particular participating device. Using the public key pk, a participating device can encrypt their respective input share to generate an encrypted input $[[x_i]]$. This encrypted input can be shared with other input devices (and in some protocols the receiving device), such that each device can receive the encrypted inputs corresponding to each other participating device.

Because the dTFHE scheme is fully homomorphic, the participating devices can calculate the encrypted output $[[y]]$ of an arbitrary function $f$ using the encrypted inputs $[[x_1]], \ldots, [[x_n]]$. For example, if the multi-party computation system is used to generate a diagnostic model (output y) based on health data (inputs $x_i$), the function $f$ can comprise a machine learning algorithm used to generate such a model. In this example, the encrypted output $[[y]]$ would comprise an encrypted instance of the model.

The secret key shares can be used to decrypt the encrypted output. However, a participating device would need all secret key shares in order to successfully decrypt the decrypted output. Because no single participating device possesses all secret key shares, no single participating device can decrypt the encrypted output and recover the output y. Instead, each participating device can partially decrypt the decrypted output using their respective secret key share $sk_i$, generating a partially decrypted output $[[y: sk_i]]$.

Each participating device can transmit their respective partially decrypted output to the receiving device. The receiving device can then use the dTFHE scheme to combine the partially decrypted outputs, thereby producing the decrypted output y.

It should be understood that the above description is intended only as a general overview of some embodiments of the present disclosure, used to facilitate a better understanding of these embodiments when they are described in more detail below. While the protocols described herein usually involve at least some of the steps described above, they may involve additional steps or modifications to the steps described.

Prior to describing systems and methods according to embodiments in more detail in Sections III and IV, the following subsections provide general descriptions of Protocols 1-5. These descriptions are not intended to be exact or restricting, and are instead only intended to generally characterize these protocols.

1. Protocol 1

Protocol 1 can refer to a broadcast-based solitary MPC protocol in the honest-majority setting according to some embodiments. Protocol 1 comprises a three-round protocol, in which the receiving device can provide an input to the MPC.

In general terms, Protocol 1 involves the modification of a non-solitary (sometimes referred to as "standard") MPC protocol in order to produce a solitary MPC protocol. This can be accomplished by "masking" the output of the MPC protocol using a random number r known only to the receiving device. Rather than, for example, using standard MPC to calculate the output y of a desired function $f$, the participating devices can calculate the masked output (e.g., y+r) of a function $f'$. While all participating devices may be able to compute the masked output (due to the use of standard MPC), only the retrieving device possess the random number r that can be used to unmask the masked output and produce the output y, hence the modified protocol is solitary.

Protocol 1 is described in more detail below in Sections III.B and III.D with reference to FIG. 2.

2. Protocol 2

Protocol 2 can refer to a PKI-based solitary MPC protocol according to some embodiments. In Protocol 2, the receiving device does not provide an input to the MPC and the protocol uses two communication rounds. Protocol 2 allows for zero or one corrupt, dishonest, or malicious participating devices.

In general terms, Protocol 2 involves the input devices generating encrypted inputs $[[x_i]]$ by encrypting their respective input shares and transmitting those input shares to one another. The input devices can also generate "input proofs" $\pi_i$, non-interactive zero knowledge (NIZK) proofs that prove that the input devices correctly encrypted their respective inputs. The input devices can additionally generate signatures $\sigma_i$ by digitally signing their encrypted inputs (and input proof) using a respective signing key. An input device can generate a tuple $([[x_i]], \pi_i, \sigma_i)$ comprising the encrypted input, the input proof, and the signature, and transmit that tuple to each other input device over point to point channels.

Each input device can verify the encrypted inputs produced by all other input devices participating in the MPC using the input proofs and signatures. If one input device behaved dishonestly (e.g., they did not correctly encrypt their input, the corresponding signature is invalid, they sent different encrypted inputs to different input devices, etc.), the honest input devices can identify this dishonest behavior during this verification step. If an input device behaved dishonestly, the remaining input devices can conclude that the receiving device is honest, since there is at most one dishonest device participating in the protocol. Hence, the honest input devices can transmit their input shares directly to the receiving device, allowing the receiving device to calculate the output of the MPC.

Otherwise, if none of the input devices behaved dishonestly, the input devices can participate in the MPC protocol as described above in Section I.F. That is, the input devices can combine their encrypted inputs to produce an encrypted output, partially decrypt the encrypted output using their respective secret key share $sk_i$, then send the partially decrypted outputs [y: $sk_i$] to the receiving device. The receiving device can then combine the partially decrypted outputs to produce the decrypted output y.

Figure 3:
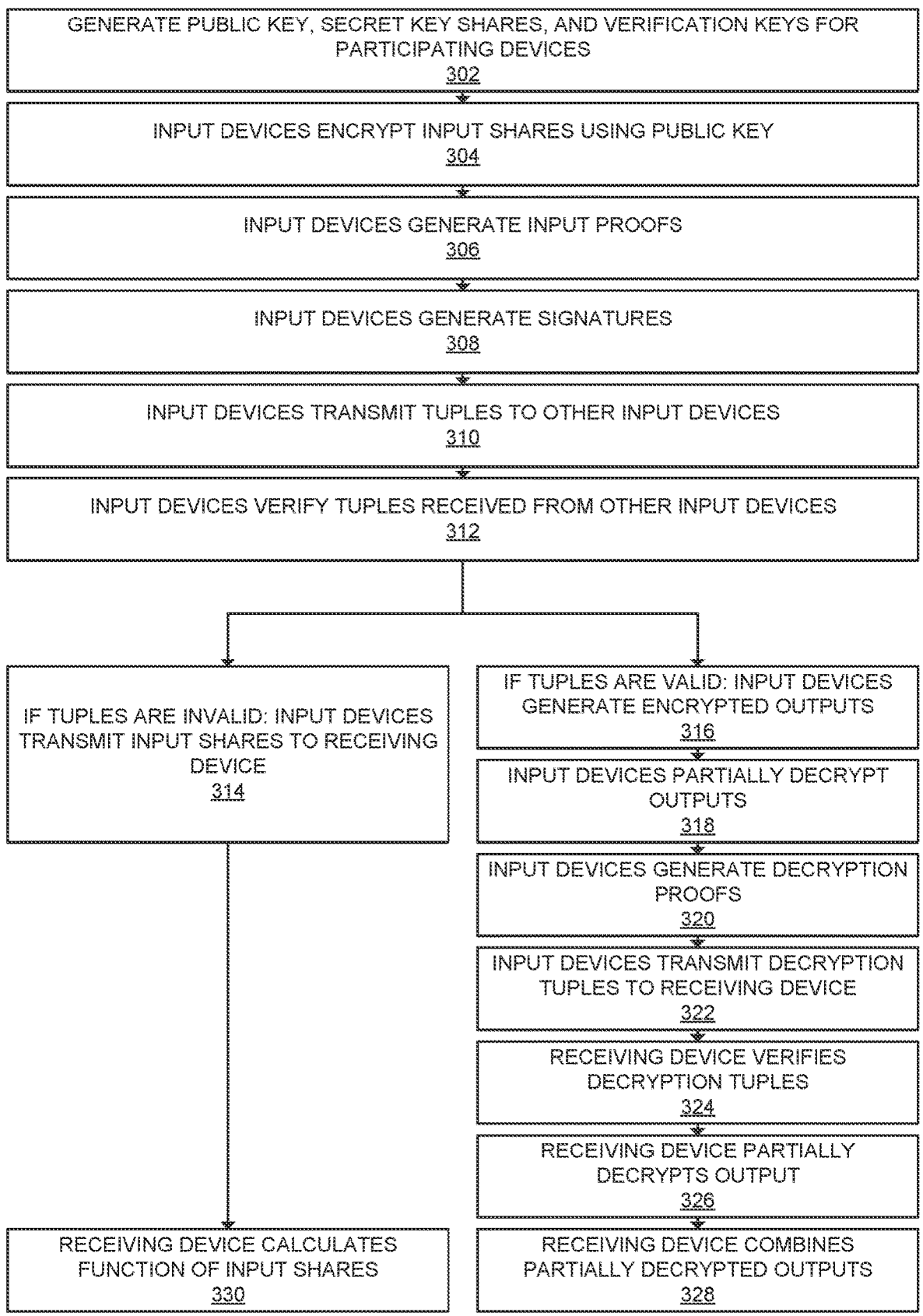
FIG. 3 shows a flowchart corresponding to an exemplary PKI-based MPC protocol (protocol 2) according to some embodiments.

Protocol 2 is described in more detail in Sections IV.C.2 and IV.E with reference to FIGS. 3 and 4

3. Protocol 3

Protocol 3 can refer to a PKI-based solitary MPC protocol according to some embodiments. In Protocol 3, the receiving device can provide an input to the MPC and the protocol uses three communication rounds. Like Protocol 2, Protocol 3 allows for zero or one corrupt, dishonest, or malicious participants.

Protocol 3 is similar to Protocol 2, except it involves an additional communication round in which the receiving device broadcasts its respective encrypted input to the other input devices. The other input devices share the encrypted inputs received from the receiving device among one another, in order to verify that the receiving device transmitted the same encrypted input to all the other input devices. The input devices can further verify the encrypted inputs received from the receiving device using, for example, input proofs and signatures included with the encrypted inputs.

Like Protocol 2, if the honest input devices determine that an input device is dishonest, the honest input devices can transmit their unencrypted input shares directly to the receiving device, enabling the receiving device to calculate the output of the function using the input shares corresponding to the input devices and the input share corresponding to the receiving device.

Figure 5:
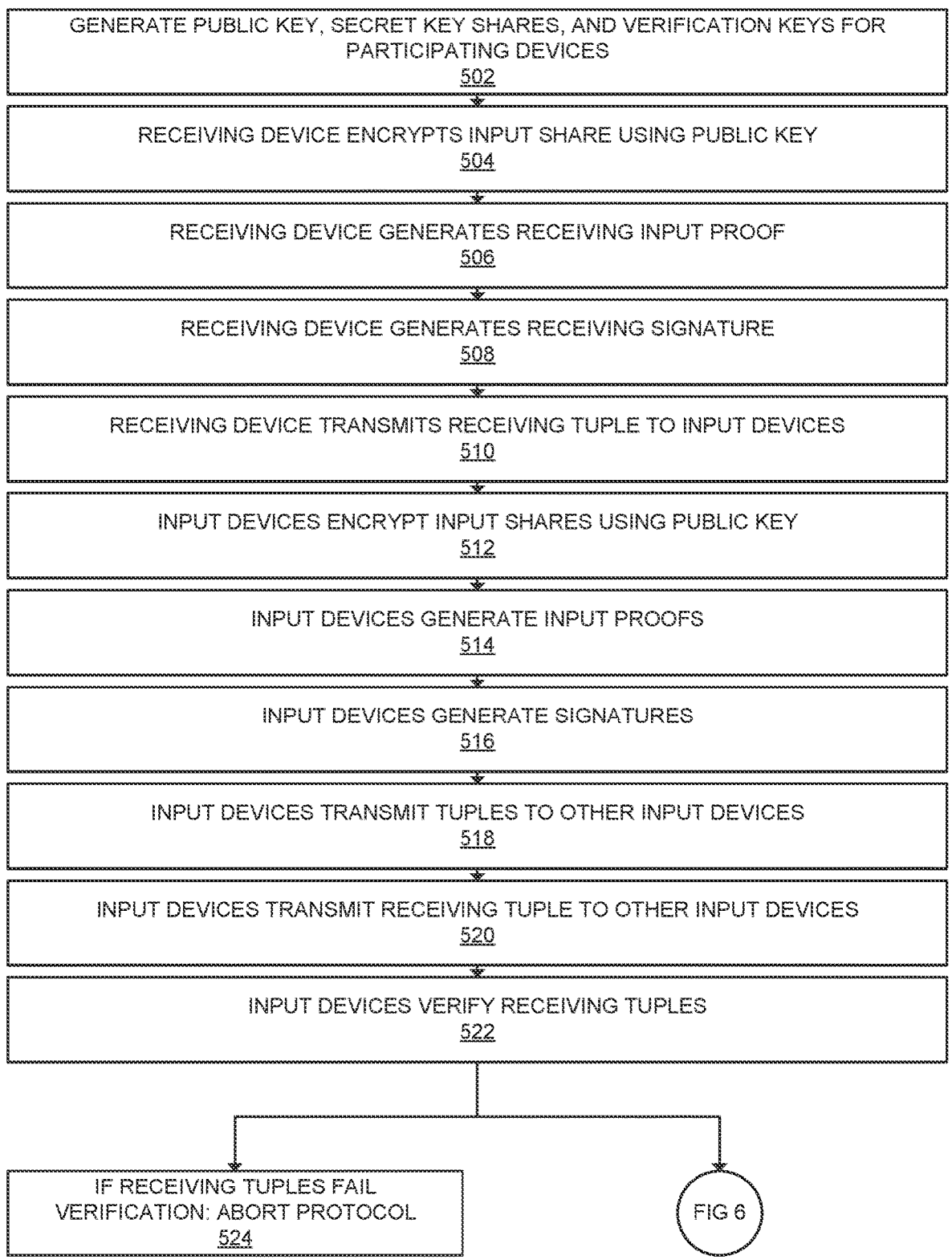
FIG. 5 shows a flowchart corresponding to a first part of an exemplary PKI-based MPC protocol, in which the receiving device provides an input (protocol 3), according to some embodiments.
Figure 6:
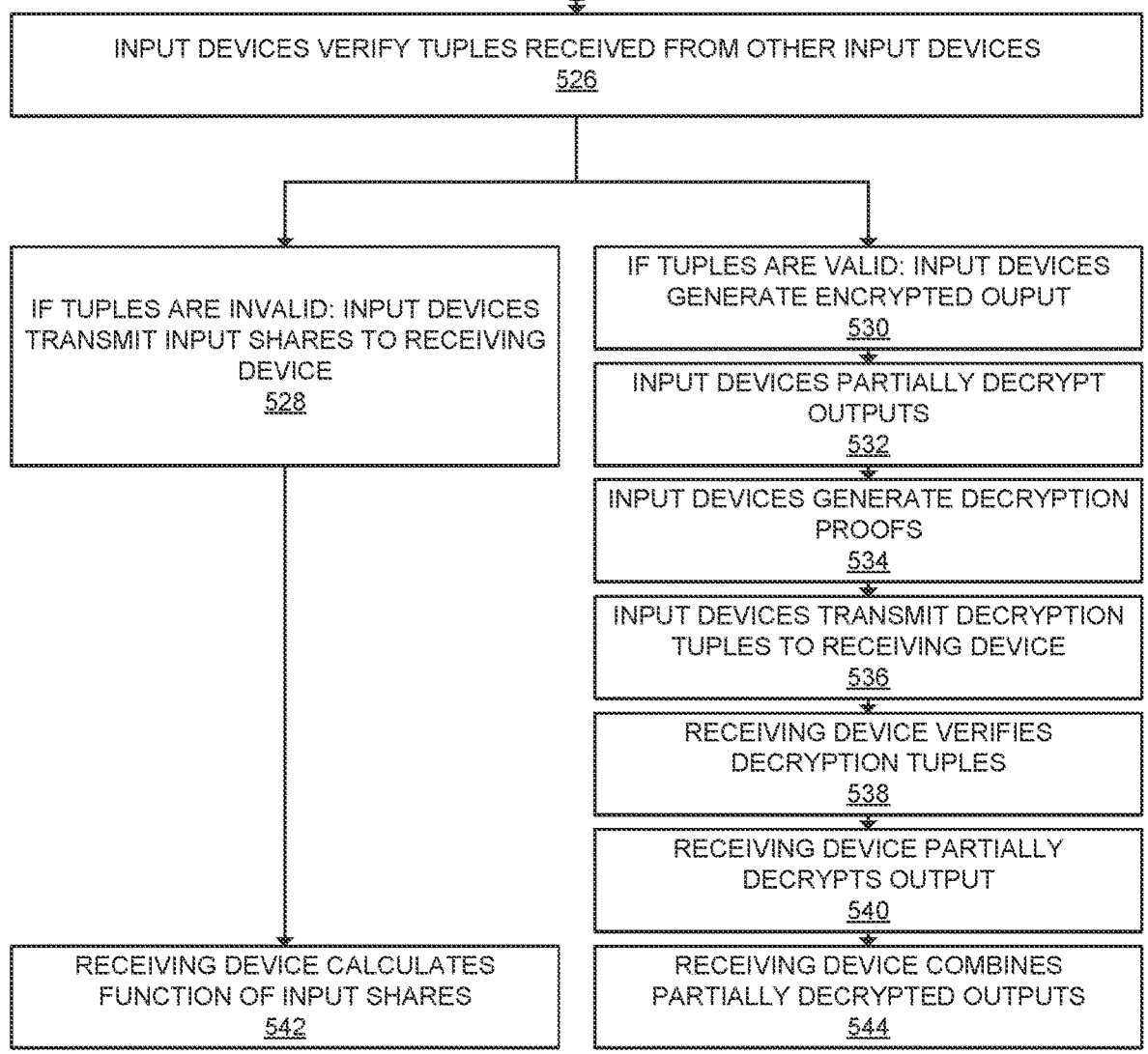
FIG. 6 shows a flowchart corresponding to a second part of an exemplary PKI-based MPC protocol, in which the receiving device provides an input (protocol 3), according to some embodiments.

Protocol 3 is described in more detail in sections IV.C.2 and IV.F with reference to FIGS. 5 and 6.

4. Protocol 4

Protocol 4 can refer to a PKI-based solitary MPC protocol according to some embodiments. Protocol 4 is a five-round protocol where the receiving device can provide an input. Unlike Protocols 2 and 3, Protocol 4 allows for any dishonest minority of participants.

Generally, like in Protocol 2, the input devices can generate tuples comprising encrypted inputs, input proofs, and signatures and transmit these tuples to one another over point-to-point channels. Additionally however, the input devices each transmit their tuple, along with all tuples they receive to the receiving device.

The receiving device can then establish a set or list of validated tuples. The receiving device can verify (using e.g., an input proof and a signature) each tuple received from the participating devices and determine if, for each input device, there is at least one valid tuple corresponding to, or originating from that input device. If such a tuple exists, the receiving device can include the tuple in the set of validated tuples. These validated tuples can subsequently be used by the receiving device and the input devices to generate the encrypted output. The receiving device can transmit the set of validated tuples in a message to the input devices.

The input devices can then share the message by transmitting it each other over point-to-point channels, in order to verify that the receiving device transmitted the same message to all of the input devices. The input devices can also verify each validated tuple in order to detect any malicious behavior by the receiving device or the other input devices. If the input devices encounter an issue (e.g., the input devices determine that the receiving device transmitted different messages to different input devices, or if the input devices determine that some or all of the validated tuples are invalid), the input devices can terminate the MPC. Otherwise, the input devices can use the encrypted inputs corresponding to the validated tuples to generate the encrypted output, partially decrypt the encrypted output, then send the partially decrypted outputs to the receiving device, thereby allowing the receiving device to combine the partially decrypted outputs and produce the decrypted output.

Protocol 4 is described in more detail in Sections IV.B.1 and IV.G with reference to FIGS. 7-10.

5. Protocol 5

Protocol 5 can refer to a PKI-based solitary MPC protocol according to some embodiments. Protocol 5 is a three-round protocol that allows for two corrupt, dishonest, or malicious parties.

Generally, Protocol 5 involves the "conditional disclosure" of the partially decrypted outputs [[y: $sk_i$]] to the receiving device. The honest input devices participating in Protocol 5 can use the knowledge that two participating devices are corrupt to inform this conditional disclosure. Because two devices are dishonest, there are two possible configurations of dishonest devices. Either two input devices are dishonest, or one input device is dishonest and the receiving device is dishonest. If the honest input devices determine that two input devices are dishonest, the honest input devices can conclude that the receiving device is honest and reveal their partially decrypted inputs to the receiving device. If the honest input devices determine that only one input device is dishonest, the honest input devices can conclude that the receiving device is dishonest and not reveal their partially decrypted outputs to the receiving device.

To this end, each input device $P_i$ generates a garbled circuit $GC_i$ that can be used produce a partially decrypted output [[y: $sk_i$]] partially decrypted using the secret key corresponding to the input device $sk_i$. After an initial round of communication in which the input devices generate their encrypted inputs and transmit them to each other, the input devices can generate and transmit their respective garbled circuits to the receiving device.

In order to produce the decrypted output, the receiving device can combine the partially decrypted outputs produced by each garbled circuit. However, in order to produce these partially decrypted outputs, the receiving device needs sets of garbled circuit labels corresponding to each garbled circuit. Broadly, the conditional disclosure aspect of Protocol 5 is achieved through these garbled circuits and garbled circuit labels. If the honest input devices determine that the receiving device is honest, the honest input devices can disclose the garbled circuit labels to the receiving device, enabling the receiving device to produce the partially decrypted outputs using the garbled circuits and combine the partially decrypted outputs to produce the decrypted output.

Figure 11:
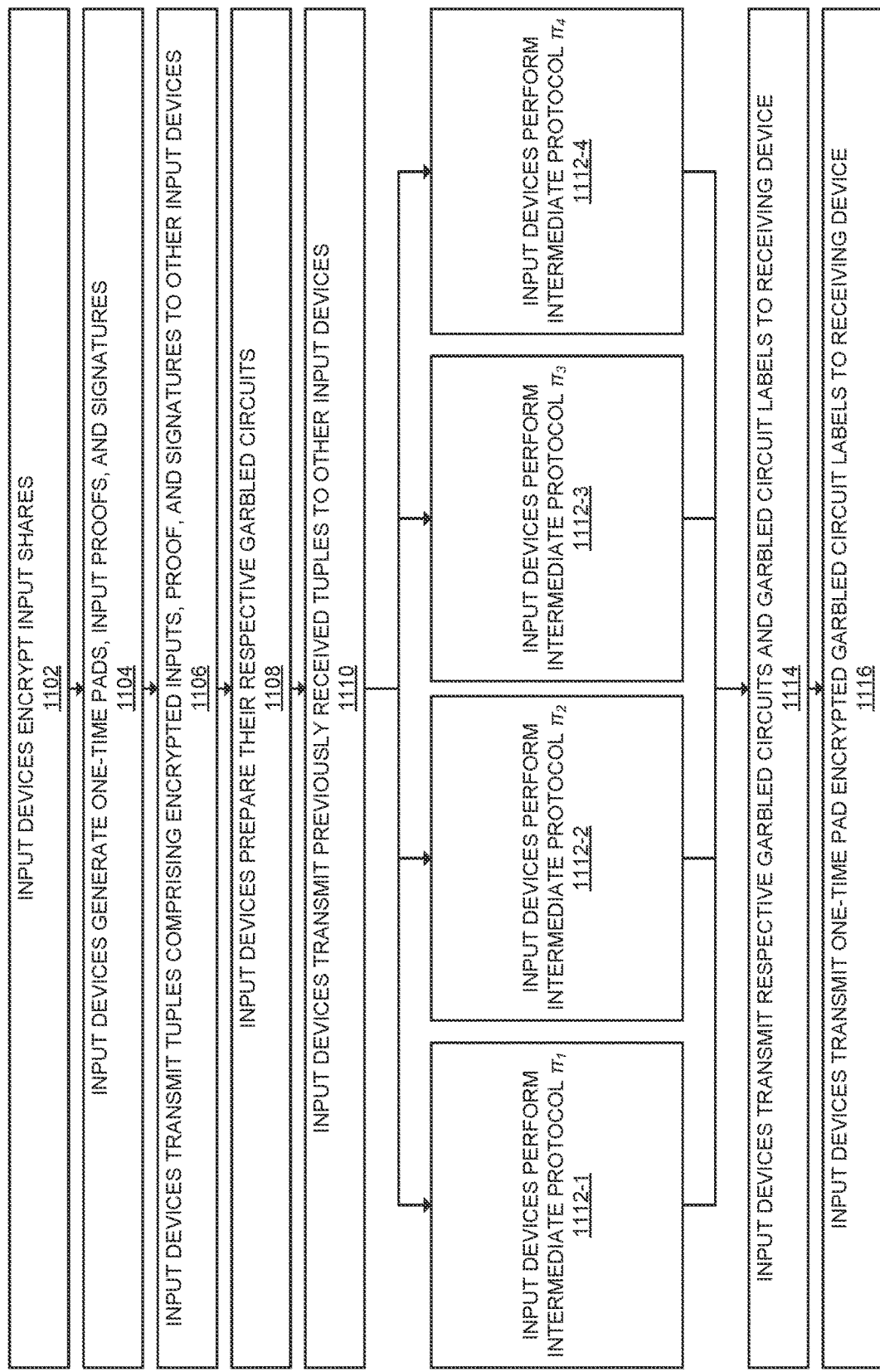
FIG. 11 shows a first part of a flowchart corresponding to an exemplary three round PKI-based MPC protocol (protocol 5) according to some embodiments.
Figure 12:
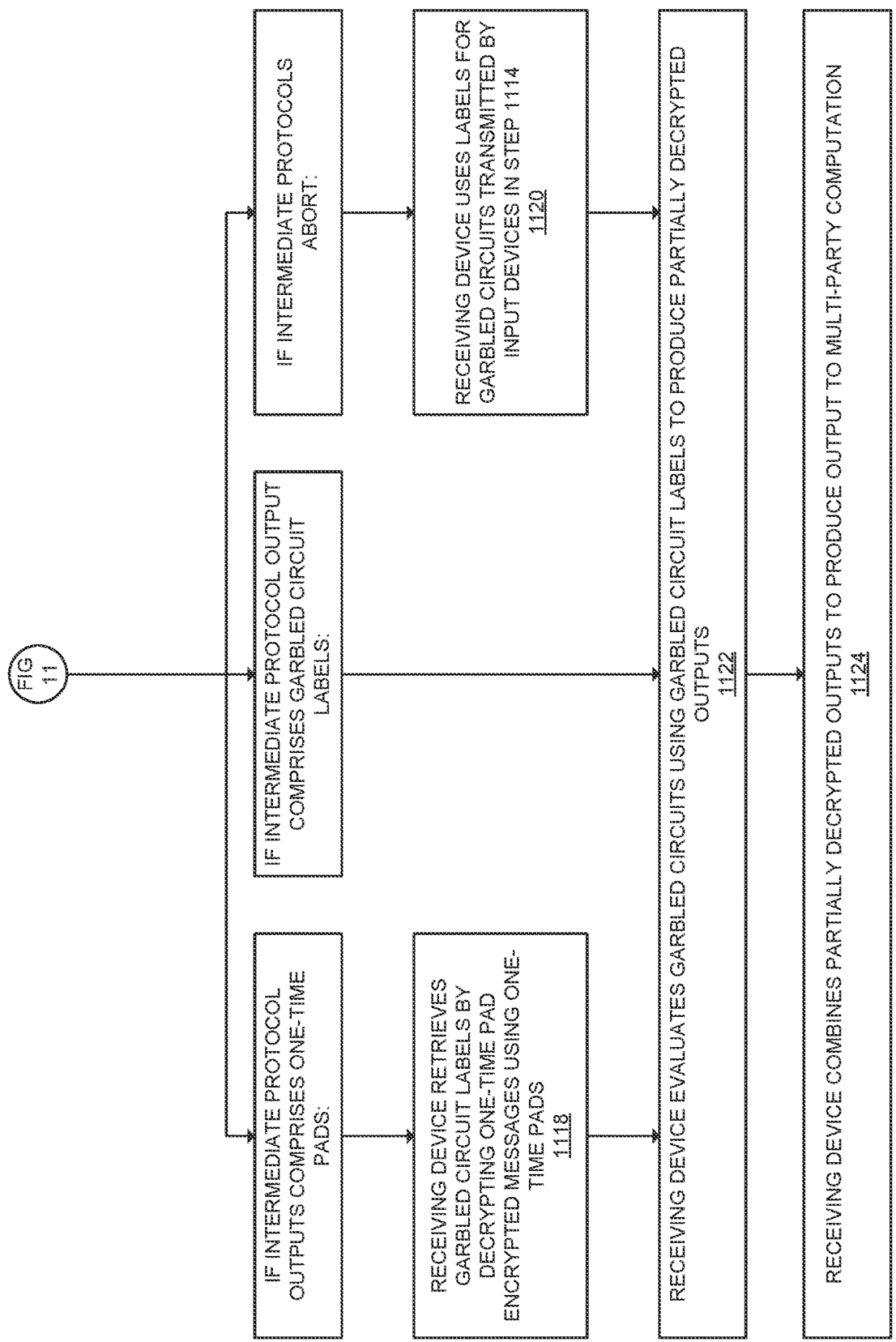
FIG. 12 shows a second part of a flowchart corresponding to an exemplary three round PKI-based MPC protocol (protocol 5) according to some embodiments.
Figure 13:
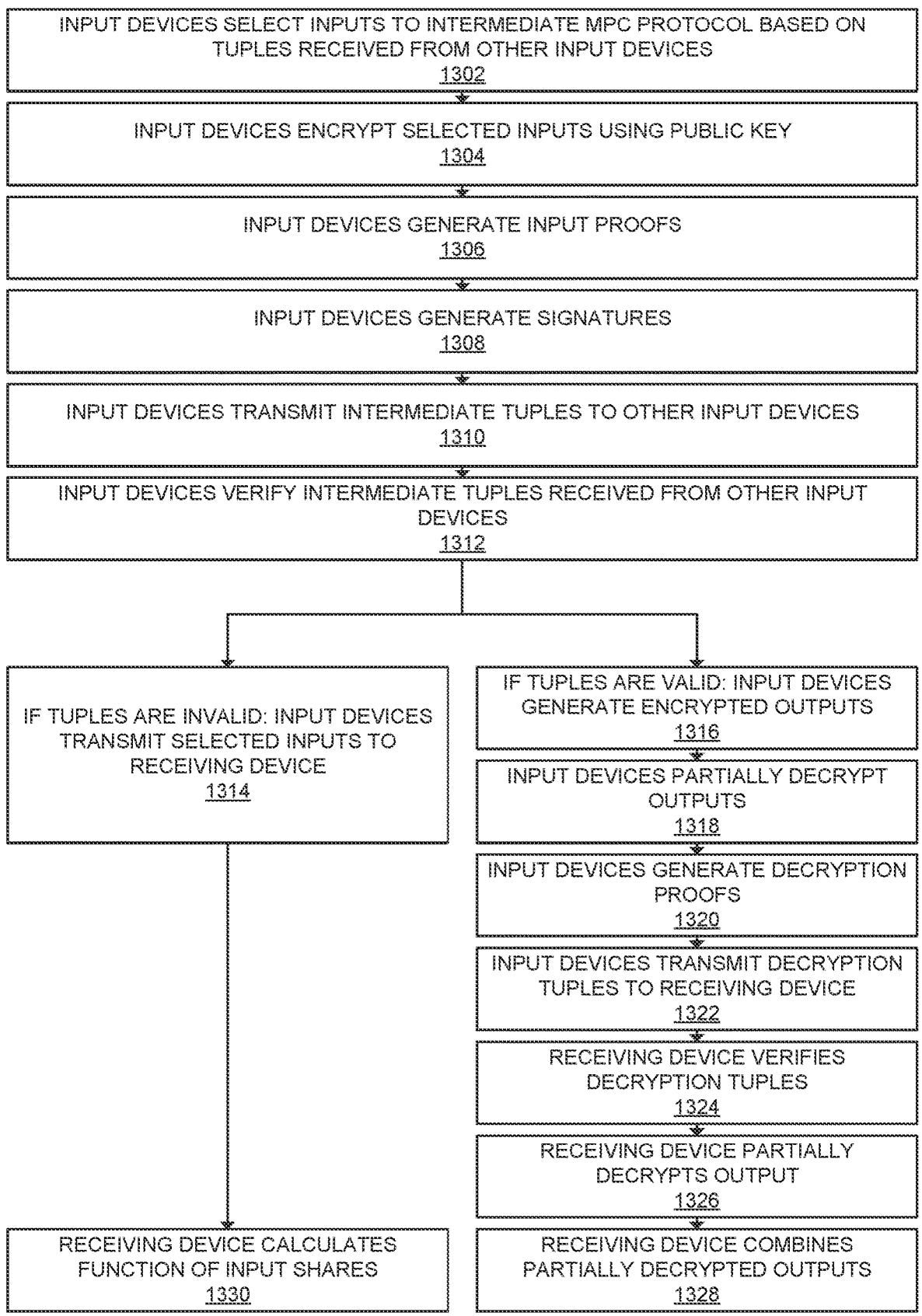
FIG. 13 shows a flowchart of an intermediate MPC protocol corresponding to the exemplary three round PKI-based MPC protocol (protocol 5) according to some embodiments.

Protocol 5 is described in more detail in Section IV.H with reference to FIGS. 11-13.

II. SYSTEM DIAGRAM

FIG. 1 shows a system block diagram corresponding to a solitary multi-party computation system with guaranteed output delivery according to some embodiments. The system may comprise a number of participating devices, including one or more input devices 102-108 and a receiving device 110, as well as a communication network 116. Some number of input devices may be honest (e.g., honest input devices 102 and 104). These honest input devices can perform the multi-party computation protocol as intended, without attempting to cheat or mislead the other participating devices. Some number of these input devices may be corrupt (e.g., corrupt input devices 106 and 108). These corrupt input devices can perform the multi-party computation incorrectly or attempt to deceive or mislead the other participating devices. For example, in a multi-party computation protocol where each input device is expected to transmit the same data to the other input devices, a corrupt input device may transmit different data to different input devices.

Different embodiments make different assumptions regarding the number of honest and corrupt input devices. For example, in "Protocol 2" described below, there may be one or zero corrupt input devices and any number of honest input devices (See Section IV.E). In "Protocol 5" described below, there may be exactly two corrupt devices (e.g., either two corrupt input devices or one corrupt input device and a corrupt receiving device, see Section IV.H), among five total participating devices.

Each input device 102-108 can encrypt and transmit their respective inputs to the other input devices, either via point-to-point channels or using a broadcast protocol. The input devices 102-108 (and optionally the receiving device 110) can each homomorphically calculate an encrypted output, based on the encrypted inputs. Each input device 102-108 (and optionally the receiving device 110) can partially decrypt their respective output. Subsequently, each input device 102-108 can transmit their respective partially decrypted output to the receiving device 110. The receiving device 110 can combine these partially decrypted outputs (e.g., in step 112) to produce a decrypted output 114 known only to the receiving device 110. In some embodiments, the receiving device 110 may provide its own input to the partial computation, and hence the receiving device may be an input device.

The input devices 102-108 and receiving device 110 may communicated with each other via a communication network (i.e., communication network 116), which can take any suitable form, and may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers and devices may be transmitted using a secure communications protocol, such as, but not limited to, File Transfer Protocol (FTP); HyperText Transfer Protocol (HTTP); Secure HyperText Transfer Protocol (HTTPS); Secure Socket Layer (SSL), ISO (e.g., ISO 8583) and/or the like.

The input devices 102-108 and receiving device 110 may communicate according to any appropriate communication protocol. For example, the input devices 102-108 and receiving device 110 can communicate according to a broadcast protocol, enabling each input device 102-108 to broadcast data (such as encrypted inputs) to each other input device 102-108 and the output device 110. Alternatively, the input devices 102-108 and receiving device 110 can communicate according to a PKI based protocol, e.g., one involving secure point-to-point channels. The input devices 102-108 and the receiving device 110 can perform key exchanges (e.g., Diffie-Hellman key exchanges or just use the public keys of the other devices) in order to establish secure channels between one another, enabling the input devices 102-108 and the receiving device 110 to encrypt, transmit, and decrypt messages sent between them.

At the end of the solitary MPC protocol, the receiving device 110 (and preferably none of the input devices 102-108) possesses a decrypted output to the computation. This could comprise, as in the example above, health statistics corresponding to sensitive patient health information.

The following Sections III and IV describe broadcast-based protocols and PKI-based protocols in more detail, respectively.

III. BROADCAST PROTOCOLS

This section relates to broadcast-based protocols, i.e., protocols corresponding to a network setting where the participating devices have access to a broadcast channel in addition to pairwise-private channels. In terms of protocol setup, all participating devices have access to a common reference string (CRS). The common reference string can be used by the participating devices to verify non-interactive zero-knowledge proofs, e.g., proving that an input has been encrypted correctly or that an output has been partially decrypted correctly.

This section presents a lower bound of three rounds for solitary MPC with guaranteed output delivery. A matching upper bound is implied by existing three-round constructions (e.g., in [GLS15, ACGJ18, BJMS18]) for general MPC with guaranteed output delivery. Further, in the upper bounds, only the first two rounds require the use of a broadcast channel. This section additionally shows the impossibility of designing a three round protocol where only the first and third rounds use a broadcast channel.

This section concludes with subsection III.D, which describes a broadcast protocol according to some embodiments of the present disclosure, designated Protocol 1.

A. Necessity of Three Rounds

This subsection shows that it is impossible to design a two-round solitary MPC with guaranteed output delivery in the presence of pairwise-private channels and a broadcast channel. This result holds in the presence of any common public setup such as CRS for any $1 \leq t < n/2$ corrupt parties, even against non-rushing adversaries and irrespective of whether the output receiving device (sometimes designated Q) provides an input or not.

Before presenting the proof, this subsection first analyzes whether the existing lower bounds of three rounds for guaranteed output deliver with respect to general MPC in the presence of an honest majority [GIKR02, GLS15, PR18] hold for solitary functionalities. It is observed that the arguments of [GLS15, PR18] exploit fairness (implied by guaranteed output delivery) in the following manner: those proofs proceed via adversarial strategies where one party gets the output and subsequently draw inferences banking on the property that another party must have also obtained the output in that case (due to fairness). Such arguments clearly break down in the context of solitary MPC.

Regarding the lower bound of [GIKR02] (which is shown with respect to functions of simultaneous broadcast, XOR and AND of two input bits), it is noted that it doesn't hold for solitary MPC due to the following: the argument which holds for t≥2 proceeds via a strategy where the adversary corrupts an input providing party $P_2$ and another carefully chosen party $P_j$ (j>2) who should receive the output. The identity of $P_j$ is determined by identifying the pair of consecutive hybrids which has a non-negligible difference among a sequence of hybrids corresponding to a specific distribution of outputs. This breaks down in case of solitary MPC, as Q is the only output receiving party and in their lower bound argument, the choice of $P_j$ may not necessarily result in Q always. Therefore, existing lower bounds leave the question open regarding the existence of two-round solitary MPC with guaranteed output delivery. This subsection shows that three rounds continue to remain the lower bound for guaranteed output delivery even if only a single party is supposed to obtain the output. Notably, the lower bound holds even for a non-rushing adversary. The formal theorem is stated below.

Theorem 4.1 Assume parties have access to CRS, pairwise-private channels and a broadcast channel. Then, there exists a solitary functionality $f$ such that no two-round MPC protocol can compute $f$ with guaranteed output delivery in the honest majority setting even against a non-rushing adversary.

Proof. For the sake of contradiction, suppose there exists a two-round solitary MPC with guaranteed output delivery, say Π which computes a three-party solitary function $f(x_1, x_2, x_3)$ among $\{P_1, P_2, P_3\}$ where $Q=P_3$ denotes the output receiving party. Note that at most one of the three parties can be controlled by the adversary.

Consider an execution of Π with inputs $(x_1, x_2, x_3)$ and analyze three different scenarios. For simplicity, assume the following about the structure of Π: (a) Round 2 involves only broadcast messages while Round 1 involves messages sent via both pairwise-private and broadcast channels. This holds without loss of generality since the parties can perform pairwise-private communication by exchanging random pads in the first round and then using these random pads to unmask later broadcasts [GIKR01]. (b) In Round 1, each pair of parties communicate via their pairwise-private channels (any protocol where a pair of parties does not communicate privately in Round 1 can be transformed to one where dummy messages are exchanged between them). (c) Round 2 does not involve any outgoing communication from Q (as Q is the only party supposed to receive the output at the end of Round 2).

Next, define the following useful notation: let $pc_{i \to j}$ denote the pairwise-private communication from $P_i$ to $P_j$ in Round 1 and $b_{i \to}^r$ denote the broadcast by $P_i$ in round r, where $r \in [2]$, $\{i,j\} \in [3]$. These messages may be a function of the CRS setup (say crs) as per protocol specifications. Let $View_i$ denotes the view of party $P_i$ which comprises of crs, its input $x_i$, randomness $r_i$ and all incoming messages.

Following is a description of the scenarios. In each of these scenarios, it is assumed that the adversary uses the honest input on behalf of the corrupt parties and its malicious behavior is limited to dropping some of the messages supposed to be sent by the actively corrupt parties.

Scenario 1: The adversary actively corrupts $P_2$ who behaves honestly in Round 1 towards $P_1$ but does not communicate privately to Q in Round 1. In more detail, $P_1$ sends messages $pc_{2 \to 1}$, $b_{2 \to}^1$ according to the protocol specification but drops the message $pc_{2 \to 3}$. In Round 2, $P_2$ aborts i.e does not send any messages.

Scenario 2: The adversary passively corrupts Q who behaves honestly throughout and learns output $f(x_1, x_2, x_3)$. Additionally, Q locally re-computes the output by emulating Scenario 1, namely when $P_2$ does not communicate privately to Q in Round 1 and aborts in Round 2. Specifically, Q can locally emulate this by discarding $pc_{2 \to 3}$ (private communication from $P_2$ to Q in Round 1) and $b_{2 \to}^2$ (broadcast communication from $P_2$ in Round 2).

Scenario 3: The adversary corrupts $P_1$ passively who behaves honestly throughout. $P_1$ also does the following local computation: locally emulate the view of Q as per Scenario 1 (from which the output can be derived) for various choices of inputs of $\{P_1, P_3\}$ while the input of $P_2$ i.e $x_2$ remains fixed. In more detail, $P_1$ does the following: let $(pc_{2 \to 1}, b_{2 \to}^1)$ be fixed to what was received by $P_1$ in the execution. Choose various combinations of inputs and randomness on behalf of $P_1$ and $P_3$. Consider a particular combination, say $\{(\widetilde{x_1}, \widetilde{r_1}), (\widetilde{x_3}, \widetilde{r_3})\}$. Use it to locally compute $\widetilde{b_{1 \to}^1}, \widetilde{b_{3 \to}^1}, \widetilde{pc_{1 \to 3}}, \widetilde{pc_{3 \to 1}}$. Next, locally compute $\widetilde{b_{1 \to}^2}$ using the Round 1 emulated messages which results in the complete view $\widetilde{View_3}$ of Q analogous to Scenario 1, where $\widetilde{View_3} = \{crs, \widetilde{x_3}, \widetilde{r_3}, \widetilde{b_{1 \to}^1}, b_{2 \to}^1, \widetilde{pc_{1 \to 3}}, \widetilde{b_{1 \to}^2}\}$ corresponds to the combination of inputs $(\widetilde{x_1}, x_2, \widetilde{x_3})$.

The views of the parties for each of the scenarios (where the views are identical for Scenarios 2 and 3 as they only involve passive corruptions) appear in Table 2.

TABLE 2

| | Views of $P_1, P_2, P_3$. | | | | | |
|---|---|---|---|---|---|---|
| | Scenario 1 | | | Scenario 2 & 3 | | |
| | $View_1$ | $View_2$ | $View_3$ | $View_1$ | $View_2$ | $View_3$ |
| Initial Input | $(x_1, r_1, crs)$ | $(x_2, r_2, crs)$ | $(x_3, r_3, crs)$ | $(x_1, r_1, crs)$ | $(x_2, r_2, crs)$ | $(x_3, r_3, crs)$ |
| Round 1 | $pc_{2 \to 1}$, $pc_{3 \to 1}$, $b_{2 \to}^1, b_{3 \to}^1$ | $pc_{1 \to 2}$, $pc_{3 \to 2}$, $b_{1 \to}^1, b_{3 \to}^1$ | $pc_{1 \to 3}$, -, $b_{1 \to}^1, b_{2 \to}^1$ | $pc_{2 \to 1}, pc_{3 \to 1}$, $b_{2 \to}^1, b_{3 \to}^1$ | $pc_{1 \to 2}$, $pc_{3 \to 2}$, $b_{1 \to}^1, b_{3 \to}^1$ | $pc_{1 \to 3}$, $pc_{2 \to 3}$, $b_{1 \to}^1, b_{2 \to}^1$ |
| Round 2 | — | $b_{1 \to}^2$ | $b_{1 \to}^2$ | $b_{2 \to}^2$ | $b_{1 \to}^2$ | $b_{1 \to}^2, b_{2 \to}^2$ |

The proof skeleton is as follows: first, it is claimed that Π must be such that if Scenario 1 occurs, then Q must obtain $f(x_1, x_2, x_3)$ with overwhelming probability. If not, then Π is susceptible to a potential attack by semi-honest Q (which enables Q to get multiple evaluations of $f$) that violates security. Intuitively, this inference captures Q's reliance on $P_1$'s messages in Round 2 and $P_2$'s broadcast in Round 1 to carry information about $x_2$ required for output computation.

Note that this information is available to $P_1$ at the end of Round 1 itself. Building on this intuition it is shown that $\Pi$ is such that an adversary corrupting $P_1$ passively can compute $f(\widetilde{x_1}, x_2, \widetilde{x_3})$ for any choice of $(\widetilde{x_1}, \widetilde{x_3})$, which is the final contradiction.

A sequence of lemmas are proven below to complete the proof.

Lemma 4.2 $\Pi$ must be such that if Scenario 1 occurs, then Q outputs $f(x_1, x_2, x_3)$ with overwhelming probability.

Proof. In Scenario 1, since $P_1$ and Q are honest, the correct output must be computed on $(x_1, x_3)$. Therefore, the correct output (which is output by Q with overwhelming probability due to correctness of $\Pi$) must correspond to either $y=f(x_1, x_2, x_3)$ or $y'=f(x_1, \bot, x_3)$, where $\bot$ denotes the default input of $P_2$. Assume, towards a contradiction, that $\Pi$ is such that if Scenario 1 occurs, then Q outputs $y'=f(x_1, \bot, x_3)$ with overwhelming probability. Note that the view locally emulated by a semi-honest Q in Scenario 2 is distributed identically to its view in Scenario 1. It can be inferred that $\Pi$ is such that if Scenario 2 occurs, then it allows a semi-honest Q to learn $f(x_1, \bot, x_3)$ with overwhelming probability. This is a contradiction to security of $\Pi$ as Q is not supposed to learn anything beyond the correct output in Scenario 2 (i.e $f(x_1, x_2, x_3)$ as all behave honestly in Scenario 2) as per the ideal functionality. It can thus be concluded that if Scenario 1 occurs, Q must output y (not y') with overwhelming probability.

Lemma 4.3 $\Pi$ is such that a semi-honest $P_1$ can compute the residual function $\widetilde{x_1}, x_2 \widetilde{x_3}$ ) (for different choices of $(\widetilde{x_1}, \widetilde{x_3})$) with overwhelming probability.

Proof. Firstly, it follows from Lemma 4.2 that the view of Q in Scenario 1 comprising of $\{crs, x_3, r_3, b_{1 \to}^1, b_{2 \to}^1, pc_{1 \to 3}, b_{1 \to}^2\}$ (refer to Table 2) results in output $f(x_1, x_2, x_3)$ with overwhelming probability. Now, suppose Scenario 3 occurs: $P_1$ can locally emulate the view of Q at the end of Scenario 1 (w.r.t different choices of inputs and randomness on behalf of $P_1$ and $P_3$ while the input of $P_2$ remains fixed). Specifically, the view emulated by $P_1$ for specific choice of $\widetilde{x_1}, \widetilde{x_3}$ ) is identically distributed to the view of Q at the end of Scenario 1 if it occurred with respect to $\widetilde{x_1}, x_2 \widetilde{x_3}$ ). It can thus be concluded that $P_1$ can carry out output computation (similar to Q in Scenario 1) to learn $\widetilde{x_1}, x_2 \widetilde{x_3}$ ) with overwhelming probability. Hence, $\Pi$ is such that it allows a semi-honest $P_1$ to learn $\widetilde{x_1}, x_2 \widetilde{x_3}$ ) for different choices of $\widetilde{x_1}, \widetilde{x_3}$ ) with overwhelming probability.

Lastly, note that the above attack by an adversary corrupting $P_1$ breaches privacy of honest $P_2$, for a large class of functions $f$ where the residual function leaks strictly more information than allowed. For instance, consider the solitary functionality $f$ (meant to give output only to Q) defined as follows: $f(x_1=b, x_2=(m_0, m_1), x_3=c)=m_{b \oplus c}$ where, b, c $\in \{0, 1\}$ denote single bits and $(m_0, m_1)$ denote a pair of messages input by $P_2$. It is easy to see that the residual function $\widetilde{x_1}, x_2 \widetilde{x_3}$ ) will leak both $m_0$ and $m_1$ which must not be allowed as per ideal realization of $f$. This is a contradiction to the assumption that the two-round protocol $\Pi$ is secure. This completes the proof of Theorem 4.1.

Circumvention of the Lower Bound. Before concluding this subsection, a couple of interesting circumventions of the lower bound are presented:

Using PKI: notably, the lower bound can be circumvented in the presence of private setup such as public-key infrastructure (PKI) due to the following reason: if a setup such as PKI is established, Q may hold some private information unknown to $P_1$ at the end of Round 1, such as the decryption of $P_2$'s Round 1 broadcast using its exclusive secret key. This may aid in output computation by Q; thereby the argument about the residual attack by $P_1$ (Lemma 4.3) does not hold. In fact, a two-round protocol achieving guaranteed output delivery can be designed in the presence of CRS and PKI setup as demonstrated by the work of [GLS15].

Single-input functions: Since the final contradiction relies on residual attack by $P_1$, it would not hold in case $f$ is a single-input function i.e., involves inputs provided only by single party. Notably, employing a protocol for single-input functions seems meaningful when the input holding party is different from the output receiving party i.e., Q. In such scenarios, when a function $f(x)$ is to be computed involving input x from a party $P_i \neq Q$, any existing two-round two-party secure computation protocol (also known as non-interactive secure computation) between $P_i$ and Q can be employed [IKO+11, AMPR14, CJS14, MR17, BGI+17]. This would trivially achieve guaranteed output delivery as the failure of the non-interactive secure computation protocol when Q is honest implies that $P_i$ is corrupt; enabling Q to simply compute $f$ on default input of $P_i$.

B. General Three-Round Protocol

In light of the lower bound of Section II.A., it is noted that the existing three-round upper bounds of [GLS15, ACGJ18, BJMS18] for general MPC are optimal for solitary MPC as well. This holds since any general MPC with global output (that gives same output to all) can be transformed to one with private output (which gives private output to selected parties, only Q in this context) [MZ13]. For the sake of completeness, recall this transformation: let C denote the private-output circuit (which gives output only to Q) computing the solitary function $f(x_1, \ldots, x_n)$. Then instead of evaluating C, the general MPC protocols of [GLS15, ACGJ18, BJMS18] can be used to evaluate a circuit C' (with global output) which takes as input $x_i$ from each $P_i$ and additionally a random pad r from Q to be used for 'blinding' the output of Q. C' evaluates C using the received inputs to compute $f(x_1, \ldots, x_n)=y$ and outputs y+r as the global output to all. This public output can be unmasked by Q to recover the desired private output $y=f(x_1, \ldots, x_n)$. Further, in these protocols, it is easy to observe only the first two rounds require the use of a broadcast channel while the third round messages can be sent over a point-to-point channel to Q.

C. Necessity of Broadcast in Round 2

Theorem 4.4 Assume parties have access to CRS and t≥2. Then, there exists an n-party solitary functionality $f$ such that no three-round MPC protocol securely computes $f$ with guaranteed output delivery in the honest majority setting, while making use of the broadcast channel only in Round 1 and Round 3 (pairwise-private channels can be used in all the rounds).

Proof. Consider the setting of n=5 and t=2. Suppose for the sake of contradiction that there exists a three-round solitary MPC protocol with guaranteed output delivery, say $\Pi$ that utilizes broadcast channel only in Round 1 and Round 3 (i.e. $\Pi$ uses broadcast and pairwise-private channels in Round 1 and Round 3; and only pairwise-private channels in Round 2).

Without loss of generality, assume for simplicity that $\Pi$ has the following structure: (a) No broadcast messages are sent during Round 3 and Round 3 involves only private messages sent to Q. This is w.l.o.g as any solitary MPC that uses broadcast in last round can be transformed to one where the messages sent via broadcast are sent privately only to Q (as Q is the only party supposed to receive output at the end of Round 3). (b) Round 2 does not involve messages from $P_i$ (i∈[4]) to Q (such a message is meaningful only if Q communicates to $P_i$ in Round 3, which is not the case as per (a)).

Let Π compute the solitary function $f(x_1, \ldots, x_5)$ among $\{P_1, \ldots, P_5\}$ where $Q=P_5$ denotes the output receiving party. The lower bound argument holds irrespective of whether $f$ involves an input from Q or not. For simplicity, let $f(x_1, \ldots, x_5)$ with $x_1=(L_0, L_1, b)$, $x_2=(\alpha, c)$, $x_3=M_0$, $x_4=M_1$ and $x_5=\perp$ be defined as $$f(x_1, \ldots, x_5) = (L_\alpha, M_{b \oplus c})$$

where b, c, $\alpha \in \{0,1\}$ and $L_0, L_1, M_0, M_1 \in \{0,1\}^\lambda$.

Consider an execution of Π with inputs $(x_1, \ldots, x_5)$ where $x_i$ denotes the input of $P_i$ and analyze four different scenarios. Before describing the scenarios, define some useful notation. Let $b_i^1$ denote the broadcast communication by $P_i$ in Round 1 when $P_i$ behaves honestly. In Rounds 1 and 2, let $pc_{i \to j}^r$ where $r \in [2]$, $\{i,j\} \in [5]$ denote the pairwise-private communication from $P_i$ to $P_j$ in Round r, as per an execution where everyone behaves honestly. Next, use $\widetilde{pc_{i \to j}^2}$ to denote the messages that $P_i$ (i∈[5]) is supposed to send in Round 2 to $P_j$ (j∈[4]\i) incase $P_i$ did not receive Round 1 message from $P_1$. Note that this communication could be potentially different from what $P_i$ would send in an honest execution. Lastly, since Round 3 messages to Q could potentially be different for each of the four scenarios, index them additionally with $\ell$ indicating the scenario i.e. $c_{j \to 5}^{3,\ell}$ denotes $P_j$'s Round 3 message to Q in Scenario $\ell$ (j∈[4], $\ell \in [4]$). These messages may be a function of the common reference string (denoted by crs). A party's view comprises of crs, its input, randomness and incoming messages.

Following is a description of the scenarios. In each of these scenarios, it is assumed that the adversary uses the honest input on behalf of the corrupt parties and its malicious behavior is limited to dropping some of the messages that were received or supposed to be sent by the actively corrupt parties.

Scenario 1: Adversary corrupts $P_1$. In Round 1, $P_1$ behaves honestly w.r.t. their broadcast communication and private message towards $P_2$ and Q, but drops their private message towards $P_3$ and $P_4$. Further, $P_1$ remains silent after Round 1 (i.e. does not communicate at all in Round 2 and Round 3). In other words, in Scenario 1, $P_1$ computes and sends only the following messages honestly: $b_1^1$, $pc_{1 \to 2}^1$ and $pc_{1 \to 5}^1$.

Scenario 2: Adversary corrupts $\{P_1, P_2\}$. $P_1$ behaves identical to Scenario 1. $P_2$ behaves honestly except that they drops his Round 3 message towards Q.

Scenario 3: Adversary corrupts $\{P_3, P_4\}$. In Round 1, $\{P_3, P_4\}$ behave honestly as per protocol steps. In Round 2, $\{P_3, P_4\}$ only communicate to $P_2$, towards whom they pretend that they did not receive Round 1 message from $P_1$ (i.e. $P_i$ sends $\widetilde{pc_{i \to 2}^2}$ to $P_2$ where i∈{3,4}). Lastly, $\{P_3, P_4\}$ remain silent in Round 3 i.e. do not communicate towards Q.

Scenario 4: Adversary corrupts $\{P_1, Q\}$. Q behaves honestly throughout the protocol. $P_1$ behaves as follows: in Round 1, $P_1$ behaves identical to Scenario 1 (i.e. behaves honestly w.r.t its broadcast communication and private message towards $P_2$ and Q; but drops his private message towards $P_3$ and $P_4$). In Round 2, $P_1$ behaves honestly only towards $P_2$ (but does not communicate to others). Lastly, $P_1$ sends its Round 3 message to Q as per Scenario 3 (i.e. as per protocol specifications when $P_1$ does not receive Round 2 message from $P_3$, $P_4$) (the communication in Round 3 among the corrupt parties is mentioned only for clarity).

The views of the parties across various scenarios are described in Tables 3-6. Recall that Round 2 does not involve any messages towards Q and Round 3 involves only incoming messages to Q based on the assumptions.

TABLE 3

Views of $\{P_1, \ldots, P_5\}$ in Scenario 1.

| | View$_1$ | View$_2$ | View$_3$ | View$_4$ | View$_5$ |
|---|---|---|---|---|---|
| Initial Input | $(x_1, r_1, crs)$ | $(x_2, r_2, crs)$ | $(x_3, r_3, crs)$ | $(x_4, r_4, crs)$ | $(x_5, r_5, crs)$ |
| Round 1 | $\{b_j^1\}_{j \in [5] \setminus \{1\}}$, $\{pc_{j \to 1}^1\}_{j \in [5] \setminus \{1\}}$ | $\{b_j^1\}_{j \in [5] \setminus \{2\}}$, $\{pc_{j \to 2}^1\}_{j \in [5] \setminus \{2\}}$ | $\{b_j^1\}_{j \in [5] \setminus \{3\}}$, $\{pc_{j \to 3}^1\}_{j \in [5] \setminus \{1,3\}}$ | $\{b_j^1\}_{j \in [5] \setminus \{4\}}$, $\{pc_{j \to 4}^1\}_{j \in [5] \setminus \{1,4\}}$ | $\{b_j^1\}_{j \in [5] \setminus \{5\}}$, $\{pc_{j \to 5}^1\}_{j \in [5] \setminus \{5\}}$ |
| Round 2 | $\{pc_{j \to 1}^2\}_{j \in \{2,5\}}$ $\{\widetilde{pc_{j \to 1}^2}\}_{j \in \{3,4\}}$ | $\{pc_{j \to 2}^2\}_{j \in \{5\}}$ $\{\widetilde{pc_{j \to 2}^2}\}_{j \in \{3,4\}}$ | $\{pc_{j \to 3}^2\}_{j \in \{2,5\}}$ $\{\widetilde{pc_{j \to 3}^2}\}_{j \in \{4\}}$ | $\{pc_{j \to 4}^2\}_{j \in \{2,5\}}$ $\{\widetilde{pc_{j \to 4}^2}\}_{j \in \{3\}}$ | — |
| Round 3 | — | — | — | — | $\{pc_{j \to 5}^{3,1}\}_{j \in \{2,3,4\}}$ |

TABLE 4

Views of $\{P_1, \ldots, P_5\}$ in Scenario 2.

| | View$_1$ | View$_2$ | View$_3$ | View$_4$ | View$_5$ |
|---|---|---|---|---|---|
| Initial Input | $(x_1, r_1, crs)$ | $(x_2, r_2, crs)$ | $(x_3, r_3, crs)$ | $(x_4, r_4, crs)$ | $(x_5, r_5, crs)$ |
| Round 1 | $\{b_j^1\}_{j \in [5] \setminus \{1\}}$, $\{pc_{j \to 1}^1\}_{j \in [5] \setminus \{1\}}$ | $\{b_j^1\}_{j \in [5] \setminus \{2\}}$, $\{pc_{j \to 2}^1\}_{j \in [5] \setminus \{2\}}$ | $\{b_j^1\}_{j \in [5] \setminus \{3\}}$, $\{pc_{j \to 3}^1\}_{j \in [5] \setminus \{1,3\}}$ | $\{b_j^1\}_{j \in [5] \setminus \{4\}}$, $\{pc_{j \to 4}^1\}_{j \in [5] \setminus \{1,4\}}$ | $\{b_j^1\}_{j \in [5] \setminus \{5\}}$, $\{pc_{j \to 5}^1\}_{j \in [5] \setminus \{5\}}$ |
| Round 2 | $\{pc_{j \to 1}^2\}_{j \in \{2,5\}}$ $\{\widetilde{pc_{j \to 1}^2}\}_{j \in \{3,4\}}$ | $\{pc_{j \to 2}^2\}_{j \in \{5\}}$ $\{\widetilde{pc_{j \to 2}^2}\}_{j \in \{3,4\}}$ | $\{pc_{j \to 3}^2\}_{j \in \{2,5\}}$ $\{\widetilde{pc_{j \to 3}^2}\}_{j \in \{4\}}$ | $\{pc_{j \to 4}^2\}_{j \in \{2,5\}}$ $\{\widetilde{pc_{j \to 4}^2}\}_{j \in \{3\}}$ | — |
| Round 3 | — | — | — | — | $\{pc_{j \to 5}^{3,2}\}_{j \in \{3,4\}}$ |

TABLE 5

Views of $\{P_1, \ldots, P_5\}$ in Scenario 3.

| | View$_1$ | View$_2$ | View$_3$ | View$_4$ | View$_5$ |
|---|---|---|---|---|---|
| Initial Input | $(x_1, r_1, crs)$ | $(x_2, r_2, crs)$ | $(x_3, r_3, crs)$ | $(x_4, r_4, crs)$ | $(x_5, r_5, crs)$ |
| Round 1 | $\{b_j^1\}_{j\in[5]\setminus\{1\}}$, $\{pc_{j\to1}^1\}_{j\in[5]\setminus\{1\}}$ | $\{b_j^1\}_{j\in[5]\setminus\{2\}}$, $\{pc_{j\to2}^1\}_{j\in[5]\setminus\{2\}}$ | $\{b_j^1\}_{j\in[5]\setminus\{3\}}$, $\{pc_{j\to3}^1\}_{j\in[5]\setminus\{3\}}$ | $\{b_j^1\}_{j\in[5]\setminus\{4\}}$, $\{pc_{j\to4}^1\}_{j\in[5]\setminus\{4\}}$ | $\{b_j^1\}_{j\in[5]\setminus\{5\}}$, $\{pc_{j\to5}^1\}_{j\in[5]\setminus\{5\}}$ |
| Round 2 | $\{pc_{j\to1}^2\}_{j\in\{2,5\}}$ | $\{pc_{j\to2}^2\}_{j\in\{1,5\}}$ $\{\overline{pc_{j\to2}^2}\}_{j\in\{3,4\}}$ | $\{pc_{j\to3}^2\}_{j\in\{1,2,5\}}$ | $\{pc_{j\to4}^2\}_{j\in\{1,2,5\}}$ | — |
| Round 3 | — | — | — | — | $\{pc_{j\to5}^{3,3}\}_{j\in\{1,2\}}$ |

TABLE 6

Views of $\{P_1, \ldots, P_5\}$ in Scenario 4.

| | View$_1$ | View$_2$ | View$_3$ | View$_4$ | View$_5$ |
|---|---|---|---|---|---|
| Initial Input | $(x_1, r_1, crs)$ | $(x_2, r_2, crs)$ | $(x_3, r_3, crs)$ | $(x_4, r_4, crs)$ | $(x_5, r_5, crs)$ |
| Round 1 | $\{b_j^1\}_{j\in[5]\setminus\{1\}}$, $\{pc_{j\to1}^1\}_{j\in[5]\setminus\{1\}}$ | $\{b_j^1\}_{j\in[5]\setminus\{2\}}$, $\{pc_{j\to2}^1\}_{j\in[5]\setminus\{2\}}$ | $\{b_j^1\}_{j\in[5]\setminus\{3\}}$, $\{pc_{j\to3}^1\}_{j\in[5]\setminus\{1,3\}}$ | $\{b_j^1\}_{j\in[5]\setminus\{4\}}$, $\{pc_{j\to4}^1\}_{j\in[5]\setminus\{1,4\}}$ | $\{b_j^1\}_{j\in[5]\setminus\{5\}}$, $\{pc_{j\to5}^1\}_{j\in[5]\setminus\{5\}}$ |
| Round 2 | $\{pc_{j\to1}^2\}_{j\in\{2,5\}}$ | $\{pc_{j\to2}^2\}_{j\in\{1,5\}}$ | $\{pc_{j\to3}^2\}_{j\in\{2,5\}}$ | $\{pc_{j\to4}^2\}_{j\in\{2,5\}}$ | — |
| Round 3 | $\{\overline{pc_{j\to1}^2}\}_{j\in\{3,4\}}$ | $\{\overline{pc_{j\to2}^2}\}_{j\in\{3,4\}}$ | $\{\overline{pc_{j\to3}^2}\}_{j\in\{4\}}$ | $\{\overline{pc_{j\to4}^2}\}_{j\in\{3\}}$ | $\{pc_{j\to5}^{3,4}\}_{j\in\{1,2\}} =$ $\{pc_{j\to5}^{3,3}\}_{j\in\{1,2\}}$ $\{pc_{j\to5}^{3,4}\}_{j\in\{3,4\}} =$ $\{pc_{j\to5}^{3,2}\}_{j\in\{3,4\}}$ |

A sequence of inferences is presented below.

Lemma 4.5. Π must be such that if Scenario 1 occurs, then the output obtained by Q must be $y'=f(x_{1'}, x_2, x_3, x_4, x_5)$ with non-negligible probability, where $x_{1'} \neq x_1$.

Proof. Suppose Scenario 1 occurs. First, it follows from the guaranteed output delivery property of Π that Q obtains an output, say $y' \neq \bot$, with overwhelming probability. Correctness dictates that y' should be computed w.r.t honest inputs of $\{P_2, P_3, P_4, P_5\}$. With respect to the input of $P_1$, assume towards a contradiction that $y'=f(x_{1'}, x_2, x_3, x_4, x_5)$ where $x_{1'} \neq x_1$ with negligible probability, namely $x_{1'}=x_1$ with overwhelming probability. Then, below demonstrates an adversarial strategy that breaches security of Π.

Consider a scenario (say S*) where an adversary corrupts $\{P_2, Q\}$ passively and honest $P_1$ participates with input $x_1=(L_0, L_1, b)$. It is claimed that the adversary can compute $f(x_1, x_2', x_3', x_4', x_5')$ for any choice of $(x_2', x_3', x_4', x_5')$ with overwhelming probability. This can be done by emulating Scenario 1 as follows: the adversary chooses the set of inputs $(x_2', x_3', x_4', x_5')$ and randomness on behalf of $\{P_2, P_3, P_4, P_5\}$. Next, they fix the messages $b_1^1$, $pc_{1\to2}^1$ and $pc_{1\to5}^1$ as received from $P_1$ in Round 1 (on behalf of $\{P_2, Q\}$). Recall that $\{b_1^1, pc_{1\to2}^1, pc_{1\to5}^1\}$ constitutes the only communication from $P_1$ in Scenario 1. Therefore, the adversary in S* can locally compute a view that is identically distributed to the view of an honest Q in Scenario 1 w.r.t set of inputs $(x_1, x_2', x_3', x_4', x_5')$.

Based on the assumption above, this view would allow the adversary to locally compute $f(x_1, x_2', x_3', x_4', x_5')$ with overwhelming probability. This breaches privacy of honest $P_1$ in S*, as the adversary can obtain both $L_0$ and $L_1$ (by locally computing output based on $x_2'=(0, c)$ and $x_2''=(1, c)$); leading to a contradiction. It can thus be concluded that in Scenario 1, y' obtained by Q must be computed on $x_{1'} \neq x_1$ with non-negligible probability.

Lemma 4.6. Π must be such that Q obtains the same output in Scenario 1 and 2 with overwhelming probability.

Proof. Observe that Scenario 1 and 2 proceed identically until Round 3. The only difference is that $P_2$ drops its Round 3 message to Q. Thereby, infer that the view of Q in Scenario 2 is subsumed by its view in Scenario 1 (refer to Table 3-4).

Towards a contradiction, assume Q obtains output $y \neq y'$ in Scenario 2 (where y' denotes the output of Q in Scenario 1) with non-negligible probability. Then there exists an adversarial strategy that allows the adversary to get multiple evaluations of the function $f$—Consider a scenario S' where the adversary corrupts $\{P_1, Q\}$. Suppose misbehavior of corrupt $P_1$ is identical to Scenario 1 and Q is passively corrupt. Since view of Q in Scenario S' is identically distributed to its view in Scenario 1, they can compute y' with non-negligible probability (Lemma 4.5). Further, passive Q can emulate Scenario 2 by simply discarding the Round 3 message from $P_2$ in Scenario S'. This will allow the adversary to obtain the output of Scenario 2 i.e. $y' \neq y$ as well (with non-negligible probability as per the assumption). This contradicts the security of Π (as adversary obtains multiple evaluations of $f$, w.r.t fixed inputs $x_3$ and $x_4$ belonging to honest parties). It can thus be concluded that $y \neq y'$ with negligible probability i.e., $y=y'$ with overwhelming probability.

Lemma 4.7. Π must be such that if Scenario 3 occurs, then the output obtained by Q must be computed on $x_1$ with overwhelming probability.

Proof. Suppose Scenario 3 occurs. Since $P_1$ and Q are honest, it follows from properties of guaranteed output delivery and correctness of Π that Q obtains output y #1 computed on $x_1$ (honest $P_1$'s input) with overwhelming probability.

Lemma 4.8. Π must be such that if Scenario 4 occurs, then the adversary corrupting $\{P_1, Q\}$ obtains multiple evaluations of $f$ with non-negligible probability.

Proof. Suppose Scenario 4 occurs. First, it is claimed that Q can obtain the output of Scenario 2 i.e. $y'=f(x_{1'}, x_2, x_3, x_4, x_5)$, where $x_{1'} \neq x_1$, (Lemma 4.5-Lemma 4.6) with non-negligible probability. Note that the Round 3 messages received by Q from $\{P_3, P_4\}$ in Scenario 4 is identically distributed to the respective messages in Scenario 2 (as views of $\{P_3, P_4\}$ in Scenarios 2 and 4 are identically distributed). It is now easy to check that Q's view in Scenario 4 subsumes its view in Scenario 2 (refer to Tables 4 and 6). Thus, Q must be able to learn $y'=f(x_1', x_2, x_3, x_4, x_5)$ where $x_2' \neq x_1$, with non-negligible probability.

Next, it is argued similarly that Q can obtain the output of Scenario 3 (say y) as well. This is because the Round 3 messages received by Q in Scenario 4 from corrupt $P_1$ (who pretends as if he did not receive Round 2 message from $\{P_3, P_4\}$) and honest $P_2$ (whose view is identically distributed to its view in Scenario 3) is identically distributed to the respective messages in Scenario 3. It is now easy to check that Q's view in Scenario 4 subsumes its view in Scenario 3 (refer to Tables 5-6). Thus, Q must be able to learn y i.e. the output of Scenario 3 which is computed w.r.t $x_1$ (Lemma 4.7) with overwhelming probability.

It can thus be concluded that in Scenario 4, Q obtains multiple evaluations of $f$ i.e. y (computed on $x_1$) and y' (computed on $x_1' \neq x_1$) with non-negligible probability.

According to Lemma 4.8, there exists an adversarial strategy that allows an adversary corrupting $\{P_1, Q\}$ to obtain multiple evaluations of $f$, while the inputs of honest parties $P_2$, $P_3$ and $P_4$ remains fixed. This breaches security of $\Pi$, leading to the final contradiction. As a concrete example, assume $x_1'$ and $x_1$ involve b=0 and b=1 respectively. Then, the adversary obtains both $M_0$ and $M_1$, which violates security of $\Pi$. This completes the proof of Theorem 4.4.

D. Protocol 1

One embodiment is directed to a three round broadcast-based solitary MPC protocol, designated "Protocol 1." The security details (including the security proof) and other technical information related to Protocol 1 (and similar broadcast-based protocols) is described above.

As described above in Section I.F.1, Protocol 1 involves the use of a modification to convert a non-solitary MPC protocol into a solitary MPC protocol. In addition to performing a standard (i.e., non-solitary) MPC protocol, The receiving device (i.e., the device corresponding to the party receiving the output of the solitary MPC) can generate a random number r known only to the receiving device. The receiving device and a plurality of input devices can use a standard MPC to calculate the output y of some function $f$ "masked" with the random number known to the receiving device, for example, y+r. Although the output of the multi-party computation (e.g., y+r) can be learned by all participating devices, only the receiving device knows r, and consequently, only the receiving party can unmask the masked output to retrieve the output y.

The term "participating devices" refers to all devices participating in the solitary MPC protocol (i.e., a plurality of input devices and a single receiving device). Although the receiving device can provide an input to the MPC, in the description below corresponding to FIG. 2, the term "input device" is used to refer to participating devices other than the receiving device.

Figure 2:
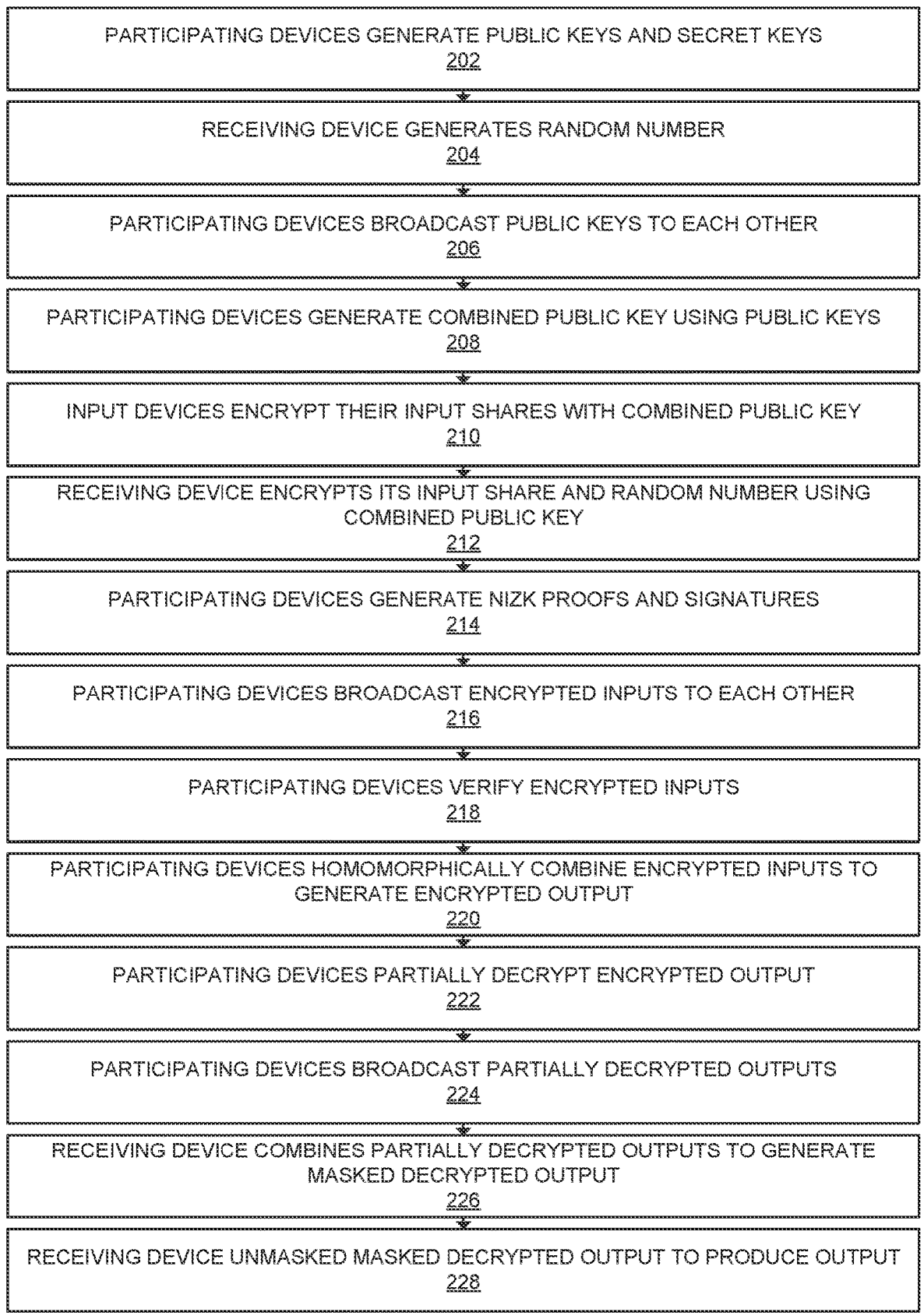
FIG. 2 shows a flowchart corresponding to an exemplary broadcast-based MPC protocol (protocol 1), according to some embodiments.

FIG. 2 shows a flowchart of an exemplary implementation of Protocol 1 according to some embodiments. The participating devices may have access to a common reference string that lets them verify non-interactive zero knowledge proofs. The participating devices may establish this common reference string prior to the steps described below.

In step 202, each participating device (e.g., a plurality of input devices and a single receiving device) in the MPC can generate a public key $pk_i$ and corresponding secret key $sk_i$ respectively. Alternatively, each participating device could have generated their respective public key and secret key prior to initiating the secure MPC protocol. Thus as an alternative, each participating device can retrieve their respective public key and secret key, from, for example, a computer readable medium, secure memory element, key store, etc.

In step 204, the receiving device can generate a random number r. The random number may comprise a "one-time pad." The random number may also be referred to as a masking value.

In step 206, the participating devices can broadcast their public keys $pk_i$ to each other participating device, such that each participating device receives the public key corresponding to each other participating device. More details on particular implementations of secure broadcasting protocols can be found in [FL82, DS83]. This step comprises the first round of the three broadcast rounds.

In step 208, the participating devices can each generate a combined public key PK using the public keys received in step 206 and the public key corresponding to the participating device that is generating the combined public key (i.e., all the public keys). Each participating device can now have a consistent copy of the combined public key PK.

In step 210, each input device can generate an encrypted input $[[x_i]]$ by encrypting its respective input share $x_i$ with the combined public key PK. The input devices can use a distributed threshold fully homomorphic encryption (dTFHE) scheme to encrypt their respective input shares. Such a scheme allows the participating devices to calculate a function of the respective input shares while those shares are in encrypted form, preserving input privacy.

In step 212, the receiving device can generate an encrypted input ($[[x_n]]$, $[[r]]$) by encrypting its input share $x_n$ and the random number r using the combined public key PK. In some embodiments, the receiving device may not have an input share, and may instead encrypted just the random number r using the combined public key.

Optionally, at step 214, the participating devices can each generate a non-interactive zero knowledge (NIZK) proof $\pi_i$, and a signature $\sigma_i$ corresponding to their respective encrypted inputs. A NIZK proof can prove that the corresponding input share was encrypted correctly without revealing any information about the input share itself. The NIZK proof may be verified using a common reference string (CRS) known by all participating devices. The signature may be used to verify the broadcaster of the encrypted input. Each participating device can generate their respective signature by digitally signing the corresponding encrypted input and NIZK proof using a cryptographic key, e.g., the secret key generated at step 202.

At step 216, the participating devices can broadcast their encrypted inputs to one another, such that each participating device receives the encrypted input corresponding to each other participating device. The participating devices can additionally broadcast their respective NIZK proofs and signatures to one another, enabling the other participating devices to verify the encrypted inputs. The encrypted input, proof, and signature may be broadcast in a single tuple ($[[x_i]]$, $\pi_i$, $\sigma_i$). This comprises the second of three broadcast rounds.

At step 218, the participating devices can verify the each of the encrypted inputs received in step 216. The encrypted inputs can be verified using their respective NIZK proofs and signatures. A participating device can verify that an encrypted input was generated correctly by verifying the corresponding NIZK proof $\pi_i$ using the common reference string. A participating device can verify the sender of an encrypted input using the signature $\sigma_i$ and a verification key. The verification key can comprise, for example, the public key corresponding to the broadcasting participating device, i.e., the public key broadcast by that participating device during step 206.

At step 220, each participating device can homomorphically combine the encrypted inputs to generate an encrypted output $f([[x_i]], [[x_i]], \ldots, [[x_n]], [[r]])=[[y+r]]$. The participating devices can use, for example, a garbled circuit in order to evaluate the function $f$. The encrypted output may comprise an (encrypted) output y (equal to, e.g., $f([[x_i]], [[x_i]], \ldots, [[x_n]])$) masked with the random number r. Although [[y+r]] is used as an example, the output y can be masked using any appropriate operator or technique. For example, the encrypted output could comprise [[y*r]] or [[y XOR r]], etc.

At step 222, each participating device can partially decrypt the encrypted output generated by that participating device to generate a partially decrypted output [[y+r: $sk_i$]]. Each participating device can generate their partially decrypted output by decrypting their encrypted output using their respective secret key $sk_i$. These partially decrypted outputs can later be combined in order to produce the decrypted masked output y+r.

At step 224, each participating device can broadcast their respective partially decrypted output [[y+r: $sk_i$]] to each other participating device, such that each participating device receives all of the partially decrypted outputs. This step comprises the third of the three broadcast rounds. As an alternative, the participating devices can transmit their respective partially decrypted outputs over point to point channels.

At step 226, the receiving device can homomorphically combine the partially decrypted outputs to generate a masked (decrypted) output y+r. The other participating devices (i.e., the plurality of input devices) can also homomorphically combine the partially decrypted outputs (provided they received the partially decrypted outputs during the broadcast round). However, because the input devices do not possess the random number r, they are unable to unmask and interpret the output.

At step 228, the receiving device can unmask the masked output y+r using the random number r to produce the output y. This can be accomplished, e.g., by subtracting the random number from the masked output, calculating the exclusive-or of the masked output and the random number, dividing the masked output by the random number, etc., depending on the particular masking method used.

IV. PUBLIC-KEY INFRASTRUCTURE PROTOCOLS

This section relates to PKI-based protocols, i.e., protocols corresponding to a network setting where the participating devices do not have access to a broadcast channel, and instead communicate over pairwise-private channels using public key infrastructure. In terms of protocol setup, the participating devices have access to a common reference string (CRS). The common reference string can be used by the participating devices to verify non-interactive zero knowledge (NIZK) proofs, e.g., proving that an input has been encrypted correctly or that an output has been partially decrypted correctly. This section concludes with Sections IV.E-H, which describe implementations of four PKI-based protocols, Protocols 2-5 respectively.

A. Four-Round Lower Bound with PKI and No Broadcast

In this subsection, a network setting where the parties have access to pairwise-private channels and PKI is assumed. It is shown that when t≥3, four rounds are necessary for solitary MPC with guaranteed output delivery. This holds irrespective of whether Q has input and even if the adversary is non-rushing. However, the argument relies on the presence of at least three corruptions (details appear at the end of this section) which leads the conjecture that there is a potential separation between the cases of t≤2 and t≥3 for solitary MPC. The special cases of t≤2 is investigated in Section IV.C and Section IV.D. The impossibility for the general case is formally stated below.

Theorem 5.1 Assume parties have access to CRS, PKI and pairwise-private channels. Then, there exists a solitary functionality $f$ such that no three-round MPC protocol can compute $f$ with guaranteed output delivery when 3≤t<n/2 even against a non-rushing adversary.

Proof. Consider the setting of n=7 and t=3. Suppose for the sake of contradiction that there exists a three-round solitary MPC protocol with guaranteed output delivery, say Π. Let H compute the solitary function $f(x_1, \ldots, x_7)$ among $\{P_1, \ldots, P_7\}$ where $Q=P_7$ denotes the output receiving party. The lower bound argument holds irrespective of whether $f$ involves an input from Q. For simplicity, let $f(x_1, \ldots, x_7)$ be defined as $$f(x_1, \ldots, x_7) = \begin{cases} (x_3, x_4, x_5) & \text{if } x_1 = \bot \\ x_6 & \text{otherwise} \end{cases}$$

where $\bot$ denotes default input of $P_1$

Without loss of generality, assume for simplicity that Π has the following structure: (a) Round 3 involves only messages sent to Q (as Q is the only party supposed to receive output at the end of Round 3). (b) Round 2 does not involve messages from $P_i$ (i∈[6]) to Q (such a message is meaningful only if Q communicates to $P_i$ in Round 3, which is not the case as per (a)).

Consider an execution of Π with inputs $(x_1, \ldots, x_7)$ where $x_i$ denotes the input of $P_i$ and analyze four different scenarios. Before describing the scenarios, define some useful notation. In Rounds 1 and 2, let $pc_{i \to j}^r$ where r∈[2], {i,j}∈[7] denote the pairwise-private communication from $P_i$ to $P_j$ in Round r, as per an execution where everyone behaves honestly. Next, use $\widetilde{pc_{i \to j}^2}$ to denote the messages that $P_i$ (i∈[7]) is supposed to send in Round 2 to $P_j$ (j∈[6]\i) incase $P_j$ did not receive Round 1 message from $P_1$. Note that this communication could be potentially different from what $P_i$ would send in an honest execution. Lastly, since Round 3 messages to Q could potentially be different for each of the four scenarios, The communications are indexed with $\ell$ indicating the scenario i.e p $c_{j \to 7}^{3,\ell}$ denotes $P_j$'s Round 3 message to Q in Scenario $\ell$ (j∈[6], $\ell$∈[4]). These messages may be a function of the common reference string (denoted by crs) and the PKI setup. Let $\alpha_t$ denote the output of the PKI setup to party $P_i$. A party's view comprises of crs, $\alpha_i$, its input, randomness and incoming messages.

Due to the involved nature of the scenarios, begin with an intuitive description. Broadly speaking, this argument involves partitioning the parties $\{P_1, \ldots, P_6\}$ into two sets $\{P_1, P_2, P_6\}$ and $\{P_3, P_4, P_5\}$. Looking ahead, the final scenario (corresponding to the final contradiction) is designed in a manner that allows a corrupt Q to obtain: (i) output with respect to a non-default input of $P_1$ using the communication from $\{P_1, P_2, P_6\}$ and (ii) output with respect to default input of $P_1$ using the communication from $\{P_3, P_4, P_5\}$. Tracing back, the other scenarios are designed in order to make the following inferences: Scenario 1 and 2 let one conclude that if $P_1$ behaves honestly only in its messages to $P_6$, then the communication from $\{P_3, P_4, P_5\}$ to Q in such a case must enable Q to obtain output with respect to default input of $P_1$. On the other hand, Scenario 3 involves corrupt $\{P_3, P_4, P_5\}$ who pretend as if they received no information from $P_1$ directly; which lets one conclude that the messages from $\{P_1, P_2, P_6\}$ in such a case must enable Q to obtain output with respect to honest input of $P_1$. Combining the above two inferences in the final scenario lets one reach the final contradiction.

Following is a description of the scenarios. In each of these scenarios, it is assumed that the adversary uses the honest input on behalf of the corrupt parties and its malicious behavior is limited to dropping some of the messages that were received or supposed to be sent by the actively corrupt parties.

Scenario 1: Adversary corrupts $\{P_1, P_6\}$. $P_1$ does not communicate throughout the protocol. $P_6$ behaves honestly in Round 1 and Round 2 (thereby would send $\widetilde{pc^2_{6 \to j}}$ for $j \in [5]$) and aborts (does not communicate) in Round 3.

Scenario 2: Adversary corrupts $\{P_1, P_6\}$. $P_1$ does not communicate throughout the protocol. $P_6$ behaves honestly in Round 1 and Round 2, except that $P_6$ pretends to have received Round 1 message from $P_1$ (thereby would send $pc_{6 \to 1}^2$ for $j \in [5]$). Note that it is possible for $P_6$ to pretend in such a manner as adversary corrupts both $P_1, P_6$. Lastly, $P_6$ aborts in Round 3.

Scenario 3: Adversary corrupts $\{P_3, P_4, P_5\}$. All corrupt parties behave honestly in Round 1. In Round 2, $\{P_3, P_4, P_5\}$ only communicate towards $P_6$, towards whom they pretend that they did not receive Round 1 message from $P_1$ (i.e $P_i$ sends $\widetilde{pc^2_{i \to 6}}$ to $P_6$ for $i \in \{3,4,5\}$). Lastly, $\{P_3, P_4, P_5\}$ abort in Round 3.

Scenario 4: Adversary corrupts $\{P_1, P_2, Q\}$ who do the following (Generally, communication between corrupt parties do not need to be specified, but it is included here for easier understanding of table 10):

Round 1: $P_1$ behaves honestly only to $\{P_2, P_6, Q\}$ (only $P_6$ among the honest parties). $P_2$ and Q behave honestly.

Round 2: $P_1$ behaves honestly only to $\{P_2, P_6, Q\}$. $P_2$ and Q pretend towards $\{P_3, P_4, P_5\}$ as if they did not receive Round 1 message from $P_1$ (i.e send $\widetilde{pc^2_{i \to j}}$ to $P_j$ for $i \in \{2,7\}$, $j \in \{3,4,5\}$). Towards $\{P_1, P_2, P_6\}$ (only $P_6$ among honest parties), $P_2$ and Q act as if Round 1 message had been received from $P_1$ (i.e send $pc_{i \to j}^2$ to $P_j$ for $i \in \{2,7\}$, $j \in \{1,2,6\} \setminus i$).

Round 3: $P_1$ and $P_2$ drop the Round 2 messages obtained from $\{P_3, P_4, P_5\}$ (to emulate Scenario 3) and communicate to Q accordingly.

The views of the parties across various scenarios are described in Tables 7-10. Recall that Round 2 does not involve any messages towards Q and Round 3 involves only incoming messages to Q based on the above assumptions.

TABLE 7

Views of $\{P_1 \ldots P_7\}$ in Scenario 1.

| | View$_1$ | View$_2$ | View$_3$ | View$_4$ | View$_5$ | View$_6$ | View$_7$ |
|---|---|---|---|---|---|---|---|
| Initial Input | $(x_1, r_1, crs, \alpha_1)$ | $(x_2, r_2, crs, \alpha_2)$ | $(x_3, r_3, crs, \alpha_3)$ | $(x_4, r_4, crs, \alpha_4)$ | $(x_5, r_5, crs, \alpha_5)$ | $(x_6, r_6, crs, \alpha_6)$ | $(x_7, r_7, crs, \alpha_7)$ |
| Round 1 | $\{pc_{j \to 1}^1\}_{j \in [7] \setminus \{1\}}$ | $\{pc_{j \to 2}^1\}_{j \in [7] \setminus \{1,2\}}$ | $\{pc_{j \to 3}^1\}_{j \in [7] \setminus \{1,3\}}$ | $\{pc_{j \to 4}^1\}_{j \in [7] \setminus \{1,4\}}$ | $\{pc_{j \to 5}^1\}_{j \in [7] \setminus \{1,5\}}$ | $\{pc_{j \to 6}^1\}_{j \in [7] \setminus \{1,6\}}$ | $\{pc_{j \to 7}^1\}_{j \in [7] \setminus \{1,7\}}$ |
| Round 2 | $\{\widetilde{pc^2_{j \to 1}}\}_{j \in [7] \setminus \{1\}}$ | $\{\widetilde{pc^2_{j \to 2}}\}_{j \in [7] \setminus \{1,2\}}$ | $\{\widetilde{pc^2_{j \to 3}}\}_{j \in [7] \setminus \{1,3\}}$ | $\{\widetilde{pc^2_{j \to 4}}\}_{j \in [7] \setminus \{1,4\}}$ | $\{\widetilde{pc^2_{j \to 5}}\}_{j \in [7] \setminus \{1,5\}}$ | $\{\widetilde{pc^2_{j \to 6}}\}_{j \in [7] \setminus \{1,6\}}$ | — |
| Round 3 | — | — | — | — | — | — | $\{pc_{j \to 7}^{3,1}\}_{j \in \{2,3,4,5\}}$ |

TABLE 8

Views of $\{P_1 \ldots P_7\}$ in Scenario 2.

| | View$_1$ | View$_2$ | View$_3$ | View$_4$ | View$_5$ | View$_6$ | View$_7$ |
|---|---|---|---|---|---|---|---|
| Initial Input | $(x_1, r_1, crs, \alpha_1)$ | $(x_2, r_2, crs, \alpha_2)$ | $(x_3, r_3, crs, \alpha_3)$ | $(x_4, r_4, crs, \alpha_4)$ | $(x_5, r_5, crs, \alpha_5)$ | $(x_6, r_6, crs, \alpha_6)$ | $(x_7, r_7, crs, \alpha_7)$ |
| Round 1 | $\{pc_{j \to 1}^1\}_{j \in [7] \setminus \{1\}}$ | $\{pc_{j \to 2}^1\}_{j \in [7] \setminus \{1,2\}}$ | $\{pc_{j \to 3}^1\}_{j \in [7] \setminus \{1,3\}}$ | $\{pc_{j \to 4}^1\}_{j \in [7] \setminus \{1,4\}}$ | $\{pc_{j \to 5}^1\}_{j \in [7] \setminus \{1,5\}}$ | $\{pc_{j \to 6}^1\}_{j \in [7] \setminus \{1,6\}}$ | $\{pc_{j \to 7}^1\}_{j \in [7] \setminus \{1,7\}}$ |
| Round 2 | $\{\widetilde{pc^2_{j \to 1}}\}_{j \in \{2,3,4,5,7\}}$ $pc_{6 \to 1}^2$ | $\{\widetilde{pc^2_{j \to 2}}\}_{j \in \{3,4,5,7\}}$ $pc_{6 \to 2}^2$ | $\{\widetilde{pc^2_{j \to 3}}\}_{j \in \{2,4,5,7\}}$ $pc_{6 \to 3}^2$ | $\{\widetilde{pc^2_{j \to 4}}\}_{j \in \{2,3,5,7\}}$ $pc_{6 \to 4}^2$ | $\{\widetilde{pc^2_{j \to 5}}\}_{j \in \{3,4,5,7\}}$ $pc_{6 \to 5}^2$ | $\{\widetilde{pc^2_{j \to 6}}\}_{j \in \{2,3,4,5,7\}}$ | — |
| Round 3 | — | — | — | — | — | — | $\{pc_{j \to 7}^{3,2}\}_{j \in \{2,3,4,5\}}$ |

TABLE 9

Views of $\{P_1 \ldots P_7\}$ in Scenario 3.

| | View$_1$ | View$_2$ | View$_3$ | View$_4$ | View$_5$ | View$_6$ | View$_7$ |
|---|---|---|---|---|---|---|---|
| Initial Input | $(x_1, r_1, crs, \alpha_1)$ | $(x_2, r_2, crs, \alpha_2)$ | $(x_3, r_3, crs, \alpha_3)$ | $(x_4, r_4, crs, \alpha_4)$ | $(x_5, r_5, crs, \alpha_5)$ | $(x_6, r_6, crs, \alpha_6)$ | $(x_7, r_7, crs, \alpha_7)$ |
| Round 1 | $\{pc_{j \to 1}^1\}_{j \in [7] \setminus \{1\}}$ | $\{pc_{j \to 2}^1\}_{j \in [7] \setminus \{2\}}$ | $\{pc_{j \to 3}^1\}_{j \in [7] \setminus \{3\}}$ | $\{pc_{j \to 4}^1\}_{j \in [7] \setminus \{4\}}$ | $\{pc_{j \to 5}^1\}_{j \in [7] \setminus \{5\}}$ | $\{pc_{j \to 6}^1\}_{j \in [7] \setminus \{6\}}$ | $\{pc_{j \to 7}^1\}_{j \in [7] \setminus \{7\}}$ |
| Round 2 | $\{pc_{j \to 1}^2\}_{j \in \{2,6,7\}}$ | $\{pc_{j \to 2}^2\}_{j \in \{1,6,7\}}$ | $\{pc_{j \to 3}^2\}_{j \in \{1,2,6,7\}}$ | $\{pc_{j \to 4}^2\}_{j \in \{1,2,6,7\}}$ | $\{pc_{j \to 5}^2\}_{j \in \{1,2,6,7\}}$ | $\{pc_{j \to 6}^2\}_{j \in \{1,2,7\}}$ | — |
| Round 3 | — | — | — | — | — | $\{\widetilde{pc^2_{j \to 6}}\}_{j \in \{3,4,5\}}$ | $\{pc_{j \to 7}^{3,3}\}_{j \in \{1,2,6\}}$ |

TABLE 10

Views of $\{P_1 \ldots P_7\}$ in Scenario 4.

| | View$_1$ | View$_2$ | View$_3$ | View$_4$ | View$_5$ | View$_6$ | View$_7$ |
|---|---|---|---|---|---|---|---|
| Initial Input | $(x_1, r_1, \text{crs}, \alpha_1)$ | $(x_2, r_2, \text{crs}, \alpha_2)$ | $(x_3, r_3, \text{crs}, \alpha_3)$ | $(x_4, r_4, \text{crs}, \alpha_4)$ | $(x_5, r_5, \text{crs}, \alpha_5)$ | $(x_6, r_6, \text{crs}, \alpha_6)$ | $(x_7, r_7, \text{crs}, \alpha_7)$ |
| Round 1 | $\{pc_{j\to 1}^1\}_{j\in[7]\setminus\{1\}}$ | $\{pc_{j\to 2}^1\}_{j\in[7]\setminus\{2\}}$ | $\{pc_{j\to 3}^1\}_{j\in[7]\setminus\{1,3\}}$ | $\{pc_{j\to 4}^1\}_{j\in[7]\setminus\{1,4\}}$ | $\{pc_{j\to 5}^1\}_{j\in[7]\setminus\{1,5\}}$ | $\{pc_{j\to 6}^1\}_{j\in[7]\setminus\{6\}}$ | $\{pc_{j\to 7}^1\}_{j\in[7]\setminus\{7\}}$ |
| Round 2 | $\{\widetilde{pc_{j\to 1}^2}\}_{j\in\{3,4,5\}}$, $\{pc_{j\to 1}^2\}_{j\in\{2,6,7\}}$ | $\{\widetilde{pc_{j\to 2}^2}\}_{j\in\{3,4,5\}}$, $\{pc_{j\to 2}^2\}_{j\in\{1,6,7\}}$ | $\{\widetilde{pc_{j\to 3}^2}\}_{j\in\{2,4,5,7\}}$, $pc_{6\to 3}^2$ | $\{\widetilde{pc_{j\to 4}^2}\}_{j\in\{2,3,5,7\}}$, $pc_{6\to 4}^2$ | $\{\widetilde{pc_{j\to 5}^2}\}_{j\in\{2,3,4,7\}}$, $pc_{6\to 5}^2$ | $\{\widetilde{pc_{j\to 6}^2}\}_{j\in\{3,4,5\}}$, $\{pc_{j\to 6}^2\}_{j\in\{1,2,7\}}$ | — |
| Round 3 | — | — | — | — | — | — | $\{pc_{j\to 7}^{3,4} \equiv pc_{j\to 7}^{3,3}\}_{j\in\{1,2,6\}}$, $\{pc_{j\to 7}^{3,4} \equiv pc_{6\to 6}^{3,2}\}_{j\in\{3,4,5\}}$ |

A sequence of inferences are presented below.

Lemma 5.2 $\Pi$ must be such that if Scenario 1 occurs, then the output obtained by Q must be computed on default input of $P_1$ with overwhelming probability.

Proof. It follows from security of $\Pi$ that an honest Q must receive an output on default input of $P_1$ with overwhelming probability, as the communication throughout the protocol is independent of $x_1$.

Claim 5.3 Suppose a scenario (say $S_A$) involving 2 corruptions (say $P_i, P_j$ where i, j∈[6]) results in Q obtaining output y'≠⊥ with overwhelming probability. Consider a related scenario (say $S_B$) which proceeds identically except that Q does not receive Round 3 message from $P_k$ (distinct from $P_i, P_j$, Q). Then, $S_B$ must also result in Q obtaining y' with overwhelming probability.

Proof. First, it is claimed that the scenario $S_B$ must also result in Q obtaining a valid non-⊥ output (say y≠⊥) with overwhelming probability. This follows since Q is honest and $\Pi$ achieves guaranteed output delivery. Next, it is claimed that y=y'. Suppose for contradiction that y≠y'. Then $\Pi$ is such that it is susceptible to the following attack: Consider an adversary who corrupts $\{P_i, P_j, Q\}$ where $P_i, P_j$ act as per $S_A$ and Q is passively corrupt. Subsequently, Q obtains y' (output of $S_A$) with overwhelming probability. Next, a passive Q can locally emulate the view of an honest Q in $S_B$ by simply discarding the Round 3 message of $P_k$ from its view. This will enable Q to learn y≠y' as well with overwhelming probability, which contradicts the security of $\Pi$. It can thus be concluded that $S_B$ must also result in Q obtaining y' with overwhelming probability.

Lemma 5.4 $\Pi$ must be such that if Scenario 2 occurs, then the output obtained by Q must be computed on default input of $P_1$ with overwhelming probability.

Proof. First, note that the difference between Scenario 1 and 2 lies in the communication from $P_6$ to honest parties $\{P_2, P_3, P_4, P_5\}$ in Round 2. While in the former, $P_6$ acts as if he did not receive Round 1 message from $P_1$ (sends $\widetilde{pc_{6\to j}^2}$ for j∈{2,3,4,5}); in the latter he pretends as if he did receive Round 1 message from $P_1$ (sends $pc_{i\to j}^2$ for j∈{2, 3,4,5}). It is proven via a sequence of hybrids that both these scenarios must lead to the same output.

Assuming this holds, then Lemma 5.4. follows directly from Lemma 5.2. Following is the sequence of hybrids:

hyb$_0$: Same as Scenario 1.

hyb$_1$: Same as hyb$_0$, except that $P_6$ sends $pc_{6\to 2}^2$ to $P_2$ (as opposed to $\widetilde{pc_{6\to 2}^2}$ in hyb$_0$).

hyb$_2$: Same as hyb$_1$, except that $P_6$ sends $pc_{6\to 3}^2$ to $P_3$ (as opposed to $\widetilde{pc_{6\to 3}^2}$ in hyb$_1$).

hyb$_3$: Same as hyb$_2$, except that $P_6$ sends $pc_{6\to 4}^2$ to $P_4$ (as opposed to $\widetilde{pc_{6\to 4}^2}$ in hyb$_2$).

hyb$_4$: Same as hyb$_3$, except that $P_6$ sends $pc_{6\to 5}^2$ to $P_5$ (as opposed to $\widetilde{pc_{6\to 5}^2}$ in hyb$_3$). Note that this is same as Scenario 2.

Note that each of the hybrids must result in Q receiving a non-⊥ output with overwhelming probability (follows from security of $\Pi$ as Q is honest). It remains to show that the output in hyb$_i$ is the same as in hyb$_{i-1}$ for each i∈[4].

First construct a new hybrid hyb$_{i-1}$' between hyb$_{i-1}$ and hyb$_i$, which is the same as hyb$_{i-1}$ except that $P_{i+1}$ is also corrupted and aborts in Round 3. It follows from Claim 5.3 that Q obtains the same output in hyb$_{i-1}$ and hyb$_{i-1}$'.

Now to prove that Q's output in hyb$_{i-1}$' and hyb$_i$ are the same with overwhelming probability. Suppose not, namely Q outputs y' in hyb$_{i-1}$' and y in hyb$_i$ where y≠y'. Then, consider an adversary who corrupts $\{P_1, P_6, Q\}$ where $P_1, P_6$ act as in hyb$_i$ and Q is passively corrupt. Q obtains y (output of hyb$_i$ as per assumption). Next, note that Q can locally emulate the view of an honest Q in hyb$_{i-1}$' by ignoring $P_{i+1}$'s Round 3 message. This enables Q to obtain the same output as hyb$_{i-1}$' i.e y'. This is a contradiction to security of $\Pi$ as Q obtains both y' and y. It can therefore be concluded that hyb$_{i-1}$' and hyb$_i$ must result in the same output.

It follows directly from the above argument and Lemma 5.2 that Scenario 2 (same as hyb$_4$) must result in Q obtaining y' i.e output on default input of $P_1$. This completes the proof of Lemma 5.4.

Lemma 5.5 $\Pi$ must be such that if Scenario 3 occurs, then the output obtained by Q must be computed on $x_1$ i.e the honest input of $P_1$ with overwhelming probability.

Proof. It follows directly from correctness of $\Pi$ (which holds with overwhelming probability) that the output obtained by Q in Scenario 3 must be computed w.r.t. honest $P_1$'s input (i.e $x_1$).

Claim 5.6 $\Pi$ is such that the view of $\{P_3, P_4, P_5\}$ in Scenario 4 is identically distributed to their respective views in Scenario 2.

Proof. Consider the view of $P_i$ (i∈{3,4,5}). In both Scenario 2 and Scenario 4, $P_i$ does not receive communication from $P_1$ in Round 1 and Round 2, receives $pc_{6\to i}^2$ from $P_6$ and $\widetilde{pc_{j\to i}^2}$ from j∈[7]\{1,6, i} (refer to Tables 8 and 10). Thereby, the claim follows.

Claim 5.7 $\Pi$ is such that the view of $\{P_1, P_2, P_6\}$ in Scenario 4 is identically distributed (or subsumes) their respective views in Scenario 3.

Proof. Consider the view of $P_6$. In both Scenario 3 and Scenario 4, honest $P_6$ receives communication from $P_1$ in Round 1 and Round 2, receives $pc_{j\to 6}^2$ for j∈{1,2,7} and receives $\widetilde{pc_{j\to 6}^2}$ from j∈{3,4,5}. Thereby, the claim holds w.r.t $P_6$. Next, suppose the corrupt parties $\{P_1, P_2\}$ in Scenario 4 discard Round 2 messages from $\{P_3, P_4, P_5\}$. Consider this updated view of $P_1$ which would constitute $pc_{j\to 1}^2$ for j∈{2,6,7} (in addition to Round 1 messages). It

43 is easy to check that this is identically distributed to view of honest $P_1$ in Scenario 3. Similar argument can be made w.r.t $P_2$ (refer to Tables 9 and 10). Thus, the claim holds.

Lemma 5.8 $\Pi$ must be such that if Scenario 4 occurs, then the adversary corrupting $\{P_1, P_2, Q\}$ obtains multiple evaluations of $f$ with overwhelming probability.

Proof. Suppose Scenario 4 occurs. First, Q must obtain the output computed w.r.t $x_1$ (say y) with overwhelming probability. Let Q locally update his view in Scenario 4 to discard the Round 3 messages from $\{P_3, P_4, P_5\}$. This updated view is identically distributed to the view of an honest Q in Scenario 3. This holds since the Round 3 messages from $\{P_1, P_2, P_6\}$ are identically distributed to those received in Scenario 3 (can be inferred from Claim 5.7).

It can thus be concluded that Q can carry out output computation similar to honest Q in Scenario 3 to obtain y with overwhelming probability (Lemma 5.5).

Next, it is claimed that Q can obtain the output computed with respect to default input of $P_1$ (say y') as well. Consider a scenario related to Scenario 2 where $P_2$ additionally aborts in Round 3. It follows from Claim 5.3 that this must result in Q obtaining same output as Scenario 2 i.e y' (Lemma 5.4). Next, let Q locally update his view in Scenario 4 to discard the Round 3 messages from $\{P_1, P_2, P_6\}$. This updated view is identically distributed to the view of an honest Q in the scenario mentioned above (related to Scenario 2). This holds since Round 3 messages of $\{P_3, P_4, P_5\}$ are identically distributed to those received by honest Q in Scenario 2 (can be inferred from Claim 5.6). It can thus be concluded that this updated view enables Q to obtain y' with overwhelming probability. This completes the proof of Lemma 5.8.

Lemma 5.8 proves that $\Pi$ is such that an adversary corrupting $\{P_1, P_2, Q\}$ can obtain multiple evaluations of $f$ (on both $x_1$ and default input of $P_1$). This contradicts the security of $\Pi$ as Q learns both outputs y'=$(x_3, x_4, x_5)$ and y=$x_6$ (as per the definition of $f$) which must not be allowed as per ideal functionality; completing the proof of Theorem 5.1.

Before concluding the section, it is briefly discussed why the above argument breaks down when t=2 (Circumventing the lower bound when t=1 is demonstrated by the upper bounds of Section IV.C below). Suppose the scenarios above are extended in a natural manner to a five party setting $\{P_1, P_2, P_3, P_4, P_5=Q\}$ with two corruptions where the partitions comprise of $\{P_1, P_4\}$ and $\{P_2, P_3\}$ (analogous to $\{P_1, P_2, P_6\}$ and $\{P_3, P_4, P_5\}$ in the above argument). Observe that while the inferences corresponding to Scenario 1 and 3 still hold, the primary hurdle in extending the argument is the following: it cannot be concluded that Scenario 2 (where $P_4$ pretends to both $\{P_2, P_3\}$ as if he received Round 1 communication from $P_1$) results in the same output as Scenario 1 (where $P_4$ interacts with $\{P_2, P_3\}$ as if he did not receive Round 1 communication from $P_1$). More specifically, the proof of Lemma 5.4 breaks down as the argument involving the hybrids does not work in the case of two corruptions. This is because the scenarios corresponding to the hybrids would already involve corruptions of $\{P_1, P_4\}$ (analogous to $\{P_1, P_6\}$ in the general argument) and demand an additional corruption (i.e., the party whose message changed across the hybrids) which is not possible when t=2. Therefore, it cannot be concluded that when Scenario 2 occurs, the output must be on default input of $P_1$ (in fact, the protocol may potentially be designed in a way that Scenario 2 results in output on non-default input of $P_1$).

The above insight may be useful in potentially designing a three-round upper bound for the case of t=2 corruptions in the future. The question of designing a three-round solitary MPC or alternately proving its impossibility for the case of t=2 corruptions is left open.

B. Upper Bounds with PKI and No Broadcast

In this section, upper bounds for solitary MPC with guaranteed output delivery are presented. First, a five-round construction that works for any n and t<n/2 is presented. Next, the section elaborates on a non-constant round protocol (i.e (t+2) rounds) that can be derived from the protocol of [GLS15]. While the former upper bound significantly improves over the latter for most values of n, t; the latter achieves better round complexity for special cases of t<2.

1. General Five-Round Protocol

This subsection presents a five-round solitary output MPC protocol with guaranteed output delivery that works for any n in the presence of an honest majority: that is, any t<n/2 where n is the number of parties and t is the number of corrupt parties. This protocol uses the following primitives: a $$\left(\frac{n}{2}+1\right)\text{-out-of-}n$$

decentralized threshold FHE scheme dTFHE=(dTFHE. DistGen, dTFHE. Enc, dTFHE. PartialDec, dTFHE. Eval, dTFHE. Combine), a digital signature scheme (Gen, Sign, Verify), and a simulation-extractible NIZK argument (NIZK. Setup, NIZK. Prove, NIZK. Verify). The NIZK argument is used for two NP languages $L_1$, $L_2$ defined in Section IV.E.3.b. All of them can be built assuming LWE [BGG+18, CCH+19, PS19]. Formally, the following theorem is shown:

Theorem 6.1 Assuming LWE, protocol $\Pi_{5\text{-}round}$ described below is a five-round secure solitary output MPC protocol with guaranteed output delivery with a PKI setup and pairwise-private channels. The protocol works for any n, any function and is secure against a malicious rushing adversary that can corrupt any t<n/2 parties.

Brief Overview. Consider n parties $P_1, \ldots, P_n$ who wish to evaluate function $f:(\{0,1\}^\lambda)^{n-1} \to \{0,1\}^\lambda$. Also denote $P_n$ as the output receiving party Q. In some places, the notation $msg^{i \to j}$ is used to indicate that the message was sent by party $P_i$ to $P_j$. At a high level, the protocol works as follows: In Round 1, each party $P_i$ sends to every other party a dTFHE encryption $[\![ x_i ]\!]$ along with a NIZK argument $\pi_i$ proving that the encryption is well formed. On top of that, $P_i$ also attaches its signature $\sigma_i \leftarrow \text{Sign}(\text{skey}_i, ([\![ x_i ]\!], \pi_i))$. In Round 2, each party sends all the messages it received in Round 1 to Q. In Round 3, Q first initializes a string msg=$\perp$ and does the following for each i∈[n]: if it received a valid message from $P_i$ in Round 1, (where valid means the signature $\sigma_i$ and the NIZK $\pi_i$ verifies successfully) it includes the message in msg and sets a value $ct_i=x_i$. Else, in Round 2, if a different party $P_{i_1}$ forwards a valid message $([\![ x_i ]\!]^{i_1 \to n}, \pi^{i_1 \to n}, \sigma^{i_1 \to n})$ received from $P_i$ in Round 1, include that in msg and set $ct_1$ to be $[\![ x_i ]\!]^{i_1 \to n}$. If no such $i_1$ exists, set $ct_i=\perp$ and append $\perp$ to msg. Then, Q sends msg and a signature on it $\sigma_{msg}$ to all parties. In Round 4, each party sends the tuple received from Q in Round 3 to every other party. Finally, in Round 5, each party $P_i$ sends its partial decryption (along with a NIZK) on the homomorphically evaluated ciphertext $[\![ y ]\!]$ =dTFHE. Eval$(f, ct_1, \ldots, ct_n)$ if: (i) in Round 3, Q sent (msg, $\sigma_{msg}$) such that $\sigma_{msg}$ verifies, (ii) it did not receive a different tuple (msg', $\sigma_{msg'}$) from another party in Round 4 such that $\sigma_{msg'}$ verifies, (iii) In the string msg, every tuple of the form ($[\![x_i]\!]$, $\pi_j$, $\sigma_j$) is valid, (iv) for every party $P_k$, if $P_i$ received a valid message from $P_k$ in Round 1, then in Q's Round 3 message msg, there must exist some valid tuple of the form ($[x_k'] \pi_k'$, $\sigma_k'$) on behalf of $P_k$ (not necessarily the one $P_i$ received in Round 1). After Round 5, Q combines all the partial decryptions (if the NIZK verifies) to recover the output. The protocol is formally described below. The proof of security is deferred to Section VII.

2. Construction

CRS: Send crs←NIZK. Setup($1^\lambda$) to every party.

PKI Setup:

For each i∈[n]: sample $(pk_i, sk_i)$←dTFHE. DistGen($1^\lambda$, $1^d$, i; $r_i$) and $(vkey_i, skey_i)$←Gen($1^\lambda$).

Public key: $pk = pk_1 \| \ldots \| pk_n$ and $\{vkey_i\}i\in[n]$.

Secret keys: ($sk_i$, $r_i$, $skey_i$) to party $P_i$ for each i∈[n].

Inputs: For each i∈[n], party $P_i$ has an input $x_i \in \{0,1\}^\lambda$.

Protocol:

1. Round 1: For each i∈[n]:

$P_i$ computes $x_i$←dTFHE. Enc(pk, $x_i$; $\rho_i$) using randomness $\rho_i$, $\pi_i$←NIZK. Prove(crs, $st_i$, $wit_i$) for $st_i \in L_1$ where $st_i$=($[\![x_i]\!]$, pk) and $wit_i = (x_i, \rho_i)$.

Then, compute $\sigma_i$←Sign($skey_i$, ($[\![x_i]\!]$, $\pi_i$)) and send ($[\![x_i]\!]$, $\pi_i$, $\sigma_i$) to every party.

2. Round 2: For each i∈[n], $P_i$ sends all the messages it received in Round 1 to party $P_n$(=Q).

3. Round 3: Party $P_n$(=Q) does the following:

Define strings msg, $ct_1, \ldots, ct_n$ as $\bot$.

For each i∈[n], let $\{(x_j^{i \to n}, \pi_j^{i \to n}, \sigma_j^{i \to n})\}_{j \in [n] \setminus \{i\}}$ denote the message received from $P_i$ in Round 2 and $(x_i^{i \to n}, \pi_i^{i \to n}, \sigma_i^{i \to n})$ denote the message received from $P_i$ in Round 1.

For each j∈[n], do the following:

Let $\{([\![x_j]\!]^{1 \to n}, \pi_j^{1 \to n}, \sigma_j^{1 \to n}), \ldots, ([\![x_j]\!]^{n \to n}, \pi_j^{n \to n}, \sigma_j^{n \to n})\}$ be the messages received across both rounds on behalf of party $P_j$.

Pick the lowest $i_1$ such that Verify($vkey_j$, $([\![x_j]\!]^{i_1 \to n}, \pi_j^{i_1 \to n}, \sigma_j^{i_1 \to n})$)=1 and NIZK. Verify(crs, $\pi_j^{i_1 \to n}$, $st_j$)=1 for $st_j \in L_1$ where $st_j$=($[\![x_j]\!]^{i_1 \to n}$, pk). Set $ct_j := [\![x_j]\!]^{i_1 \to n}$ and msg:=msg$\|$"Party j"$\|([\![x_j]\!]^{i_1 \to n}, \pi_j^{i_1 \to n}, \sigma_j^{i_1 \to n})$.

If no such $i_1$ exists, set msg=msg$\|$"Party j"$\|\bot$.

Compute $\alpha_{msg}$←Sign($skey_n$, msg). Send (msg, $\sigma_{msg}$) to all parties.

Set $[\![y]\!]$=dTFHE. Eval(pk, $f$, $ct_1, \ldots, ct_n$). (Let $\mathcal{S}=\{i | ct_i = \bot\}$. Here, the protocol actually homomorphically evaluates the residual function $f_S(\cdot)$ that only takes as input $\{x_j\}_{j \notin \mathcal{S}}$ and uses the default values for all indices in the set $\mathcal{S}$. For ease of exposition, this notation is skipped in the rest of the protocol and proof).

4. Round 4: For each i∈[n−1], $P_i$ sends the message received from Q in Round 3 to every party.

5. Round 5: For each i∈[n−1], $P_i$ does the following:

Let $\{(msg^{j \to i}, \sigma_{msg}^{j \to i})\}_{j \in [n-1] \setminus \{i\}}$ be the messages received in Round 4 and $(msg^{n \to i}, \sigma_{msg}^{n \to i})$ be the message from Q in Round 3.

If Verify($vkey_n$, $msg^{n \to i}$, $\sigma_{msg}^{n \to i}$)≠1 (OR) $msg^{n \to i}$ is not of the form ("Party 1"$\|m_1\| \ldots \|$"Party n"$\|m_n$), send ⊥ to Q and end the round.

Output ⊥ to Q and end the round if there exists j≠n such that:

$msg^{j \to i} \neq msg^{n \to i}$ (AND)

Verify($vkey_n$, $msg^{j \to i}$, $\sigma_{msg}^{j-1}$)=1 (AND)

$msg^{j \to i}$ is of the form ("Party 1"$\|m_1, \ldots, \|$"Party n"$\|m_n$)

This third check is to ensure that a corrupt $P_j$ doesn't re-use a valid signature sent by Q in the first round as its message in Round 4.

Define strings $ct_1, \ldots, ct_n$.

Parse $msg^{n \to i}$ as ("Party 1"$\|m_1, \ldots, \|$"Party n"$\|m_n$).

For each j∈[n], do the following:

If in Round 1, $P_i$ received ($x_j$, $\pi_1$, $\sigma_j$) from $P_j$ such that Verify($vkey_j$, ($x_j$, $\pi_j$), $\sigma_j$)=1 and NIZK. Verify($\pi_j$, $st_j$)=1 for $st_j \in L_1$ where $st_j$=($x_j$, pk), set $bit_j$=1. Else, set $bit_j$=0.

If $m_j = \bot$:

If $bit_j$=1, send ⊥ to Q and end the round.

Else, set $ct_j = \bot$.

If $m_j$=($[\![x_j]\!]^{i_1 \to n}, \pi_j^{i_1 \to n}, \sigma_j^{i_1 \to n}$):

If Verify($vkey_j$, $([\![x_j]\!]^{i_1 \to n}, \pi_j^{i_1 \to n}), \sigma_j^{i_1 \to n}$)=1 and NIZK. Verify(crs, $\pi_j^{i_1 \to n}$, $st_j$)=1 for $st_j \in L_1$ where $st_j$=($[\![x_j]\!]^{i_1 \to n}$, pk), set $ct_j = [\![x_j]\!]^{i_1 \to n}$.

Else, send ⊥ to Q and end the round.

Compute $[\![y]\!]$←dTFHE. Eval(pk, $f$, $ct_1, \ldots, ct_n$).

Compute $[\![y: sk_i]\!]$←dTFHE. PartialDec($sk_i$, $[\![y]\!]$) and $\pi_i^{dec}$←NIZK. Prove(crs, $st_i^{dec}$, $wit_i^{dec}$) for $st_i^{dec} \in L_2$ where $st_i^{dec}$=($[\![y: sk_i]\!]$, $[\![y]\!]$, $pk_i$, i) and $wit_i^{dec}$=($sk_i$, $r_i$).

Send ($[\![y: sk_i]\!]$, $\pi_i^{dec}$) to Q.

6. Output Computation: Q does the following:

Recall the value $[\![y]\!]$ computed in Round 3.

For each i∈[n], if NIZK. Verify(crs, $\pi_i^{dec}$, $st_i^{dec}$)≠1 for $st_i^{dec} \in L_2$ where $st_i^{dec}$=($[\![y: sk_i]\!]$, $[\![y]\!]$, $pk_i$, i), discard $[\![y: sk_i]\!]$.

Output y←dTFHE. Combine(pk, $\{[\![y: sk_i]\!]\}_{i \in S}$) where S contains the set of non-discarded values from the previous step.

3. (t+2) Round Protocol

This subsection elaborates on how a (t+2)-round protocol for solitary MPC with guaranteed output delivery, say Π', can be derived from the two-round protocol of [GLS15]. Recall that the two-round protocol (say Π) of [GLS15] (that assumes a PKI setup) achieves guaranteed output delivery for general MPC and involves communication only via broadcast channels in both rounds. This subsection proposes the following minor modifications to Π: first, employ a (t+1)-round protocol over pairwise-private channels that realizes the broadcast functionality [DS83] to execute Round 1 of Π. Next, the messages communicated via broadcast in Round 2 of Π are instead communicated privately only to Q (as only Q is supposed to obtain output) in Round (t+2) of Π'. This completes the high-level description of Π' whose security follows directly from security of Π. Lastly, the above approach achieves better round complexity than the general five-round construction from Section IV.B.1 only when t≤2.

C. Special Case: t=1 with PKI and No Broadcast

This subsection considers the special case of t=1 in the setting with a PKI setup and no broadcast. It is assumed that parties can communicate only via pairwise-private channels and have access to CRS and PKI. First, this subsection presents a lower bound that shows the necessity of three rounds to compute a solitary functionality involving an input from Q. This proves that the general (t+2)-round construction of Section IV.B.3 is optimal when t=1 and Q has input. Next, the subsection presents a two-round upper bound for the case when Q does not have an input. This implies the tightness of the two-round lower bound of [HLP11] for the case when Q does not have input. The lower bound holds even in the setting of a non-rushing adversary and the upper bounds hold even in the stronger adversarial setting of a rushing malicious adversary.

1. Necessity of Three Rounds when Q has Input

This subsection shows that in the absence of a broadcast channel, it is impossible to design a two-round solitary MPC protocol achieving guaranteed output delivery, even if parties are given access to CRS and PKI. The lower bound holds for any $1 \leq t < n/2$ and non-rushing adversaries. However, it relies on the property that the function $f$ to be computed involves an input provided by Q. In fact, this lower bound of three rounds can be circumvented when $f$ does not involve an input provided by Q, as demonstrated by the two-round solitary MPC with guaranteed output delivery in Section IV.C.2 designed for the special case of $t=1$.

Theorem 7.1 Assume parties have access to CRS, PKI and pairwise-private channels. Then, there exists a solitary functionality $f$ (involving input from Q) such that no two-round MPC protocol can compute $f$ with guaranteed output delivery when $t=1$ even against a non-rushing adversary.

Proof. Suppose for the sake of contradiction that there exists a two-round solitary MPC with guaranteed output delivery, say $\Pi$ which computes a three-party solitary function $f(x_1, x_2, x_3)$ among $\{P_1, P_2, P_3\}$ where $Q=P_3$ denotes the output receiving party providing an input $x_3$. Note that at most one of the three parties can be controlled by the adversary. Without loss of generality, it is assumed that Round 2 involves messages only from $P_1$ and $P_2$ to Q (as Q is the only party supposed to receive output at the end of Round 2).

The high-level structure of the proof is as follows: first, it is claimed that $\Pi$ must be such that even if a corrupt party (either of $P_1/P_2$) drops its Round 2 message (to Q), Q must still be able to obtain the output. This leads to the inference that $\Pi$ in fact must be such that it allows a potentially corrupt Q to obtain two distinct evaluations of $f$ based on two distinct inputs of its choice, which is the final contradiction. The proof is described formally below.

The following notation is used: Let $pc_{i \to j}^r$ denote the pairwise-private communication from $P_i$ to $P_j$ in round $r$ where $r \in [2]$, $\{i,j\} \in [3]$. These messages may be a function of the common reference string (denoted by crs) and the PKI setup. Let $\alpha_i$ denote the output of the PKI setup to party $P_i$. A party's view comprises crs, $\alpha_i$, its input, randomness and incoming messages.

Lemma 7.2 $\Pi$ must be such that an honest Q is able to compute the output with respect to its input (say $x_3$) with overwhelming probability, even if one among $P_1$ and $P_2$ aborts in Round 2.

Proof. The proof is straightforward: suppose adversary corrupts one among $P_1$ and $P_2$, say $P_1$ who aborts in Round 2 (i.e does not send $pc_{1 \to 3}^2$). From the security of $\Pi$ (guaranteed output delivery), it follows that an honest Q must still be able to obtain the correct output (even without $pc_{1 \to 3}^2$) with respect to its input (say $x_3$) with overwhelming probability.

Lemma 7.3 $\Pi$ is such that it is possible for a potentially corrupt Q to obtain $f(x_1, x_2, x_3')$ and $f(x_1, x_2, \widetilde{x_3})$ for any choice of $x_3'$ and $\widetilde{x_3}$ with overwhelming probability.

Proof. Consider a scenario where the adversary actively corrupts Q who does the following: in Round 1, Q behaves as per the protocol but using inputs $x_3'$ and $\widetilde{x_3}$ to send messages to $P_2$ and $P_1$ respectively. Note that this communication is over private channels in accordance with the network model. In Round 2, Q does not send any messages as per the assumption regarding the protocol design. It is first claimed that Q can obtain $f(x_1, x_2, x_3')$ as follows: Q discards the Round 2 message from $P_1$ (i.e $pc_{1 \to 3}^2$). It is easy to see that this updated view of Q (after discarding the Round 2 private message from $P_1$) is identically distributed to the scenario of Lemma 7.2 where an honest Q used input $x_3 = x_3'$ and $P_1$ aborted in Round 2. It thus follows from Lemma 7.2 that this view should enable Q to compute $f(x_1, x_2, x_3')$ with overwhelming probability. Similarly, it is argued that by discarding the Round 2 private message from $P_2$, Q is also able to learn $f(x_1, x_2, \widetilde{x_3})$ with overwhelming probability. This completes the proof of the lemma.

It can thus be concluded from Lemma 7.3 that protocol $\Pi$ is such that a corrupt Q can obtain two distinct evaluations of the function with respect to two choices of inputs $x_3'$ and $\widetilde{x_3}$ (where $x_3' \neq \widetilde{x_3}$), while the inputs of honest parties remain fixed. This breaches security (more specifically, breaches privacy of honest $P_1/P_2$ based on the example of $f$ detailed in Section III.A) and contradicts the assumption of $\Pi$ being secure; thereby completing the proof of Theorem 7.1.

Circumvention of the lower bound. First, it is noted that for scenarios where Q has input, the argument of multiple evaluations of $f$, holds only if at least one other party (different from Q) also has input (which constitutes the non-trivial case, else Q could compute the output locally using just its input). Next, Lemma 7.3 is meaningful only when Q has input, thereby the lower bound argument holds only in such a case. This is demonstrated by the 2-round upper bound in Section IV.C.2 when Q does not have an input (for the special case of $t=1$).

For a single corruption $t=1$, a two-round protocol when Q does not have input is presented below in Section IV.C.2 and a three-round protocol when Q has input in Section IV.C.3.

2. Two-Round Protocol when Q has No Input

In this subsection, a two-round protocol for the setting where the receiving party Q does not have input and there is at most one corrupted party is presented. This protocol will utilize the following primitives: a 2-out-of-n decentralized threshold FHE scheme dTFHE=(dTFHE. DistGen, dTFHE. Enc, dTFHE. PartialDec, dTFHE. Eval, dTFHE. Combine), a digital signature scheme (Gen, Sign, Verify), and a simulation-extractible NIZK argument (NIZK. Setup, NIZK. Prove, NIZK. Verify). The NIZK argument for two NP languages $L_1$, $L_2$ defined in Section I.E.3.b is used. These primitives can be built assuming LWE [BGG+18, CCH+19, PS19]. Formally, the following is shown:

Theorem 7.4 Assuming LWE, the two-round protocol described below achieves solitary output MPC with guaranteed output delivery with a PKI setup and pairwise-private channels. The protocol works for any n, any function where the receiving party Q does not have input and is secure against a malicious rushing adversary that can corrupt any one party.

Consider n parties $P_1, \ldots, P_n$ who wish to evaluate function $f:(\{0,1\}^\lambda)^{n-1} \to \{0,1\}^\lambda$. Denote $P_n$ as the output receiving party Q. At a high level, the protocol works as follows: In Round 1, each party $P_i$ sends to every other party a dTFHE encryption $[\![x_i]\!]$ along with a NIZK argument proving that the encryption is well formed. On top of that, $P_i$ also attaches its signature on the message. In Round 2, if party $P_i$ detects dishonest behavior of another party in Round 1 (e.g., party $P_j$ didn't communicate to $P_i$, or the message received from $P_j$ does not contain a valid NIZK or signature), then it must be the case that Q is honest, so $P_i$ sends $x_i$ directly to Q. Here, rely on the fact that $t=1$. Otherwise, $P_i$ must have a valid set of ciphertexts $[\![x_1]\!], \ldots, [\![x_{n-1}]\!]$. $P_i$ can homomorphically compute the function $f$ on the ciphertexts to obtain an encryption of the output $[\![y]\!]$ and a partial decryption $[\![y: sk_i]\!]$. $P_i$ sends all the ciphertexts and $[\![y: sk_i]\!]$ (with NIZKs and signatures) to Q. Finally, Q either receives at least one set of valid ciphertexts along with a valid partial decryption, or receives at least n–2 inputs. In the first case, Q can compute a partial decryption of y: $sk_n$ by itself and combine the two partial decryptions to recover y. In the second case, Q can compute the output directly. The protocol is formally described below. the proof of security is deferred to Section VIII.

CRS: Let crs←NIZK. Setup($1^\lambda$) be the common reference string.

PKI Setup:
For each i∈[n], generate ($pk_i$, $sk_i$)←dTFHE. DistGen($1^\lambda$, $1^d$, i; $r_i$), ($vkey_i$, $skey_i$)←Gen($1^\lambda$).
Public keys: pk=($pk_i$|| ... ||$pk_n$) and $\{vkey_i\}_{i\in[n]}$.
Secret keys: ($sk_i$, $r_i$, $skey_i$) for party $P_i$.
Inputs: For each i∈[n−1], party $P_i$ has an input $x_i\in\{0,1\}^\lambda$.

Protocol:
Round 1: For each i∈[n−1], party $P_i$ does the following:
1. Compute ⟦$x_i$⟧←dTFHE. Enc(pk, $x_i$; $\rho_i$).
2. Compute $\pi_i$←NIZK. Prove(crs, $st_i$, $wit_i$) for $st_i\in L_1$ where $st_i$=(⟦$x_i$⟧, pk) and $wit_i$=($x_i$, $\rho_i$).
3. Compute $\sigma_i$←Sign($skey_i$,(⟦$x_i$⟧, $\pi_i$)).
4. Send (⟦$x_i$⟧, $\pi_i$, $\sigma_i$) to every party $P_j$ where j∈[n−1]\{i}.

Round 2: For each i∈[n−1], party $P_i$ does the following:
1. For each j∈[n−1]\{i}, verify the following:
$P_i$ received (⟦$x_j$⟧, $\pi_j$, $\sigma_j$) from party $P_j$ in Round 1.
NIZK. Verify(crs, $\pi_j$, $st_j$)=1.
Verify($vkey_j$, (⟦$x_j$⟧, $\pi_j$), $\sigma_j$)=1.
2. If any of the above isn't true, then send $x_i$ to Q. Otherwise,
(a) Compute ⟦y⟧←dTFHE. Eval(pk, $f$, ⟦$x_1$⟧, ..., ⟦$x_{n-1}$⟧).
(b) Compute ⟦y: $sk_i$⟧←dTFHE. PartialDec($sk_i$, ⟦y⟧).
(c) Compute $\pi_i^{dec}$←NIZK. Prove(crs, $st_i^{dec}$, $wit_i^{dec}$) for $st_i^{dec}\in L_2$ where $st_i^{dec}$=(⟦y: $sk_i$⟧, ⟦y⟧, $pk_i$, i) and $wit_i^{dec}$=($sk_i$, $r_i$).
(d) Send ($\{(⟦x_j⟧, \pi_j, \sigma_j)\}_{j\in[n-1]}$, ⟦y⟧, ⟦y: $sk_i$⟧, $\pi_i^{dec}$) to Q.

Output Computation: Q does the following:
1. For each i∈[n−1], verify the following:
Q received ($\{(⟦x_j⟧, \pi_j, \sigma_j)\}_{j\in[n-1]}$, ⟦y⟧, ⟦y: $sk_i$⟧, $\pi_i^{dec}$) from party $P_i$ in Round 2.
NIZK. Verify(crs, $\pi_j$, $st_j$)=1 and Verify($vkey_j$, (⟦$x_j$⟧, $\pi_j$), $\sigma_j$)=1 for all j∈[n−1].
⟦y⟧=dTFHE. Eval(pk, $f$, ⟦$x_1$⟧, ..., ⟦$x_{n-1}$⟧).
NIZK. Verify(crs, $\pi_i^{dec}$, $st_i^{dec}$)=1.
2. If the above is true for any i∈[n−1] (if it holds for multiple parties, pick the smallest i), then
(a) Let ($\{(⟦x_j⟧, \pi_j, \sigma_j)\}_{j\in[n-1]}$, ⟦y⟧, ⟦y: $sk_i$⟧, $\pi_i^{dec}$) be the message Q received from $P_i$ in Round 2.
(b) Compute ⟦y: $sk_n$⟧←dTFHE. PartialDec($sk_n$, ⟦y⟧).
(c) Compute y←dTFHE. Combine(pk, {⟦y: $sk_i$⟧, ⟦y: $sk_n$⟧}) and output y.
3. Otherwise, Q must have received $x_i$ from $P_i$ for at least n−2 parties.
If Q received $x_i$ from $P_i$ for all i∈[n−1], then output $f(x_1, ..., x_{n-1})$.
Otherwise, Q did not receive the input from $P_j$, then output $f(x_1, ..., x_{j-1}, \bot, x_{j+1}, ..., x_{n-1})$.

3. Three-Round Protocol when Q has Input

Note that for this special case of t=1 when Q has input, the general (t+2)-round construction of Section IV.B.3 yields a three-round protocol with guaranteed output delivery.

D. Special Case: t=2 with PKI and No Broadcast

This subsection considers the special case of t=2 in the setting with a PKI setup and no broadcast. Once again, it is assumed that parties can communicate only via pairwise-private channels and have access to CRS and PKI. The lower bound holds even in the setting of a non-rushing adversary and the upper bounds hold even in the stronger adversarial setting of a rushing malicious adversary.

1. Necessity of Three Rounds

This subsection, investigates the round complexity of solitary MPC when t>1. Specifically, it shows that when 2≤t<n/2, three rounds are necessary for solitary MPC with guaranteed output delivery, even when Q has no input. This is in contrast to the case of t=1 for which two rounds are sufficient when Q has no input (Section IV.C.2). The formal theorem is stated below.

Theorem 8.1 Assume parties have access to CRS, PKI and pairwise-private channels. Then, there exists a solitary functionality $f$ such that no two-round MPC protocol can compute $f$ with guaranteed output delivery when 2≤t<n/2 even against a non-rushing adversary.

Proof. Suppose for the sake of contradiction that there exists a two-round five-party solitary MPC with guaranteed output delivery, say Π which is secure against t=2 corruptions. Let Π compute the solitary function $f(x_1, x_2, x_3, x_4, x_5)$ among $\{P_1, P_2, P_3, P_4, P_5\}$ where Q=$P_5$ denotes the output receiving party. The argument holds irrespective of whether $f$ involves an input from Q. Similar to Section IV.C.1, assume that Round 2 involves only messages sent to Q (as Q is the only party supposed to receive output at the end of Round 2).

Consider an execution of Π with inputs ($x_1, x_2, x_3, x_4, x_5$) and analyze three different scenarios. In each of these scenarios, it is assumed that the adversary uses the honest input on behalf of the corrupt parties and its malicious behavior is limited to dropping some of the messages supposed to be sent by the corrupt parties. Following is a description of the scenarios:

Scenario 1: Adversary corrupts $\{P_2, P_3\}$ who behave honestly in Round 1 and simply abort (do not communicate) in Round 2.

Scenario 2: Adversary corrupts $\{P_1, P_4\}$. $P_1$ does not communicate throughout the protocol. $P_4$ behaves honestly in Round 1 and aborts in Round 2.

Scenario 3: Adversary corrupts $\{P_1, Q\}$. $P_1$ communicates as per protocol steps only to $P_4$, Q in Round 1 (drops its private messages to $P_2, P_3$). In Round 2, $P_i$ behaves honestly i.e communicates privately towards Q as per protocol steps (in general, private communication between corrupt parties need not be specified, this communication between corrupt parties is mentioned only for clarity). Q behaves honestly throughout.

At a high-level, it is first shown that Π must be such that if Scenario 1 occurs, it must result in Q obtaining the correct output with respect to the input of honest $P_1$ i.e $x_1$ with overwhelming probability. Next, it is shown that if Scenario 2 occurs, the output obtained by Q must be with respect to $P_1$'s default input. Building on these properties of Π, it is shown that Π is such that an adversary corrupting $\{P_1, Q\}$ can in fact get multiple evaluations of $f$, which is the final contradiction.

The views of the parties corresponding to each of these scenarios are presented in Tables 11-12. Let $pc_{i\to j}^r$ denote the pairwise communication from $P_i$ to $P_j$ in Round r where r ∈ [2], {i, j}∈[5]. These messages may be a function of the common reference string (denoted by crs) and the PKI setup. Let $\alpha_i$ denote the output of the PKI setup to party $P_i$. $View_i$i denotes the view of party $P_i$ which comprises of crs, $\alpha_i$, its input, randomness and incoming messages. The messages that $P_2, P_3$ are supposed to send in Round 2 to Q, when they did not receive any communication from $P_1$ in Round 1

(which could potentially be different from their communication in an all honest execution), are marked with ~ (such as $\widetilde{pc_{2\to5}^2}$).

TABLE 11

Views of $P_1, P_2, P_3, P_4, Q$ in Scenario 1 & 2.

|  | Scenario 1 | | | | | Scenario 2 | | | | |
|---|---|---|---|---|---|---|---|---|---|---|
|  | View$_1$ | View$_2$ | View$_3$ | View$_4$ | View$_5$ | View$_1$ | View$_2$ | View$_3$ | View$_4$ | View$_5$ |
| Initial Input | $(x_1, r_1,$ crs, $\alpha_1)$ | $(x_2, r_2,$ crs, $\alpha_2)$ | $(x_3, r_3,$ crs, $\alpha_3)$ | $(x_4, r_4,$ crs, $\alpha_4)$ | $(x_5, r_5,$ crs, $\alpha_5)$ | $(x_1, r_1,$ crs, $\alpha_1)$ | $(x_2, r_2,$ crs, $\alpha_2)$ | $(x_3, r_3,$ crs, $\alpha_3)$ | $(x_4, r_4,$ crs, $\alpha_4)$ | $(x_5, r_5,$ crs, $\alpha_5)$ |
| Round 1 | $pc_{2\to1}^1$, $pc_{3\to1}^1$, $pc_{4\to1}^1$, $pc_{5\to1}^1$ | $pc_{2\to2}^1$, $pc_{3\to2}^1$, $pc_{4\to2}^1$, $pc_{5\to2}^1$ | $pc_{2\to3}^1$, $pc_{3\to3}^1$, $pc_{4\to3}^1$, $pc_{5\to3}^1$ | $pc_{2\to4}^1$, $pc_{3\to4}^1$, $pc_{4\to4}^1$, $pc_{5\to4}^1$ | $pc_{2\to5}^1$, $pc_{3\to5}^1$, $pc_{4\to5}^1$, $pc_{5\to5}^1$ | $pc_{2\to1}^1$, $pc_{3\to1}^1$, $pc_{4\to1}^1$, $pc_{5\to1}^1$ | —, $pc_{3\to2}^1$, $pc_{4\to2}^1$, $pc_{5\to2}^1$ | —, $pc_{3\to3}^1$, $pc_{4\to3}^1$, $pc_{5\to3}^1$ | —, $pc_{3\to4}^1$, $pc_{4\to4}^1$, $pc_{5\to4}^1$ | —, $pc_{3\to5}^1$, $pc_{4\to5}^1$, $pc_{5\to5}^1$ |
| Round 2 | — | — | — | — | $pc_{1\to5}^2$, $pc_{4\to5}^2$ | — | — | — | — | $\widetilde{pc_{2\to5}^2}$, $\widetilde{pc_{3\to5}^2}$ |

TABLE 12

Views of $P_1, P_2, P_3, P_4, Q$ in Scenario 3.

|  | Scenario 3 | | | | |
|---|---|---|---|---|---|
|  | View$_1$ | View$_2$ | View$_3$ | View$_4$ | View$_5$ |
| Initial Input | $(x_1, r_1,$ crs, $\alpha_1)$ | $(x_2, r_2,$ crs, $\alpha_2)$ | $(x_3, r_3,$ crs, $\alpha_3)$ | $(x_4, r_4,$ crs, $\alpha_4)$ | $(x_5, r_5,$ crs, $\alpha_5)$ |
| Round 1 | $pc_{2\to1}^1$, $pc_{3\to1}^1$, $pc_{4\to1}^1$, $pc_{5\to1}^1$ | —, $pc_{3\to2}^1$, $pc_{4\to2}^1$, $pc_{5\to2}^1$ | —, $pc_{2\to3}^1$, $pc_{4\to3}^1$, $pc_{5\to3}^1$ | $pc_{1\to4}^1$, $pc_{2\to4}^1$, $pc_{3\to4}^1$, $pc_{5\to4}^1$ | $pc_{1\to5}^1$, $pc_{2\to5}^1$, $pc_{3\to5}^1$, $pc_{4\to5}^1$ |
| Round 2 | — | — | — | — | $\widetilde{pc_{2\to5}^2}$, $\widetilde{pc_{3\to5}^2}$, $pc_{1\to5}^2$, $pc_{4\to5}^2$ |

A sequence of Lemmas are now presented:

Lemma 8.2. Π must be such that if a party $P_i$ behaves honestly in Round 1 (using input $x_i$) and aborts in Round 2, then the output obtained by Q must be wrt $x_i$, with overwhelming probability.

Proof. For the sake of contradiction, assume that when $P_i$ behaves honestly in Round 1 and aborts in Round 2, Q's output y is with respect to default input of $P_i$ with non-negligible probability. Then, a passive Q can learn multiple evaluations of $f$ as follows: Consider a scenario where everyone behaves honestly and Q obtains correct output $f(x_1, x_2, x_3, x_4, x_5)$. Next, Q can locally emulate the scenario when some $P_i$ (say $P_1$) aborts in Round 2 by simply discarding $pc_{1\to5}^2$. This will enable Q to learn $f(\bot, x_2, x_3, x_4, x_5)$ with non-negligible probability as well, where $\bot$ denotes the default input of $P_1$. This is a contradiction, completing the proof of the lemma.

Lemma 8.3. Π is such that if Scenario 1 occurs, then Q obtains $y=f(x_1, x_2, x_3, x_4, x_5)$ with overwhelming probability.

Proof. Suppose Scenario 1 occurs. It follows from security (in particular, correctness) of Π and Lemma 8.2 that Q obtains output $f(x_1, x_2, x_3, x_4, x_5)$ with overwhelming probability.

Lemma 8.4. Π is such that if Scenario 2 occurs, then Q obtains output $f(\bot, x_2, x_3, x_4, x_5)$ with overwhelming probability, where $\bot$ denotes the default input of $P_1$.

Proof. Since Scenario 2 does not involve any communication from $P_1$, the output obtained by an honest Q (as Π achieves guaranteed output delivery) must be on default input of $P_1$. This observation, along with correctness of Π and Lemma 8.2 leads to the conclusion that Q obtains $f(\bot, x_2, x_3, x_4, x_5)$ with overwhelming probability.

Lemma 8.5. Π is such that if Scenario 3 occurs, then the adversary can learn both $f(x_1, x_2, x_3, x_4, x_5)$ and $f(\bot, x_2, x_3, x_4, x_5)$ with overwhelming probability.

Proof. Suppose Scenario 3 occurs. First, Q can obtain $f(x_1, x_2, x_3, x_4, x_5)$: suppose Q discards the Round 2 messages from $P_2$ and $P_3$ (i.e discards $\widetilde{pc_{2\to5}^2}$ and $\widetilde{pc_{3\to5}^2}$ from its view). Then, note that this updated view of Q is identically distributed to its view in Scenario 1 (refer to Tables 11-12). Thus, from Lemma 8.3, Q learns $f(x_1, x_2, x_3, x_4, x_5)$ with overwhelming probability. Similarly, Q can obtain output $f(\bot, x_2, x_3, x_4, x_5)$ as well: suppose Q discards the Round 2 messages from $P_1$ and $P_4$ (i.e discards $pc_{1\to5}^2$ and $pc_{4\to5}^2$ from its view). Then, note that this updated view of Q is identically distributed to its view in Scenario 2 (refer to Tables 11-12). From Lemma 8.4, Q learns $f(\bot, x_2, x_3, x_4, x_5)$ with overwhelming probability, thereby completing the proof.

Lemma 8.5 leads to the final contradiction as it shows that Π is such that an adversary corrupting $\{P_1, Q\}$ can obtain multiple evaluations $f(x_1, x_2, x_3, x_4, x_5)$ and $f(\bot, x_2, x_3, x_4, x_5)$ where honest parties' inputs remains fixed (which violates security). For a concrete example of $f$, refer to $f$ defined in Section III.A (where privacy of $P_2$ can be breached using two distinct choices of $x_1$). This completes the proof of Theorem 8.1.

Circumvention of the Lower Bound. The above lower bound can be circumvented if $f$ involves only a single input. This is because multiple evaluations of $f$ with respect to a non-default and default input of $P_1$ (or any party other than Q) leaks more information than Q is supposed to know only if the function involves at least two inputs (among parties excluding Q). In fact, if this is not the case i.e., only one party among the set of parties excluding Q has an input (say $P_i$), then a two-round protocol with guaranteed output delivery can be derived using a two-party non-interactive secure computation protocol (between $P_i$ and Q) as elaborated at the end of Section III.A.

2. Four-Round Protocol

Note that for this special case of t=2, the general (t+2)-round construction of Section IV.B.3 yields a four-round protocol with guaranteed output delivery.

E. Protocol 2 (Receiving Device does not Provide Inputs)

As stated above in Section I.F.2, Protocol 2 can comprise a two-round PKI-based solitary MPC protocol where the receiving device does not provide an input to the MPC. Protocol 2 can tolerate one dishonest participating device. An exemplary implementation of Protocol 2 is described below with reference to FIGS. 3 and 4. For more detail on Protocol 2, refer to Sections I.F.2 and IV.C.2 above.

FIG. 3 shows a flowchart of a method corresponding to an exemplary implementation of Protocol 2 according to some embodiments. FIG. 4 shows a textual breakdown of some of the steps shown in FIG. 3

At step 302, a public key, a plurality of secret key shares, a plurality of verification keys, and a plurality of signing keys are generated. This step constitutes the PKI setup. The public key can be used by a plurality of input devices to encrypt their respective input shares. The secret key shares can be used by participating devices (the plurality of input devices and the receiving device) to partially decrypt output shares. Signing keys can be used by participating devices to digitally sign messages transmitted to other participating devices. The verification keys can be used to verify digital signatures corresponding to other participating devices.

The PKI setup phase can be performed prior to the implementation of the rest of the method shown in FIG. 3, e.g., the participating devices have access to this PKI infrastructure prior to initiating the multi-party computation protocol. Some or all of the public key, the plurality of secret key shares, the plurality of verification keys, and the plurality of signing keys can be generated by a trusted external server and provisioned to the participating devices. As an alternative, the participating devices could perform a multi-party protocol in order to establish these cryptographic keys. It is assumed however, in either case, each participating device possesses the public key, a respective secret key share, a respective signing key, and the plurality of verification keys prior to step 304.

At step 304, each input device can encrypt an input share $x_i$ with the public key pk to form an encrypted input $[[x_i]]$. The input devices can encrypt their respective input shares using a decentralized threshold fully homomorphic encryption (dTFHE) scheme. Example techniques for such encryption are described herein.

At step 306, each input device can optionally calculate or otherwise generate a non-interactive zero knowledge (NIZK) proof $\pi_i$ (sometimes referred to as an "input proof") using a common reference string crs, a statement $st_i$, and a witness $wit_i$. The input proof and the common reference string can be used by other participating devices to verify that the input device correctly encrypted the encrypted input $[[x_i]]$. Example techniques for generation of such proofs is described herein. Similarly, details of other steps can be performed using techniques described in this disclosure.

At step 308, each input device can form a signature by signing the encrypted input and optionally the input proof using their respective signing key. This signature can be used by other participating devices to verify the source of the encrypted input and input proof, i.e., verify which input device generated the encrypted input and input proof. Other participating devices can use a verification key corresponding to the signing key in order to verify the signature. In some embodiments, a signing key and the corresponding verification key may comprise a public-private key pair.

At step 310, each input device can transmit a tuple ($[[x_i]]$, $\pi_i$, $\sigma_i$) comprising the encrypted input, optionally the input proof, and the signature to one or more other input devices (i.e., one or more input devices from the plurality of input devices, excluding the input device performing the transmission). Each input device can perform these transmissions over pairwise-private channels directly to their intended recipient, e.g., using the public key of the other device. Each input device can, for example, establish a session key (e.g., using the public key of the other device the instant device's private key) with each other input device, then use the session key to encrypt communications (e.g., the tuples) sent to those input devices.

Likewise at step 310, each input device can receive one or more other tuples from the one or more other input devices. Each of these other tuples can comprise an encrypted input (sometimes referred to as an "other encrypted input"), an input proof (sometimes referred to as an "other input proof") and a signature (sometimes referred to as an "other signature"). Step 310 comprises the first of two communication "rounds" performed by the participating devices.

At step 312, each input device can perform a series of verification checks in order to determine if any other input device is acting dishonestly. One such check can comprise verifying that the input device received another tuple from each of the other input devices (i.e., that no input device neglected to send another input device a tuple). Thus, in some embodiments, the determination of valid encrypted outputs can merely be to determine that the type was received. Another check can comprise verifying one or more other signatures, corresponding to the one or more other tuples using the one or more encrypted inputs and the verification keys (i.e., verifying that each other tuple includes a valid signature). A third check can comprise verifying one or more other input proofs corresponding to the one or more other tuples using the common reference string (i.e., verifying that each other input device correctly encrypted their respective input share).

The verification checks performed in step 312 can be used by the input devices to determine if any other input devices are dishonest. If any of the verification checks fail, the input devices can conclude that the input device corresponding to the failed tuple is dishonest. Since Protocol 2 only allows for at most one dishonest participant, the honest input devices can conclude that the receiving device is also honest.

Thus, at step 314, if an input device does not receive another tuple from each of the other input devices, or the input device fails to verify any other signature of the one or more other signatures, or if the input device fails to verify any other input proof of the one or more other input proofs, the input device can transmit their input share directly to the receiving device. The input device can do this because the receiving device is honest for the reasons described above. The receiving device can use this input share, and one or more other input shares received from the other honest input devices to calculate an output of the multi-party computation (i.e., at step 330).

Otherwise, if the tuples verify correctly, at step 316, each input device can compute a an encrypted output $[[y]]$ (sometimes referred to as a first encrypted output) using a plurality of valid encrypted inputs. In Protocol 2, these valid encrypted inputs can comprise the encrypted input generated by the input device, and the one or more other encrypted inputs included in the one or more other tuples. The input devices can use a dTFHE evaluation function (see FIG. 4) in order to generate the first encrypted output [[y]].

At step 318, each input device can partially decrypt the first encrypted output [[y]] using their respective secret key share $sk_i$ (sometimes referred to as a "first secret key share"), thereby generating a first partially decrypted output [[y: $sk_i$]]. Each input device can use dTFHE functions in order to generate the partially decrypted output, e.g., a dTFHE partial decryption function (see FIG. 4).

At step 320, each input device can optionally generate a NIZK decryption proof $\pi_i^{dec}$ based on their respective first partially decrypted output [[y: $sk_i$]]. This decryption proof can be used by the receiving device to verify that the partially decrypted output was partially decrypted correctly. Each input device can form a second tuple ($\{[\![ x_j ]\!], \pi_j, \sigma_j\}_{j \in [n-1]}$, $[\![ y ]\!]$, $[\![ y: sk_i ]\!]$, $\pi_i^{dec}$) comprising the first encrypted output [[y]], their respective first partially decrypted outputs [[y:$sk_i$]], and their respective decryption proofs $\pi_i^{dec}$. The second tuple can additionally comprise the tuple and the one or more other tuples $\{[\![ x_j ]\!], \pi_j, \sigma_j\}_{j \in [n-1]}$, i.e., the set of tuples shared among the input devices in the first communication round. These tuples can be used by the receiving device to check whether the plurality of input devices transmitted an identical tuple (or an identical other tuple) to each input device of the plurality of input devices.

At step 322, each input device can transmit the second tuple to the receiving device. The receiving device can use the information in these second tuples (e.g., the partially decrypted outputs [[y: $sk_i$]]) to generate the decrypted output, completing the MPC protocol. Step 322 comprises the second of two communication rounds.

At step 324, the receiving device can verify the plurality of second tuples (sometimes referred to as "decryption tuples" or "additional tuples") received from the plurality of input devices. The receiving device can perform verification steps similar to those performed by the input devices in step 312. For example, the receiving device can verify, for each tuple of the plurality of second tuples, a corresponding decryption proofs $\pi_i^{dec}$ included in the plurality of second tuples using the common reference string. The receiving device can additionally verify the encryption proofs included in the tuple and the one or more other tuples (optionally included in the plurality of second tuples in step 320) using the common reference string, and verify the signatures corresponding to each tuple and other tuple using their corresponding verification keys. These checks can be performed to verify that the input devices did not behave dishonestly, e.g., by transmitting a different valid tuple to two honest input devices.

At step 326, the receiving device can generate and partially decrypt the encrypted output [[y]] using a receiving secret key share $sk_n$ (i.e., the secret key share corresponding to the receiving device), thereby generating a partially decrypted output [[y: $sk_n$]] (sometimes referred to as a second partially decrypted output to differentiate it from the partially decrypted outputs [[y: $sk_i$]] received in the plurality of second tuples). The receiving device can generate the encrypted output [[y]] (sometimes referred to as a "second encrypted output") using the encrypted inputs contained in the tuple and one or more other tuples. Alternatively, the receiving device can directly use the encrypted output contained in the plurality of second tuples. The receiving device can generate the second encrypted output [[y]] using a dTFHE evaluation function (as shown in FIG. 4), and partially decrypt the second encrypted output using a dTFHE partial decryption function.

At step 328, the receiving device can combine the plurality of partially decrypted outputs (received in the plurality of second or additional tuples) and the second partially decrypted output, thereby generating a decrypted output y. The receiving device can use a dTFHE combination function (as shown in FIG. 4) to generate the decrypted output y.

As an alternative, if the honest input devices transmit their input shares directly to the receiving device in step 314, the receiving device can use the input shares to directly calculate the output of the function implemented by the MPC. For example, if the function comprises a training function for a machine learning model, the receiving device can use the unencrypted input shares as training data in order to train the machine learning model.

In either case, the receiving device, and only the receiving device, receives the unencrypted output y, satisfying the solitary and guaranteed output delivery properties of the protocol.

F. Protocol 3 (Receiving Device Provides Inputs)

As stated above in Section I.F.3, Protocol 3 can comprise a three-round PKI-based solitary MPC protocol where the receiving device provides an input to the MPC. Protocol 3 can tolerate one dishonest participating device. An exemplary implementation of Protocol 3 is described below with reference to FIGS. 5 and 6. For more detail on Protocol 3, refer to Sections I.F.3 and IV.C.3 above. FIGS. 5 and 6 show two parts of a flowchart of a method corresponding to an exemplary implementation of Protocol 3 according to some embodiments.

At step 502 of FIG. 5, a public key, a plurality of secret key shares, a plurality of verification keys, and a plurality of signing keys are generated. This step constitutes the PKI setup. The public key can be used by a plurality of input devices to encrypt their respective input shares. The secret key shares can be used by participating devices (the plurality of input devices and the receiving device) to partially decrypt output shares. Signing keys can be used by participating devices to digitally sign messages transmitted to other participating devices. The verification keys can be used to verify digital signatures corresponding to other participating devices.

The PKI setup phase can be performed prior to the implementation of the rest of the method shown in FIG. 4, i.e., the participating devices have access to this PKI infrastructure prior to initiating the multi-party computation protocol. Some or all of the public key, the plurality of secret key shares, the plurality of verification keys, and the plurality of signing keys can be generated by a trusted external server and provisioned to the participating devices. As an alternative, the participating devices could perform a multi-party protocol in order to establish these cryptographic keys. It is assumed however, in either case, each participating device possesses the public key, a respective secret key share, a respective signing key, and the plurality of verification keys prior to step 504.

At step 504, the receiving device can encrypt an input share $x_n$, using the public key pk to generate form an encrypted input [[$x_n$]]. This encrypted input [[$x_n$]] may be referred to as a "receiving encrypted input" to differentiate it from encrypted inputs [[$x_i$]] generated by other (non-receiving) input devices at step 512. The receiving device can encrypt the input share using a decentralized threshold fully homomorphic encryption (dTFHE) scheme.

At step 506, the receiving device can optionally calculate or otherwise generate a NIZK proof $\pi_n$ (sometimes referred to as a "receiving input proof") using a common reference string crs, a statement $st_n$, and a witness $wit_n$. The receiving input proof and the common reference string can be used by the input devices to verify that the receiving device correctly encrypted the receiving party input $[[x_n]]$.

At step 508, the receiving device can form a receiving signature by signing the receiving encrypted input and optionally the receiving input proof using their respective signing key (sometimes referred to as a receiving signing key). The receiving signature can be used by the input devices to verify the source of the receiving encrypted input and the receiving input proof, i.e., verify that the receiving device generated the receiving encrypted input and the receiving input proof. The input devices can use a verification key corresponding to the receiving signing key in order to verify the signature. In some embodiments the receiving signing key and the corresponding verification key may comprise a public-private key pair.

At step 510, the receiving device can transmit a receiving tuple ($[[x_n]]$, $\pi_n$, $\sigma_n$) comprising the receiving encrypted input, the receiving input proof, and the receiving signature to the plurality of input devices. The receiving device can perform these transmissions over pairwise-private channels directly to their intended recipient. The receiving device and each input device can, for example, establish a session key (e.g., using the public key of the other device the instant device's private key), then use the session key to encrypt communications (e.g., the tuples) sent to those input devices. Step 510 comprises the first of three communication rounds performed by the participating devices.

At step 512, each input device can encrypt an input share $x_i$ with the public key pk to form an encrypted input $[[x_i]]$. The input devices can encrypt their respective input shares using a decentralized threshold fully homomorphic encryption (dTFHE) scheme.

At step 514, each input device can optionally calculate or otherwise generate a NIZK proof $\pi_i$ (sometimes referred to as an "input proof") using a common reference string crs, a statement $st_i$, and a witness $wit_i$. the input proof can be used by other participating devices to verify that the input device correctly encrypted the encrypted input $[[x_i]]$ when used in conjunction with the common reference string.

At step 516, each input device can form a signature by signing the encrypted input and the input proof using their respective signing key. This signature can be used by other participating devices to verify the source of the encrypted input and input proof, i.e., verify which input device generated the encrypted input and input proof. Other participating devices can use a verification key corresponding to the signing key in order to verify the signature. In some embodiments, a signing key and the corresponding verification key may comprise a public-private key pair.

At step 518, each input device can transmit a tuple ($[[x_i]]$, $\pi_i$, $\sigma_i$) comprising the encrypted input, the input proof, and the signature to one or more other input devices (i.e., one or more input devices from the plurality of input devices, excluding the input device performing the transmission). Each input device can perform these transmissions over pairwise-private channels directly to their intended recipient. Each input device can, for example, establish a session key with each other input device (e.g., using the public key of the other device the instant device's private key), then use the session key to encrypt communications (e.g., the tuples) sent to the other input device.

Likewise at step 518, each input device can receive one or more other tuples from the one or more other input devices. Each of these other tuples can comprise an encrypted input (sometimes referred to as an "other encrypted input"), an input proof (sometimes referred to as an "other input proof") and a signature (sometimes referred to as an "other signature").

At step 520, each input device can transmit the receiving tuples received at step 510 to the one or more other input devices. Each input device can thereby receive one or more other receiving tuples from the one or more other input devices. By sharing the receiving tuples among one another, the input devices can verify whether the receiving device was dishonest in a subsequent step, e.g., by verifying that the receiving device did not send two different but otherwise valid (e.g., possessing valid proofs and signatures) tuples to two different input devices. Steps 518 and 520 comprise the second of three communication rounds.

At step 522, each input device can perform a series of verification checks in order to determine if the receiving device is acting dishonestly. One such check can comprise verifying the receiving signature corresponding to the receiving tuple using a corresponding verification key (sometimes referred to as a "receiving verification key"). Another check can comprise verifying the receiving input proof corresponding to the receiving tuple using the common reference string (i.e., verifying that the receiving device correctly encrypted the receiving encrypted input). A third check can involve verifying that the receiving device didn't send two valid (i.e., possessing valid receiving signatures and receiving proofs) but otherwise distinct tuples to two different input devices. Each input device can perform this check by comparing the receiving tuple it received at step 510 to the one or more receiving tuples received at step 520 to order to verify that they are identical.

At step 524, if the receiving tuples fail the verification step, e.g., caused by the receiving device transmitting different tuples to different input devices, the input devices can conclude that the receiving device is dishonest and abort the MPC protocol.

Otherwise, referring now to FIG. 6, at step 526, the input devices can verify the one or more other tuples received from the one or more other input devices at step 518. Each input device can perform a series of verification checks in order to determine if any other input device is acting dishonestly. One such check can comprise verifying that the input device received another tuple from each of the other input devices (i.e., that no input device neglected to send another input device a tuple). Another check can comprise verifying one or more other signatures, corresponding to the one or more other tuples using the using the one or more encrypted inputs and the verification keys (i.e., verifying that each other tuple includes a valid signature). A third check can comprise verifying one or more other input proofs corresponding to the one or more other tuples using the common reference string (i.e., verifying that each other input device correctly encrypted their respective input share).

The verification checks performed at step 526 can be used by the input device to determine if any other input devices are dishonest. If any of the verification checks fail, the input device can conclude that the input device corresponding to the failed tuple is dishonest. Since Protocol 2 only allows for at most one dishonest participating, the honest input devices can conclude that that the receiving device is also honest. This is further supported by the checks previously performed at step 522.

Thus, at step 528, if an input device does not receive another tuple from each of the other input devices, or the input device fails to verify any other signature of the one or more other signatures, or if the input device fails to verify any other input proof of the one or more other input proofs, the input device can transmit their input share directly to the receiving device. The input device can do this because the receiving device is honest for the reasons described above. The receiving device can use this input share, one or more other input shares received from the other honest input devices, and the receiving input share to calculate an output of the multi-party computation (i.e., at step 542).

Otherwise, if the input device tuples verify correctly, at step 530, each input device can compute an encrypted output [[y]] (sometimes referred to as a first encrypted output) using a plurality of valid encrypted inputs. In Protocol 3, these valid encrypted inputs can comprise the encrypted input generated by the input device, and the one or more other encrypted inputs included in the one or more other tuples. The input devices can use a dTFHE evaluation function (see FIG. 4) in order to generate the first encrypted output [[y]].

At step 532, each input device can partially decrypt the first encrypted output [[y]] using their respective secret key share $sk_i$ (sometimes referred to as a "first secret key share"), thereby generating a first partially decrypted output [[y: $sk_i$]]. Each input device can use dTFHE functions in order to generate the partially decrypted output, e.g., a dTFHE partial decryption function.

At step 534, each input device can optionally generate a NIZK decryption proof $\pi_i^{dec}$ based on their respective first partially decrypted output [[y: $sk_i$]]. This decryption proof can be used by the receiving device to verify that the partially decry ted output was partially decrypted correctly. Each input device can form a second tuple ($\{[\![x_j]\!], \pi_j, \sigma_j\}_{j \in [n-1]}$, $[\![y]\!]$, $[\![y: sk_i]\!]$, $\pi_i^{dec}$) comprising the first encrypted output [[y]], their respective first partially decrypted outputs [[y:$sk_i$]], and their respective decryption proofs $\pi_i^{dec}$. The second tuple can additionally comprise the tuple and the one or more other tuples $\{[\![x_j]\!], \pi_j, \sigma_j\}_{j \in [n-1]}$, i.e., the set of tuples shared among the input devices in the second communication round. These tuples can be used by the receiving device to check whether the plurality of input devices transmitted an identical tuple (or an identical other tuple) to each input device of the plurality of input devices.

At step 536, each input device can transmit the second tuple to the receiving device. The receiving device can use the information in these second tuples (e.g., the partially decrypted outputs [[y: $sk_i$]]) to generate the decrypted output, completing the MPC protocol. Step 322 comprises the third of three communication rounds.

At step 538, the receiving device can verify the plurality of second tuples (sometimes referred to as "decryption tuples" or "additional tuples") received from the plurality of input devices. The receiving device can perform verification steps similar to those performed by the input devices in step 522 and 526. For example, the receiving device can verify for each tuple of the plurality of second tuples, a corresponding decryption proofs $\pi_i^{dec}$ included in the plurality of second tuples using the common reference string. The receiving device can additionally verify the encryption proofs included in the tuple and the one or more other tuples (optionally included in the plurality of second tuples in step 534) using the common reference string, and verify the signatures corresponding to each tuple and other tuple using their corresponding verification keys. These checks can be performed to verify that the input devices did not behave dishonestly, e.g., by transmitting a different valid tuple to two honest input devices.

At step 540, the receiving device can generate and partially decrypt the encrypted output [[y]] using a receiving secret key share $sk_n$ (i.e., the secret key share corresponding to the receiving device), thereby generating a partially decrypted output [[y: $sk_n$]] (sometimes referred to as a second partially decrypted output to differentiate it from the partially decrypted outputs [[y: $sk_i$]] received in the plurality of second tuples). The receiving device can generate the encrypted output [[y]] (sometimes referred to as a "second encrypted output") using the encrypted inputs contained in the tuple and one or more other tuples, as well as the receiving encrypted input generated by the receiving device at step 504. Alternatively, the receiving device can directly use the encrypted output contained in the plurality of second tuples. The receiving device can generate the second encrypted output [[y]] using a dTFHE evaluation, and partially decrypt the second encrypted output using a dTFHE partial decryption function.

At step 542, the receiving device can combine the plurality of partially decrypted outputs (received in the plurality of second or additional tuples) and the second partially decrypted output, thereby generating a decrypted output y. The receiving device can use a dTFHE combination function to generate the decrypted output y.

As an alternative, if the honest input devices transmit their input shares directly to the receiving device in step 528, the receiving device can use the input shares to directly calculate the output of the function implemented by the MPC. For example, if the function comprises a training function for a machine learning model, the receiving device can use the unencrypted input shares as training data in order to train the machine learning model.

In either case, the receiving device, and only the receiving device, receives the unencrypted output y, satisfying the solitary and guaranteed output delivery properties of the protocol.

G. Protocol 4 (Receiving Device Provides Inputs and Dishonest Participating Devices)

As stated above in Section I.F.4, Protocol 4 can comprise a five-round PKI-based solitary MPC protocol where the receiving device can provide an input to the MPC. Protocol 4 can tolerate an arbitrary minority of dishonest participating devices. An exemplary implementation of Protocol 4 is described below with reference to FIGS. 7-10. For more detail on Protocol 4, refer to Sections I.F.4 and IV.B.1 above.

Figure 7:
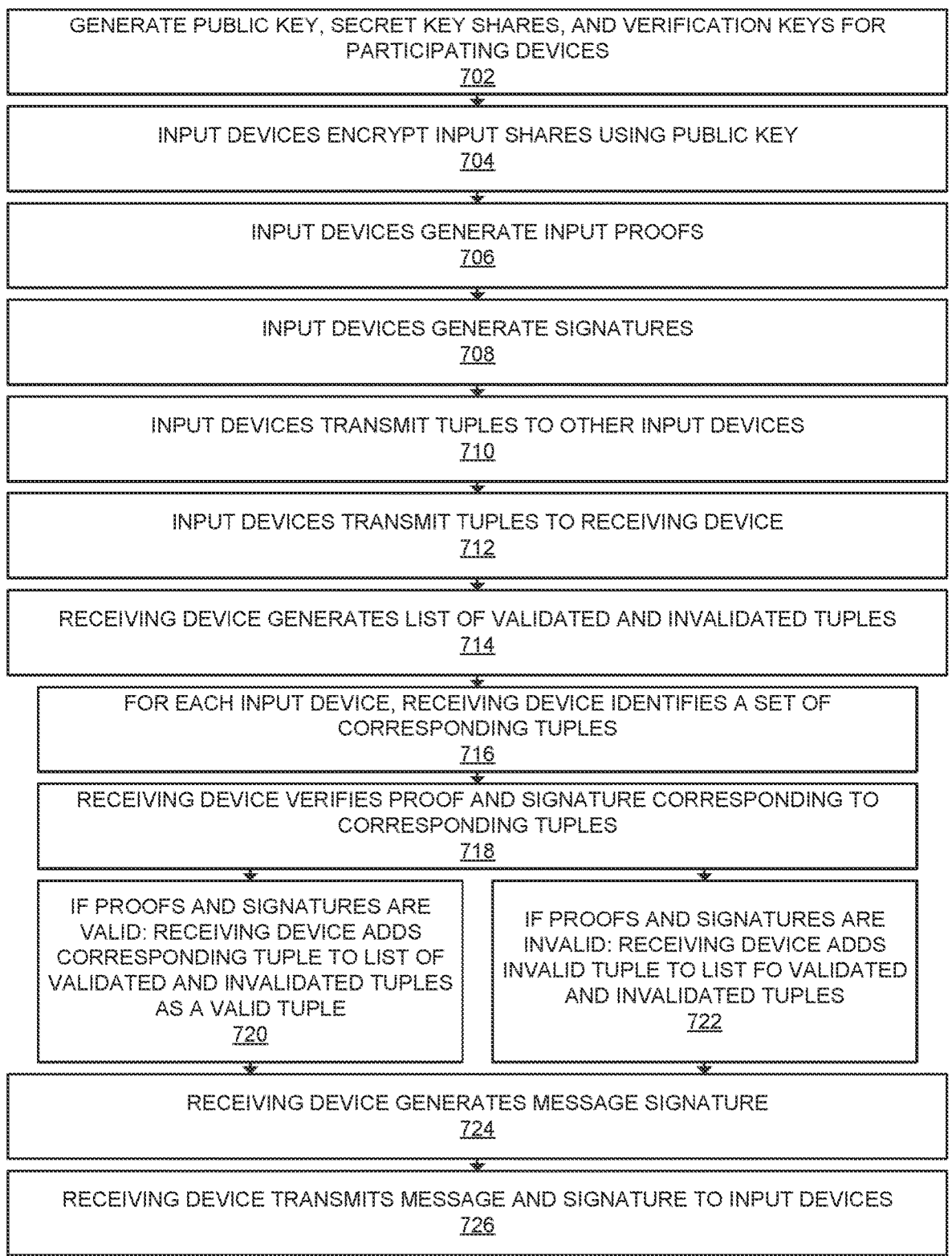
FIG. 7 shows a flowchart corresponding to a first part of an exemplary general PKI-based MPC protocol (protocol 4) according to some embodiments.
Figure 8:
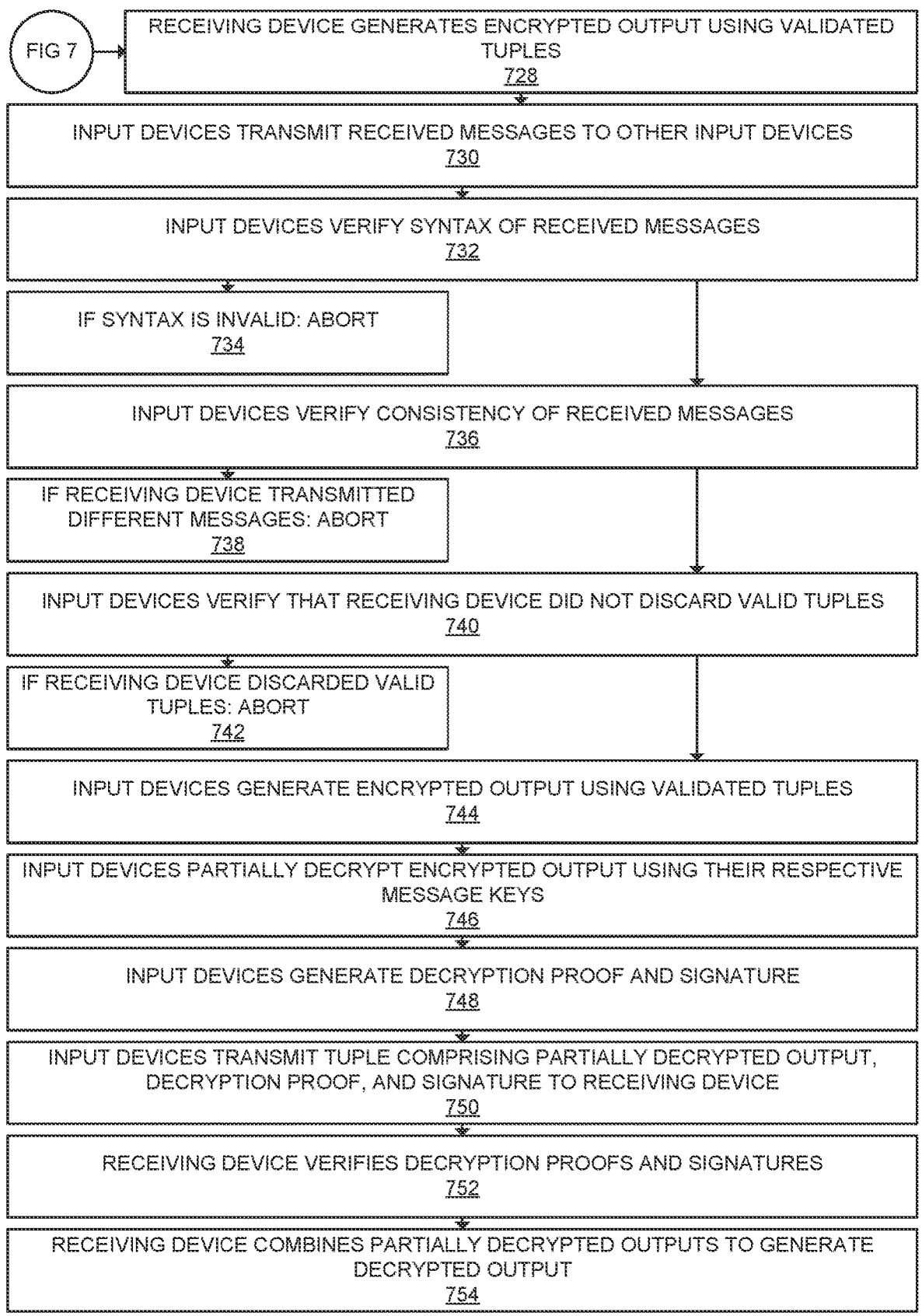
FIG. 8 shows a flowchart corresponding to a second part of an exemplary general PKI-based MPC protocol (protocol 4) according to some embodiments.

FIGS. 7 and 8 show flowcharts detailing a first part and a second part (respectively) of a method corresponding to an exemplary implementation of Protocol 4 according to some embodiments. FIGS. 9 and 10 show a textual breakdown of some of the steps shown in FIGS. 7 and 8.

At step 702, a public key, a plurality of secret key shares, a plurality of verification keys, and a plurality of signing keys are generated. This step constitutes the PKI setup. The public key can be used by a plurality of input devices to encrypt their respective input shares. The secret key shares can be used by participating device (the plurality of input devices and the receiving device) to partially decrypt output shares. Signing keys can be used by participating devices to digitally sign messages transmitted to other participating devices. The verification keys can be used to verify digital signatures corresponding to other participating devices.

It is assumed that in most implementations that the PKI set phase is performed prior to the implementation of the rest of the method shown in FIGS. 7 and 8, i.e., the participating devices have access to this PKI infrastructure prior to initiating the multi-party computation protocol. Some or all of the public key, the plurality of secret key shares, the plurality of verification keys, and the plurality of signing keys can be generated by a trusted external server and provisioned to the participating devices. As an alternative, the participating devices could perform a multi-party protocol in order to establish these cryptographic keys. It is assumed however, in either case, each participating device possesses the public key, a respective secret key share, a respective signing key, and the plurality of verification keys prior to step 704.

At step 704, each input device can encrypt an input share $x_i$ with the public key pk to form an encrypted input $[[x_i]]$. The input device can encrypt their respective input share using a dTFHE scheme.

At step 706, each input device can optionally calculate or otherwise generate a NIZK proof $\pi_i$ (sometimes referred to as an "input proof") using a common reference string crs, a statement $st_i$, and a witness $wit_i$. The input proof and the common reference string can be used by the other participating devices to verify that the input device correctly encrypted the encrypted input $[[x_i]]$.

At step 708, each input device can form a signature by signing the encrypted input and the input proof using their respective signing key. This signature can be used by other participating devices to verify the source of the encrypted input and the input proof, i.e., verify which input devices generated the encrypted input and input proof. Other participating devices can use a verification key corresponding to the signing key in order to verify the signature. In some embodiments, a signing key and the corresponding verification key may comprise a public-private key pair At step 710, each input device can transmit a tuple $([[x_i]], \pi_i, \sigma_i)$ comprising the encrypted input, the input proof, and the signature to a plurality of other input devices. Notably, because Protocol 4 supports receiving device inputs, this plurality of other input devices can include the output device. Each input device can perform these transmissions over pairwise-private channels directly to their intended recipient. Each input device can, for example, establish a session key with each other input device (e.g., using the public key of the other device the instant device's private key), then use the session key to encrypt communications (e.g., the tuples) sent to those input devices.

Likewise at step 710, each input device can receive a plurality of other tuples from the plurality of other input devices. Each of these other tuples can comprise an encrypted input (sometimes referred to as an "other encrypted input"), an input proof (sometimes referred to as an "other input proof") and a signature (sometimes referred to as an "other signature"). Step 710 comprises the a first communication "round" (out of five) performed by the participating devices.

At step 712, each input device can transmit the plurality of other tuples received from the plurality of other input devices to the receiving device. The receiving device can use these tuples to verify that the input devices transmitted consistent tuples to the other input devices. Additionally, the receiving device can evaluate these tuples to generate a list of validated and invalidated tuples, as described at step 714 below.

At step 714, the receiving device can generate a list of validated and invalidated tuples. Encrypted inputs corresponding to the validated tuples can later be used to generate the encrypted output $[[y]]$, which can subsequently be used to generate the decrypted output y. Step 714 comprises four sub-steps: 716-722 described below.

At step 716, for each input device, the receiving device can determine a plurality of corresponding tuples. This plurality of corresponding tuples can comprise tuples that originated from the corresponding input device. For example, for "input device 1," the list of corresponding tuples can comprise a tuple sent by input device 1 to "input device 2," a tuple sent by input device 1 to 'input device 3," etc. It can also include tuples sent to the receiving device in step 712, for example, a tuple sent by input device 3 to the receiving device that was allegedly sent by input device 1 to input device 3.

At step 718, for each corresponding tuple of the plurality of corresponding tuples, the receiving device can verify a corresponding signature using a corresponding verification key and verifying a corresponding input proof using a common reference string. In other words, the receiving device can verify whether or not the corresponding tuples are valid.

At step 720, if at least one corresponding tuple of the plurality of corresponding tuples comprises a verifiable corresponding signature and a verifiable corresponding input proof, the receiving device can include the corresponding tuple in the list of validated and invalidated tuples as a receiver-validated tuple. This receiver-validated tuple can comprise a receiver-validated encrypted input, a receiver-validated signature and a receiver-validated zero-knowledge proof. This valid tuple can later be used to generate the encrypted output $[[y]]$ (e.g., in steps 728 and 744).

At step 722, if no corresponding tuples of the plurality of corresponding tuples comprise a verifiable corresponding signature and a verifiable corresponding input proof, the receiving device can include an invalidated tuple (sometimes referred to as invalid tuples) in the list of validated and invalidated tuples, indicating that the corresponding input device did not generate and transmit a valid tuple to any of the other participating devices.

At step 724, the receiving device can generate a message comprising the list of validated and invalidated tuples (which can comprise one or multiple receiver-validated tuples in addition to the invalidated tuples), then generate a message signature by digitally signing the message using a signing key corresponding to the receiving device.

At step 726, the receiving device can transmit the message and signature to the input devices, allowing the input devices to calculate the encrypted output $[[y]]$ using a plurality of validated tuples from the list of validated and invalidated tuples. The input devices can verify the signature using a message signature verification key (e.g., a verification key corresponding to the receiving device)

Referring now to FIG. 8, at step 728, the receiving device can generate an encrypted output $[[y]]$ using the plurality of validated tuples from the list of validated and invalidated tuples.

At step 730, each input device can transmit the message received from the receiving device at step 726 to each other input device. The input devices can thereby receive a plurality of messages and a plurality of message signatures from the plurality of other input devices. The input devices can transmit the message to one another in order to verify that the receiving device sent consistent messages to each of the input devices (e.g., at step 736).

At step 732, the input devices can verify the syntax of the received messages. The expected syntax of the received messages can comprise a list comprising device identifiers corresponding to the input devices, followed by the tuples corresponding to those input devices, e.g., "Input device $1 \| ([[x_1]], \pi_1, \sigma_1) \|$ Input device $2 \| ([[x_2]], \pi_2, \sigma_2) \| \ldots$ " if a tuple corresponding to a particular input device is invalid, the message can include an invalid character "⊥," e.g., " . . . ||Input device 3||⊥".

At step 734, if the input devices determine that the message syntax is invalid, the input devices can conclude that either the receiving device is dishonest or there is some issue with communications between the input devices and the receiving device (e.g., packet loss, communication noise, etc.) and abort the protocol. The input devices can transmit a termination message to the receiving device in order to abort the protocol At step 736, the input devices can verify that the receiving device sent consistent messages to each of the input device. Each input device can compare the message it received at step 726 to the messages received from the other input devices at step 730.

At step 738, if the input devices determine that the receiving device transmitted different messages to different input devices, the input devices can conclude that the receiving device is dishonest and abort the MPC protocol. The input devices can transmit a termination message to the receiving device in order to abort the protocol.

At step 740, the input devices can verify that the receiving devices did not discard or otherwise invalidate valid tuples during step 714. The input devices can do this by comparing the tuples received from the other input devices at step 710 to the plurality of invalidated tuples contained in the list of validated and invalidated tuples. If a tuple is labeled as invalidated, but the corresponding tuple received at step 710 is valid (e.g., it possesses a valid input proof and valid signature), the flowchart proceeds to step 742.

At step 742, if the receiving device was found to discard or exclude valid tuples, the input devices can conclude that the receiving device is dishonest and abort the MPC protocol. The input devices can transmit a termination message to the receiving device in order to abort the protocol.

At step 744, each input device can compute an encrypted output [[y]] using a plurality of validated tuples contained in the list of validated and invalidated tuples. The input devices can use a dTFHE evaluation function in order to generate the encrypted output [[y]].

At step 746, each input device can partially decrypt the first encrypted output [[y]] using their respective secret key share $sk_i$ thereby generating a first partially decrypted output [[y: $sk_i$]]. Each input device can use a dTFHE partial decryption function in order to generate the partially decrypted output.

At step 748, each input device can generate a NIZK decryption proof $\pi_i^{dec}$ based on their respective first partially decrypted output [[y: $sk_i$]]. This decryption proof can be used by the receiving device to verify that the partially decrypted output was partially decrypted correctly. Each input device can also form a signature by signing the partially decrypted output and the decryption proof using their corresponding signing key. Each input device can form a second tuple ($\{[\![x_j]\!], \pi_j, \sigma_j\}_{j \in [n-1]}$, $[\![y]\!]$, $[\![y: sk_i]\!]$, $\pi_i^{dec}$, $\sigma_i$) comprising the first encrypted output [[y]], their respective first partially decrypted outputs [[y:$sk_i$]], their respective decryption proofs $\pi_i^{dec}$, and the signature $\sigma_i$. The second tuple can additionally comprise the tuple and the one or more other tuples $\{[\![x_j]\!], \pi_j, \sigma_j\}_{j \in [n-1]}$, i.e., the set of tuples shared among the input devices in the first communication round. These tuples can be used by the receiving device to check whether the plurality of input devices transmitted an identical tuple (or an identical other tuple) to each input device of the plurality of input devices. An identical tuple can be determined to match. A matching tuple can also be determined according to one or more other matching criteria, e.g., that a threshold number of bits match.

At step 750, the input devices can transmit a plurality of tuples to the receiving device, each tuple of the plurality of tuples comprising a partially decrypted output [[y: $sk_i$]], a decryption proof, and a signature At step 752, the receiving device can verify the decryption proofs and signatures associated with the plurality of tuples received in step 750, in order to verify that none of the input devices are behaving dishonestly.

At step 754, the receiving device can combine the plurality of partially decrypted outputs, thereby generating a decrypted output y. The receiving device can use a dTFHE combination function (as shown in FIG. 10) to generate the decrypted output y.

H. Protocol 5 (Two Dishonest Participating Devices)

As stated above in Section I.F.5, Protocol 5 can comprise a three-round PKI-based solitary MPC protocol that tolerates two dishonest participating devices. An exemplary implementation of Protocol 5 is described below with reference to FIGS. 11, 12, and 13. For more detail on Protocol 5, refer to Section I.F.5 above.

Generally, in Protocol 5, the input devices each generate garbled circuits that produce the partially decrypted outputs [[y: $sk_i$]] corresponding to each input device, when provided with the garbled circuit labels corresponding to the encrypted inputs [[$x_i$]]. The input devices can transmit these garbled circuits to the receiving device. The input devices can then perform four intermediate MPC protocols $\pi_1$, $\pi_2$, $\pi_3$, $\pi_4$ with the receiving device. The output of each of these four intermediate MPC protocols can comprise either the garbled circuit labels used to evaluate the garbled circuits, or values that can be used to derive the garbled circuit labels. The receiving device can then evaluate the garbled circuits with the garbled circuit labels to produce the partially decrypted outputs [[y: $sk_i$]] and then combine the partially decrypted outputs to produce the decrypted output y.

FIG. 11 shows a first part of a flowchart of a method corresponding to an exemplary implementation of Protocol 5 according to some embodiments. FIG. 12 shows a second part of a flowchart of a method corresponding to the exemplary implementation of Protocol 5 according to some embodiments. FIG. 13 shows a flowchart of a method corresponding to an intermediate MPC according to some embodiments.

Referring to FIG. 11, at step 1102, each input device can encrypt an input share $x_i$ with a public key pk to form a first encrypted input [[$x_i$]]. The input devices can encrypt their respective input shares using a decentralized threshold fully homomorphic encryption (dTFHE) scheme. It is assumed that prior to step 1102, PKI has been setup or otherwise established, and the participating devices are in possession of any necessary cryptographic keys (such as the public key pk, any number of secret key shares $sk_i$, any number of signing keys, and any number of verification keys) or other cryptographic materials, as described above with reference to Protocols 2 and 3 and FIGS. 3-6.

At step 1104, each input device can generate one-time pads $r_i$ (also referred to as a masking value), first input proofs $\pi_i^{input}$, and first signatures $\sigma_i$. Each input device can calculate or otherwise generate a NIZK first input proof $\pi_i^{input}$ using a common reference string crs, a statement $st_i$, and a witness $wit_i$. the first input proof and the common reference string can be used by other participating devices to verify that the input device correctly encrypted the first encrypted input [[$x_i$]]. Each input device can form the first signature by signing the first encrypted input and the first input proof using their respective signing key. This first signature can be used by other participating devices to verify the source of the first encrypted input and first input proof, i.e., verify which input device generated the first encrypted input and first input proof. Other participating devices can use a verification key corresponding to the signing key in order to verify the first signature. In some embodiments, a signing key and the corresponding verification key may comprise a public-private key pair.

The input devices can generate the one-time pads using any appropriate method, such as the use of cryptographically secure random number generators. The one-time pads can be used to encrypt the first encrypted inputs in a later step (step 1118) in order to securely communicate those first encrypted inputs to the receiving device. The one-time pads also can comprise inputs to one of four intermediate MPC protocols ($\pi_1, \pi_2, \pi_3, \pi_4$), which can be performed by the input devices and the receiving device.

At step 1106, each input device can transmit a first tuple ($[[x_i]], \pi_i, \sigma_i$) comprising the first encrypted input, the first input proof, and the first signature to the plurality of other input devices. Each input devices can perform these transmissions over pairwise-private channels directly to their intended recipient. Each input device can, for example, establish a session key with each other input device (e.g., using the public key of the other device the instant device's private key), then use the session key to encrypt communications (e.g., the tuples) sent to those input devices.

Likewise at step 1106, each input device can receive a plurality of other tuples from the plurality of other input devices. Each of these other tuples can comprise a first encrypted input (sometimes referred to as "another first encrypted input"), a first input proof (sometimes referred to as an "other first input proof"), and a signature (sometimes referred to as an "other first signature").

At step 1108, each input device can generate a garbled circuit that can use a plurality of first sets of garbled circuit labels to produce a first partially decrypted output, the first partially decrypted output corresponding to the first encrypted input and a plurality of other first encrypted inputs corresponding to the plurality of other first tuples. Each input device can additionally generate a first set of garbled circuit labels corresponding to the first encrypted inputs and the garbled circuits. As stated above, these garbled circuits can transmitted to the receiving device, which can use the garbled circuits and their corresponding sets of input labels to produce the partially decrypted outputs [[y: $sk_i$]].

At step 1110, the input devices can transmit the plurality of other first tuples to one another, thereby each receiving a plurality of sets of first tuples. Each set of first tuples can comprise the tuples received by a particular input device in step 1106. The input devices can use these sets of first tuples to verify that the other input devices are not behaving dishonestly. For example, the input devices can verify that no other input device transmitted two valid (but distinct) tuples to different input devices.

The input devices can perform a series of verification checks to determine if any other input devices is acting dishonestly. One such check can comprise verify that the input device received another tuple from each of the other input devices (i.e., that no input device neglected to send another input device a tuple). Another check can comprise verifying a plurality of first signatures corresponding to the plurality of other first tuples using the one or more first encrypted inputs and the verification keys (i.e., verifying that each other first tuple includes a valid signature). A third check can comprise verifying a plurality of first input proofs corresponding to the plurality of first tuples using the common reference string (i.e., verifying that each input device correctly encrypted their respective input share).

At steps 1112-1, 1112-2, 1112-3, and 1112-4, the input devices and the receiving device can perform the first round of four intermediate MPC protocols $\pi_1, \pi_2, \pi_3, \pi_4$. These intermediate MPC protocols can be performed by the input devices and the receiving device simultaneously. Each intermediate protocol excludes a different excluded input device of the four participating input devices. For example, intermediate protocol 1 excludes the first input device, intermediate protocol 2 excludes the second input device, etc. Phrased differently, each intermediate protocol can correspond to a different excluded input device of the plurality of input devices, and can take place between the receiving device and the plurality of input devices excluding the excluded input device.

An intermediate multi-party computation protocol is described now with reference to FIG. 13. The intermediate MPC protocol is similar to the two-round PKI protocol described above, except it produces partially decrypted outputs (sometimes referred to as second partially decrypted outputs to differentiate them from the partially decrypted outputs corresponding to Protocol 5) that can be combined by the receiving device to produce either the garbled circuit labels for the garbled circuits generated in step 1108 of FIG. 11, or information (such as one-time pads) that can be used to derive these garbled circuit labels.

At step 1302, each input device can select their respective inputs to the intermediate protocols based on the tuples received from the other input devices. That is, the inputs to the intermediate MPC protocols can be different depending on, for example, whether an input device received a valid or an invalid tuple from another input device (potentially indicating a dishonest input device). If an input device received a valid tuple from the excluded input device corresponding to the particular intermediate MPC protocol (for example, if input device 2, executing intermediate MPC protocol $\pi_1$ received a valid tuple from input device 1 in step 1106 in FIG. 11), the input device can select an input comprising its one-time pad $r_i$, the excluded encrypted input $[[x_j]]$ (where j corresponds to the identifier or "number" of the excluded input device), and the garbled circuit labels corresponding to $[[x_j]]$ for the garbled circuit generated by the input device $GC_i$. This can correspond to the case where the input devices determined that the excluded input device was behaving honestly.

Otherwise, if the input devices did not receive a valid tuple from the excluded input device, the input devices can select an input comprising their respective one-time pads $r_i$ and both labels (corresponding to zero values and one values) for the garbled circuit wires corresponding to $[[x_j]]$ in their respective garbled circuits $GC_i$.

At step 1304 each input device participating in the intermediate MPC protocol can encrypt their selected input $x_{si}$ with the public key pk to form a selected (or second) encrypted input $[[x_{si}]]$. The input devices can encrypt their respective selected input shares using a decentralized threshold fully homomorphic encryption (dTFHE) scheme.

At step 1306, each input device participating in the intermediate MPC protocol can optionally calculate or otherwise generate a NIZK intermediate input proof (sometimes referred to as a second input proof, in order to differentiate it from the first input proof generated in step 1106 of Protocol 5) using a common reference string crs, a statement $st_i$, and a witness $wit_i$. the intermediate input proof and the common reference string can be used by other participating devices to verify that the input device correctly encrypted the second encrypted input $[[x_{si}]]$.

At step 1308, each input device participating in the intermediate MPC protocol can form a signature by signing the second encrypted input and the second input proof using their respective signing key. This signature can be used by other participating devices (e.g., participating devices other than the excluded input device) to verify the source of the second encrypted input and second input proof. Other participating devices can use a verification key corresponding to the signing key in order to verify the signature. In some embodiments, a signing key and the corresponding verification key may comprise a public-private key pair.

At step 1310, each input device participating in the intermediate MPC protocol can transmit a second tuple $([[x_{si}]], \pi_{si}, \sigma_{si})$ comprising the second encrypted input, the second input proof, and the second signature to each other input device participating in the intermediate protocol (i.e., all input devices excluding the excluded input device). Each input device can perform these transmissions over pairwise-private channels directly to their intended recipient. Each input device can, for example, establish a session key with each other input devices using a key-exchange (such as a Diffie-Hellman key-exchange), then use the session key to encrypt communications (e.g., the second tuples) sent to those input devices. Alternatively, asymmetric encryption/decryption can be used, e.g., by encrypting with the public key of the other device, which can then decrypt using its private key.

Likewise at step 1310, each input device can receive a plurality of other tuples from the plurality of other input devices excluding the excluded input device. Each of these other tuples can comprise a second encrypted input (sometimes referred to as an "other second encrypted input") a second input proof (sometimes referred to as an "other second input proof"), and a second signature (sometimes referred to as an "other second signature"). The term "second" may be used to differentiate these tuple elements from tuple elements used elsewhere (e.g., in the rest of Protocol 5).

At step 1312, each input device other than the excluded input device can perform a series of verification checks in order to determine if any other input device (other than the excluded input device) is acting dishonestly. One such check can comprise verify that the input device received another second tuple from each of the other input devices (i.e., that no input device neglected to send another input device a tuple). Another check can comprise verifying a plurality of other second signatures corresponding to the plurality of other second tuples using the plurality of second encrypted inputs and the verification keys (i.e., verifying that each other second tuple includes a valid signature). A third check can comprise verifying a plurality of other second input proofs corresponding to the plurality of other second tuples using the common reference string (i.e., verifying that each other input device correctly encrypted their respective selected input).

The verification checks performed at step 1312 can be used by the input devices (excluding the excluded input device) to determine if any other input devices participating in the intermediate MPC protocol are dishonest. If any of the verification checks fail, the input devices can conclude that the input device corresponding to the failed tuple is dishonest.

At step 1314, if an input device does not receive another tuple from each of the other input devices, or the input device fails to verify any other second signature of the plurality of other second signatures, or the input device fails to verify any other second input proof of the plurality of other second input proofs, the input device can transmit their selected input share directly to the receiving device. The receiving device can use this selected input share and a plurality of other second input shares received from the other honest input devices to calculate an output of the intermediate MPC protocol (i.e., at step 1330).

Otherwise, if the second tuples verify correctly, at step 1316, each input device (other than the excluded input device) can compute an intermediate encrypted output $[[y_s]]$ (sometimes referred to as a second encrypted output using the plurality of second encrypted inputs. The input devices can use a dTFHE evaluation function in order to generate the second encrypted output $[[y_s]]$.

At step 1318, each input device can partially decrypt the second encrypted output $[[y_s]]$ using their respective secret key share $sk_i$, thereby generating a second partially decrypted output $[[y_s: sk_i]]$. Each input device can use DTFHE functions in order to generate the second partially decrypted output, e.g., a dTFHE partially decryption function.

At step 1320, each input device can generate a NIZK second decryption proof $\pi_{si}^{dec}$ based on their respective second partially decrypted output. This second decryption proof can be used by the receiving device to verify that the partially second partially decrypted output was partially decrypted correctly. Each input device can form a third tuple $(\{[[x_{sj}]], \pi_{sj}, \sigma_{sj}\}_{j \in [n-1]}, [[y]], [[y: sk_i]], \pi_{si}^{dec})$ comprising the second encrypted output $[[y_s]]$, their respective second partially decrypted outputs $[[y_s: sk_i]]$, and their respective second decryption proofs $\pi_{si}^{dec}$. The second tuple can additionally comprise the second tuple and the plurality of other second tuples $\{[[x_{sj}]], \pi_{sj}, \sigma_{sj}\}_{j \in [n-1]}$, i.e., the set of second tuples shared among the input devices (excluding the excluded input device) in the first communication round of the intermediate MPC protocol. These tuples can be used by the receiving device to check whether the plurality of input devices transmitted an identical second tuple (or an identical second other tuple) to each input device of the plurality of input devices (excluding the excluded input device).

At step 1322, each input device can transmit their respective third tuple to the receiving device. The receiving device can use the information in these third tuples (e.g., the second partially decrypted outputs $[[y_s: sk_i]]$) to generate a second decrypted output $y_s$, completing the intermediate MPC protocol. Recall that this second decrypted output comprises garbled circuit labels, or other information used to derive garbled circuit labels (e.g., one-time pads $r_i$) that can be used as the input to the garbled circuits of Protocol 5 to generate the first decrypted outputs, which can subsequently be combined by the receiving device to generate the decrypted output y of the MPC.

At step 1324, the receiving device can verify the plurality of third tuples (sometimes referred to as "decryption tuples" or "additional tuples") received from the plurality of input devices. The receiving device can perform verification steps similar to those performed by the input devices in step 1312. For example the receiving device can verify for each second tuple of the plurality of second tuples, a corresponding second decryption proof included in the third tuple using the common reference string. The receiving device can additionally verify the second encryption proofs included in the plurality of third tuples using the common reference string. Additionally, the receiving device can verify the second signatures corresponding to the second tuples using their corresponding verification keys. These checks can be performed to verify that the input devices (excluding the excluded input device) did not behave dishonestly, e.g., by transmitting a different valid tuple to two honest input devices.

At step 1326, the receiving device can generate and partially decrypt the second encrypted output [[$y_s$]] using a receiving secret key share $sk_n$, thereby generating a partially decrypted second output [[$y_s$: $sk_n$]]. The receiving device can generate the second encrypted output using the second encrypted inputs contained in the plurality of second tuples. The receiving device can generate the second encrypted output [[$y_s$]] using a dTFHE evaluation function and partially decrypt the second encrypted output using a dTFHE partial decryption function.

At step 1328, the receiving device can combine the plurality of second partially decrypted outputs thereby generating a second decrypted output $y_s$ (sometimes referred to as an intermediate protocol output). The receiving device can use a dTFHE combination function to generate the second decrypted output $y_s$.

As an alternative, if the honest input devices (excluding the excluded input device) transmit their selected input shares directly to the receiving device in step 1314, the receiving device can use the selected input shares to directly calculate the output of the function implemented by the intermediate MPC protocol. This output may comprise, for example, garbled circuit labels, one-time pads that can be used to retrieve garbled circuit labels, etc.

Returning to FIG. 11, at step 1114, after the input devices complete all the intermediate MPC protocols, the input devices can transmit their respective garbled circuits and garbled circuit labels corresponding to their respective encrypted input [[$x_i$]] to the receiving device. The receiving device can use these respective garbled circuits and garbled circuit labels to produce the first partially decrypted outputs, which the receiving device can subsequently combine to generate the decrypted output to Protocol 5 y.

At step 1116, the input devices can each encrypt the garbled circuit labels corresponding to their respective garbled circuit (e.g., the garbled circuit labels corresponding to their encrypted input and the encrypted inputs of the other input devices) using the one-time pads generated at step 1104. The input devices can subsequently transmit these one-time pad encrypted garbled circuit labels to the receiving device.

Referring now to FIG. 12, the receiving device can evaluate the output of the intermediate protocols in order to determine how to proceed. If the intermediate protocol outputs comprise one-time pads, at step 1118, the receiving device can retrieve the garbled circuit labels by decrypting the one-time pad encrypted messages (received at step 1116) using the one-time pads. The receiving device can then proceed to step 1122 and evaluate the garbled circuits using the garbled circuit labels to produce the first partially decrypted outputs [[y: $sk_i$]].

If the intermediate protocol results in an abort, at step 1120, the receiving device can use the garbled circuit labels transmitted by the (honest) input devices in step 1114 as inputs to the garbled circuits. The receiving device can then proceed to step 1122 and evaluate the garbled circuits using the garbled circuit labels to produce the first partially decrypted outputs [[y: $sk_i$]].

If the intermediate protocol outputs comprise garbled circuit labels, the receiving device can proceed to step 1122 and evaluate the garbled circuits using the garbled circuit labels to produce the first partially decrypted outputs [[y: $sk_i$]].

At step 1124, the receiving device can combine the plurality of first partially decrypted outputs, thereby generating the decrypted output y. The receiving device can use a dTFHE combination function to generate the decrypted output y.

V. LITERATURE SURVEY

This section discusses some additional related work relevant to solitary MPC with guaranteed output delivery. The related work is categorized according to the security guarantee (guaranteed output delivery, fairness, with abort etc.), setup assumption (plain, CRS or PKI), type of communication channels used (pairwise-private or broadcast), number of allowed corruption (honest majority or not).

Round complexity of MPC has been explored copiously in the past in different settings as demonstrated by a plethora of works, e.g. [BMR90, GIKR02, KOS03, KO04, Wee10, Goy11, AJL+12, GLS15, GMPP16, MW16, BHP17, ACJ17, COSV17, BGJ+17, HHPV18, BGJ+18, ACGJ18, BJMS18, CCG+19, CGZ20]). This long line of works culminated recently with round optimal (two in CRS or PKI, four in the plain model) protocols from minimal assumptions [CCG+19].

Gennaro et al. [GIKR02] showed a necessity of three rounds for fair MPC in the CRS model, when the number of corruptions is at least 2 (i.e. t≥2). This result holds irrespective of the total number of parties (n) and assumes parties have access to a broadcast channel (and pairwise-private channels). Recently, Patra and Ravi [PR18] complement this (necessity of three rounds) for any t≥n/3 (including t=1). Gordon et al. [GLS15] showed a necessity of three rounds for fairness in CRS model assuming only broadcast channels (no pairwise-private channels). In the honest majority setting, the same work proposed a three round (optimal) MPC protocol achieving guaranteed in the CRS model. Assuming PKI setup, their protocol can be collapsed to two rounds matching the lower bound of [HLP11]. Recently, a couple of works [BJMS18, ACGJ18] improved this state-of-art by constructing three round protocols in the plain model. It is easy to see that a standard MPC protocol implies a protocol for solitary MPC (Section III.B). Therefore, these results directly provide an upper bound of three rounds in this setting. This disclosure proves that this bound is tight (Theorem 4.1). For a small number of parties, round optimal MPC protocols with guaranteed output delivery appear in [IKP10, IKKP15, PR18].

The above feasibility results on round-optimal MPC with guaranteed output delivery assumes broadcast channels as the default mode of communication. However, broadcast channels are expensive [FL82, DS83] to implement in practice. This motivated works to characterize MPC without broadcast (or PKI). A recent work by Cohen et al. [CGZ20] explored the (im)possibility of two round (optimal) standard MPC protocols with minimal use of broadcast in the dishonest majority setting guaranteeing security with (different types of) abort, a weaker guarantee than guaranteed output delivery. This setting is different from theirs as it focuses on solitary MPC with guaranteed output delivery and therefore require honest majority [HIK+19].

The study of solitary MPC was recently initiated by Halevi et al. [HIK+19]. Standard MPC with guaranteed output delivery in the presence of a dishonest majority was already shown to be impossible [Cle86]. Their work focuses on constructing solitary MPC with guaranteed output delivery without honest majority. They show that computing arbitrary solitary functionalities is impossible too and provide positive results for various interesting classes of solitary functionalities such as private set intersection (PSI). This disclosure looks into the complementary direction of building generic solitary MPC in the honest majority setting with a focus on round complexity.

Even assuming PKI, achieving standard MPC (with guaranteed output delivery) requires (t+1) rounds [DS83] deterministically. Note that a separate line of research [FNO9, CPS20, WXSD20] bypasses the (t+1) bound for broadcast by requiring standard MPC protocols to run in expected constant rounds. However, it is not true that the protocol terminates in constant rounds with non-negligible probability. In contrast, the focus of this disclosure is on designing protocols that successfully terminate in constant rounds (with probability one).

VI. NECESSITY OF BROADCAST OR PKI

This section sketches a proof showing that fully secure solitary MPC cannot be achieved only by pairwise private channels even in the CRS model assuming honest majority. In particular, when the number of corrupted parties t≥n/3, then there exist certain functions with solitary output that cannot be securely computed with guaranteed output delivery. Therefore, a broadcast channel or PKI setup is necessary. A similar argument was presented in [FGMO01] which only works for information theoretic security and in [HIK+19] which only works for dishonest majority (in particular, t≥2n/3).

First consider the special case of n=3 and t=1, and then reduce the general case of n≥3 and t≥n/3 to this special case. The impossibility proof (for n=3 and t=1) is based on the impossibility proof in [FLM86, FGMO01], where it is shown that broadcast for t≥n/3 is not achievable in a model with pairwise authentic channels.

Lemma B.1. Let n=3. There exist functions with solitary output that cannot be securely computed with guaranteed output delivery given pairwise private channels even in the CRS model when t=1.

Proof. Suppose, for the sake of contradiction, that there is a protocol Π that can securely compute any function with guaranteed output delivery for three parties $P_1$, $P_2$, Q where Q is the party receiving the output, even if one of the parties is maliciously corrupted.

Figure 14:
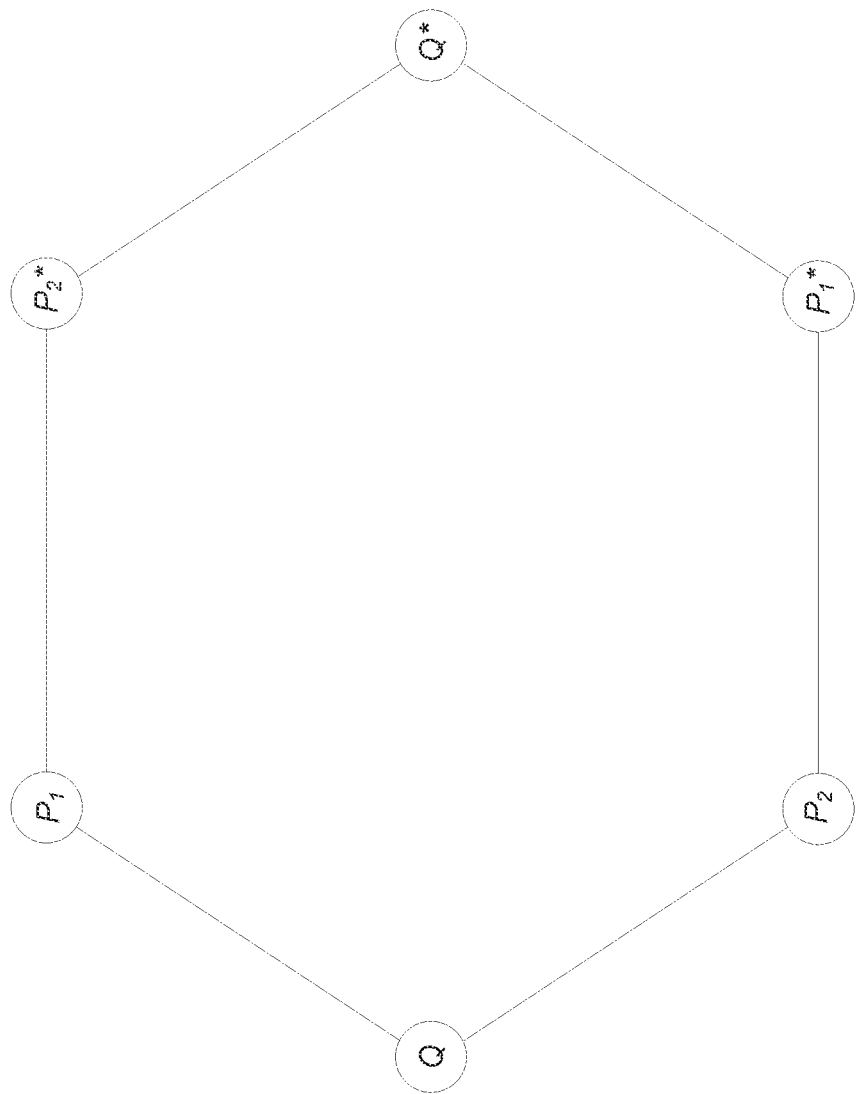
FIG. 14 shows a diagram of a rearrangement of participating parties used to demonstrate the necessity of broadcast or PKI according to some embodiments

Let $P_i^*$, $P_2^*$, $Q^*$ be identical copies of $P_1$, $P_2$, Q, respectively. Build a network involving all six parties by arranging them in a circle as shown in FIG. 14. Each party communicates with their adjacent parties following the protocol Π.

It is claimed that for every pair of adjacent parties in the circle, their common view can be thought of as the view of two honest parties in Π with respect to a malicious adversary that corrupts the remaining party. For example, the view of $(P_1, P_2^*)$ in the new system is the same as the view of honest $(P_1, P_2)$ against a malicious Q where Q's strategy is to "split" itself into Q and $Q^*$ and then simulate the communication between $P_1$ and Q as well as between $P_2^*$ and $Q^*$.

For an arbitrary function $f$, let $P_1$, $P_2$, Q, $P_1^*$, $P_2^*$, $Q^*$ hold inputs $x_1$, $x_2$, $x_3$, $x_1^*$, $x_2^*$, $x_3^*$, respectively. Considering the pair of parties $(P_1, Q)$ in the circle, their view is the same as the two honest parties against a malicious $P_2$. By the guaranteed output delivery property of the protocol Π, Q should output $f(x_1, *, x_3)$ where * could be $x_2$, or ⊥. On the other hand, considering the pair of parties $(P_2, Q)$ in the circle, their view is the same as the two honest parties against a malicious $P_1$. By the guaranteed output delivery property of Π, Q should output $f(*, x_2, x_3)$ where * could be $x_1$, or ⊥. Combining these two facts, it can be concluded that Q in the circle should output $f(x_1, x_2, x_3)$. Similarly, it can be argued that $Q^*$ in the circle should output $f(x_1^*, x_2^*, x_3^*)$.

Considering the pair of parties $(P_1, P_2^*)$ in the circle, their view is the same as the two honest parties $(P_1, P_2)$ against a malicious Q. If the adversary splits itself into Q and $Q^*$ and then simulates the communication in the circle, then it learns both $f(x_1, x_2, x_3)$ and $f(x_1^*, x_2^*, x_3^*)$, which violates the security guarantees resulting in a contradiction.

This attack works for any function $f$ where there exist two sets of input $(x_1, x_2, x_3)$ and $(x_1^*, x_2^*, x_3^*)$ such that $f(x_1, x_2, x_3) \neq f(x_1^*, x_2^*, x_3^*)$.

Theorem B.2. Let n≥3. There exist functions with solitary output that cannot be securely computed with guaranteed output delivery given pairwise private channels even in the CRS model if t≥n/3.

Proof. Suppose, for the sake of contradiction, that there is a protocol Π that can securely compute any function with guaranteed output delivery for n parties where t≥n/3 parties are maliciously corrupted.

Then the three parties $P_1$, $P_2$, Q each simulate up to [n/3] of the parties in Π, with the receiving party simulated by Q. Thus, the new protocol among parties $P_1$, $P_2$, Q achieves secure MPC with guaranteed output delivery against one corrupted party because it simulates at most [n/3] parties in Π, which is tolerated by assumption. Since this contradicts Lemma B.1, the theorem follows.

VII. SECURITY PROOF FOR FIVE-ROUND PROTOCOL

This section formally proves Theorem 6.1. Let NIZK. Sim=(NIZK. Sim. Setup, NIZK. Sim. Prove, NIZK. Sim. Ext) denote the straight-line simulator for the simulation-extractible NIZK argument. Consider a malicious adversary $\mathcal{A}$ that corrupts a set of t parties where t<n/2. Let $\mathcal{H}$ denote the set of honest parties and $\mathcal{S}^*$ the set of corrupt parties.

Simulation Strategy. The strategy of the simulator Sim is now described.

CRS: Compute (simcrs, td)←NIZK. Sim. Setup($1^\lambda$). Send simcrs to $\mathcal{A}$ for every corrupt party $P_i$.

PKI Setup:

For each i∈[n], sample $(pk_i, sk_i)$←dTFHE. DistGen($1^\lambda$, $1^d$, i; $r_i$) and $(vkey_i, skey_i)$←Gen($1^\lambda$).

Public key: $pk=pk_1 \| \ldots \| pk_n$ and $\{vkey_i\}_{i \in [n]}$.

Secret keys: $(sk_i, r_i, skey_1)$ for party $P_i$ for each i∈[n].

Send the public key and corresponding secret keys to $\mathcal{A}$ for every corrupt party $P_i$.

Consider two cases of the corrupted parties. In the first case Q is honest and in the second case Q is corrupted.

Case 1: Honest Q. Now the simulator's strategy if the output receiving party $P_n$=Q is honest is described.

1. Round 1: For each honest party $P_i \in \mathcal{H}$:

Compute $[\![0_i]\!]$←dTFHE. Enc(pk, $0^\lambda$) using fresh randomness, $\pi_i$←NIZK. Sim. Prove(td, $st_i$) for $st_i \in L_1$ where $st_i=([\![0_i]\!], pk)$.

Compute $\sigma_i$←Sign($skey_1$, $([\![0_i]\!], \pi_i)$). Send $([\![0]\!], \pi_i, \sigma_i)$ to $\mathcal{A}$ for every corrupt party.

Receive a message $([\![x_j]\!]^{j \to i}, \pi_j^{j \to i}, \sigma_j^{j \to i})$ from $\mathcal{A}$ for every corrupt party $P_j$.

2. Round 2: From $\mathcal{A}$, for every corrupt party $P_j$, receive $\{(\llbracket x_k \rrbracket^{j \to n}, \pi_k^{j \to n}, \sigma_k^{j \to n})\}_{k \in [n] \setminus \{j\}}$. Also, for ease of notation, assume that each honest party $P_i$ sends the messages it received from $\mathcal{A}$ in Round 1 to Q. Let's denote this by $\{(\llbracket x_j \rrbracket^{i \to n}, \pi_j^{i \to n}, \sigma_j^{i \to n})\}_{P_j \in S^*}$.

3. Round 3: For party $P_n (=Q)$, do following:

Define strings msg, $ct_1, \ldots, ct_n$ as $\perp$.

Also, define strings $\{inp_j\}_{P_j \in S^*}$.

For each corrupt party $P_j$, do the following:

Let $\{(\llbracket x_j \rrbracket^{1 \to n}, \pi_j^{1 \to n}, \sigma_j^{1 \to n}), \ldots, (\llbracket x_j \rrbracket^{n \to n}, \pi_j^{n \to n}, \sigma_j^{n \to n})\}$ be the message received across both rounds on behalf of party $P_j$. This includes messages sent by $\mathcal{A}$ in Round 1 from $P_j$ to every honest party (that was assumed to be forwarded to Q in Round 2 for ease of notation) and the messages sent by $\mathcal{A}$ from other corrupt parties to Q in Round 2.

Pick the smallest index $i_1$ such that Verify(vkey$_j$, $(\llbracket x_j \rrbracket^{i_1 \to n}, \pi_j^{i_1 \to n}), \sigma_j^{i_1 \to n})=1$ and NIZK. Verify(simcrs, $\pi_j^{i_1 \to n}$, $st_j$)=1 for $st_j \in L_1$ where $st_j = (x_j^{i_1 \to n}, pk)$. Then:

Input Extraction and ZK Abort: Let $(inp_j, \rho_j) \leftarrow$ NIZK. Sim. Ext(td, $\pi_j^{i_1 \to n}$, $st_j$). Output "ZK Abort" if NIZK. Sim. Ext($\bullet$) outputs $\perp$.

Set msg: =msg||"Party j"||$(x_j^{i_1 \to n}, \pi_j^{i_1 \to n}, \sigma_j^{i_1 \to n})$. Also, set $ct_j := x_j^{i_1 \to n}$.

If no such $i_1$ exists, set msg: =msg||"Party j"||$\perp$ and $inp_j = \perp$.

For each honest party $P_i \in \mathcal{H}$, do the following:

Set msg: =msg||"Party i"||$(\llbracket 0_i \rrbracket, \pi_i, \sigma_i)$ where $(\llbracket 0_i \rrbracket, \pi_i, \sigma_i)$ is the tuple output in Round 1.

Also, set $ct_i = \llbracket 0_i \rrbracket$.

Compute $\sigma_{msg} \leftarrow$ Sign(skey$_n$, msg). Send (msg, $\sigma_{msg}$) to $\mathcal{A}$ for every corrupt party.

Set $\llbracket y \rrbracket =$ dTFHE. Eval(pk, $f$, $ct_1, \ldots, ct_n$).

4. Round 4: For each honest party $P_i \in \mathcal{H}$, for every corrupt party $P_j \in S^*$:

Send the same message as in Round 3 to $\mathcal{A}$.

Receive (msg$^{j \to i}$, $\sigma_{msg}^{j \to i}$) from $\mathcal{A}$.

Signature Abort: Output "Signature Abort" if:

msg$^{j \to i} \neq$ msg (AND)

msg$^{j \to i}$ is of the form ("Party 1"||$m_1$|| . . . ||"Party n"||$m_n$) (AND)

Verify(vkey$_n$, msg$^{j \to i}$, $\sigma_{msg}^{j \to i}$)=1

5. Round 5: From $\mathcal{A}$, for every corrupt party $P_j$, receive $(\llbracket y: sk_j \rrbracket, \pi_j^{dec})$ 6. Query to Ideal Functionality $\mathcal{F}$:

ZK Abort: Output "ZK Abort" if NIZK. Verify(simcrs, $\pi_j^{dec}$, $st_j^{dec}$)=1 (AND) NIZK. Sim. Ext($\pi_j^{dec}$, $st_j^{dec}$)=$\perp$ for any j where $st_j^{dec} = (\llbracket y: sk_j \rrbracket, \llbracket y \rrbracket, pk_j, j)$.

Send $\{inp_j\}_{P_j \in S^*}$ to $\mathcal{F}$.

Case 2: Corrupt Q. The simulator's strategy if the output receiving party $P_n = Q$ is corrupt is now described.

1. Round 1: Same as Round 1 when Q is honest. That is, for each honest party $P_i \in \mathcal{H}$, for every corrupt party $P_j$, send $(\llbracket 0_i \rrbracket, \pi_i, \sigma_i)$ to $\mathcal{A}$ and receive $(\llbracket x_j \rrbracket^{j \to i}, \pi_j^{j \to i}, \sigma_j^{j \to i})$.

2. Round 2: For each honest party $P_i \in \mathcal{H}$, send the following to $\mathcal{H}$ for corrupt party Q:

The set of messages received from $\mathcal{A}$ to $P_i$ in Round 1: $\{(\llbracket x_j \rrbracket^{j \to i}, \pi_j^{j \to i}, \sigma_j^{j \to i})\}_{P_j \in S^*}$.

The set of messages $\{(\llbracket 0_k \rrbracket, \pi_k, \sigma_k)\}_{P_k \in \mathcal{H}}$ generated in Round 1.

3. Round 3: For each honest party $P_i \in \mathcal{H}$, receive (msg$^{n \to i}$, $\sigma_{msg}^{n \to i}$) from $\mathcal{A}$ for party Q.

4. Round 4: For each honest party $P_i \in \mathcal{H}$, for every corrupt party $P_j$, send the message received in Round 3—(msg$^{n \to i}$, $\sigma_{msg}^{n \to i}$) to $\mathcal{A}$ and receive (msg$^{j \to i}$, $\sigma_{msg}^{j \to i}$).

5. Round 5:

Define set $\mathcal{H}_1 = \mathcal{H}$ to be the set of parties that would send valid partial decryptions.

Pruning down $\mathcal{H}_1$: For each $P_i \in \mathcal{H}_1$, do the following:

Let $\{(msg^{n \to k}, \sigma_{msg}^{n \to k})\}_{k \in \mathcal{H}}$ be the Round 3 messages from $\mathcal{A}$ and $\{(msg^{j \to i}, \sigma_{msg}^{j \to i})\}_{j \in S^*}$ be the message from $\mathcal{A}$ to $P_i$ in Round 4.

If Verify(vkey$_n$, msg$^{n \to i}$, $\sigma_{msg}^{n \to i}$)$\neq$1 (OR) msg$^{n \to i}$ is not of the form ("Party 1"||$m_1$|| . . . ||"Party n"||$m_n$), send $\perp$ to $\mathcal{A}$ from $P_i$ (for party Q) and remove $P_i$ from $\mathcal{H}_1$.

Send $\perp$ to $\mathcal{A}$ from $P_i$(for party Q) and remove $P_i$ from $\mathcal{H}_j$ if there exists $k \neq i \in \mathcal{H}$ such that:

msg$^{n \to k} \neq$ msg$^{n \to i}$ (AND)

Verify(vkey$_n$, msg$^{n \to k}$, $\sigma_{msg}^{n \to k}$)=1 (AND)

msg$^{n \to k}$ is of the form ("Party 1"||$m_1$|| . . . ||"Party n"||$m_n$).

Send $\perp$ to $\mathcal{A}$ from $P_i$(for party Q) and remove $P_i$ from $\mathcal{H}_1$ if there exists $j \# n \in S^*$ such that:

msg$^{j \to i} \neq$ msg$^{n \to i}$ (AND)

Verify(vkey$_n$, msg$^{j \to i}$, $\sigma_{msg}^{j \to i}$)=1 (AND)

msg$^{j \to i}$ is of the form ("Party 1"||$m_1$|| . . . ||"||Party n"||$m_n$).

Define strings $ct_1, \ldots, ct_n$, $\{inp_j\}_{P_j \in S^*}$ to be $\perp$.

Let (msg, $\sigma_{msg}$) be the unique Round 3 message received by all honest parties from $\mathcal{A}$ where msg is of the form ("Party 1"||$m_1$|| . . . ||"Party n"||$m_n$).

Query to Ideal Functionality $\mathcal{A}$. If $\mathcal{F}_1 \neq \emptyset$, do:

For each honest party $P_i \in \mathcal{H}$, let $m_i = (a_i, b_i, c_i)$.

Signature Abort: Output "Signature Abort" if $(a_i, b_i) \neq (\llbracket 0_i \rrbracket, \pi_i)$ (AND) Verify (vkey$_i$, $(a_i, b_i)$, $c_i$)=1.

If $(a_i, b_i) \neq (\llbracket 0_i \rrbracket, \pi_i)$ or Verify(vkey$_i$, $(a_i, b_i)$, $c_i$)$\neq$1, send $\perp$ to $\mathcal{A}$ from all parties in $\mathcal{H}_1$ and end the round.

Else, set $ct_i = \llbracket 0_i \rrbracket$.

For each corrupt party $P_j \in S^*$ with $m_j = \perp$:

Pruning $\mathcal{H}_1$—Part Two: If there exists $P_i \in \mathcal{H}$ such that Verify(vkey$_j$, $(\llbracket x_j \rrbracket^{j \to i}, \pi_j^{j \to i}), \sigma_j^{j \to i}$)=1 and NIZK. Verify $(\pi_j^{j \to i}, st_j)=1$ for $st_j \in L_1$ where $st_j = (\llbracket x_j \rrbracket^{j \to i}, pk)$, send $\perp$ to from $\mathcal{A}$ party $P_i$ and remove $P_i$ from $\mathcal{H}_1$. Here, recall that $(\llbracket x_j \rrbracket^{j \to i}, \pi_j^{j \to i}, \sigma_j^{j \to i})$ is the message from $\mathcal{A}$ to $P_i$ in Round 1.

Else, set $(ct_j, inp_j)$ $(\perp, \perp)$.

For each corrupt party $P_j \in S^*$ with $m_j = (\llbracket x_j \rrbracket, \pi_j, \sigma_j)$:

If Verify(vkey$_j$, $(\llbracket x_j \rrbracket, \pi_j), \sigma_j$)$\neq$1 (or) NIZK. Verify(crs, $\pi_j$, $st_j$)$\neq$1 for $st_j \in L_1$ where $st_j = (\llbracket x_j \rrbracket, pk)$, send $\perp$ to $\mathcal{A}$ from all parties in $\mathcal{H}_1$ and end the round.

Input Extraction and ZK Abort: Let $(inp_j, r_j) \leftarrow$ NIZK. Sim. Ext(td, $\pi_j$, $st_j$). Output "ZK Abort" if NIZK. Sim. Ext($\bullet$) outputs $\perp$.

Set $ct_j = x_j$.

Send $\{inp_j\}_{P_j \in S^*}$ to $\mathcal{F}$ and receive output y.

Compute $\{[\![y: sk_i ]\!]\}_{P_i \in \mathcal{H}} \leftarrow$ dTFHE. Sim($f$, y, $ct_1, \ldots, ct_n$, $\{sk_j\}_{j \in S^*}$)

For each honest party $P_i \in \mathcal{H}_1$ (the ones that did not output $\bot$):

Compute $\pi_i^{dec} \leftarrow$ NIZK. Sim. Prove(td, $st_i^{dec}$) for $st_i^{dec} \in L_2$ where $st_i^{dec} = ([\![y: sk_i]\!], y, pk_i, i)$, $[\![y]\!]$=dTFHE. Eval(pk, $f$, $ct_1, \ldots, ct_n$).

Send ($[\![y: sk_i]\!]$, $\pi_i^{dec}$) to Q.

Hybrids. It is now shown that the above simulation strategy is successful via a series of computationally indistinguishable hybrids where the first hybrid $hyb_0$ corresponds to the real world and the last hybrid $hyb_{10}$ corresponds to the ideal world.

$hyb_0$—Real World. In this hybrid, consider a simulator Sim. hyb that plays the role of the honest parties as in the real world.

$hyb_1$—Simulate ZK. In this hybrid, Sim. hyb first generates a simulated CRS in the setup phase: (simcrs, td)←NIZK. Sim. Setup($1^\lambda$). Then, in Round 1 of both cases, it computes simulated ZK proofs: $\pi_i \leftarrow$ NIZK. Sim. Prove(td, $st_i$). Finally, Sim. hyb also computes simulated ZK proofs in Round 5 when Q is corrupt: $\pi_i^{dec} \leftarrow$ NIZK. Sim. Prove(td, $st_i^{dec}$).

$hyb_2$—Case 1: Signature Abort. In this hybrid, when Q is honest, in Round 4, on behalf of every honest party $P_i$, Sim. hyb runs the "Signature Abort" step as done by Sim. That is, output "Signature Abort" if the adversary is able to forge a valid signature on behalf of honest party Q.

$hyb_3$—Case 1: Input Extraction and ZK Abort. In this hybrid, when Q is honest, in Round 3, Sim. hyb runs the input extraction and ZK Abort step as done by Sim in the ideal world. Sim. hyb also runs the "ZK Abort" step in Round 5 as done by Sim. That is, in both steps, output "ZK Abort" if NIZK. Sim. Ext(•) outputs $\bot$.

$hyb_4$—Case 1: Query to ideal functionality. In this hybrid, Sim. hyb sends the values $\{inp_j\}_{P_j \in S^*}$ extracted by running NIZK. Sim. Ext(•) in Round 3 to $\mathcal{F}$. Further, $\mathcal{F}$ delivers output to honest Q.

$hyb_5$—Case 2: Pruning down $\mathcal{H}_1$. In this hybrid, when Q is corrupt, in Round 5, Sim. hyb runs the pruning down $\mathcal{H}_1$ step as done by Sim in the ideal world. That is, send $\bot$ in Round 5 on behalf of corresponding honest parties that detect inconsistent signatures from Q across rounds 3 and 4.

$hyb_6$—Case 2: Signature Abort. In this hybrid, when Q is corrupt, in Round 5, Sim. hyb runs the "Signature Abort" step as done by Sim. That is, output "Signature Abort" if the adversary is able to forge a valid signature on behalf of any honest party.

$hyb_7$—Case 2: Pruning $\mathcal{H}_1$—Part Two. In this hybrid, when Q is corrupt, in Round 5, Sim. hyb runs the second part of pruning down $\mathcal{H}_1$ step as done by Sim in the ideal world. That is, send $\bot$ in Round 5 on behalf of honest parties that detect a missing ciphertext in the message sent by Q for which they had received a valid ciphertext in round one.

$hyb_8$—Case 2: Input Extraction, ZK Abort and Query to ideal functionality. In this hybrid, when Q is corrupt, in Round 5, Sim. hyb computes (inp$_j$, ct$_j$) as done by Sim in the ideal world. To do so, Sim. hyb also runs the "ZK Abort" step—that is, output "ZK Abort" if NIZK. Sim. Ext(•) outputs $\bot$. Finally, queries $\mathcal{F}$ with $\{inp_j\}_{P_j \in S^*}$ and receive output y.

$hyb_9$—Case 2: Simulate Partial Decryptions. In this hybrid, when Q is corrupt, in Round 5, Sim. hyb simulates the partial decryptions generated by the honest parties as done in the ideal world. That is, compute $\{[\![y: sk_i]\!] \mathcal{A} \leftarrow$ dTFHE. Sim($f$, y, $ct_1, \ldots, ct_n$, $\{sk_j \mathcal{A}\}$).

$hyb_{10}$—Switch Encryptions. Finally, in this hybrid, in both cases, in Round 1, on behalf of every honest party $P_i$, Sim. hyb now computes $[\![_i]\!] \leftarrow$ dTFHE. Enc(pk, $0^\lambda$) instead of encrypting the honest party's input. This corresponds to the ideal world.

It is now shown that every pair of consecutive hybrids is computationally indistinguishable.

Lemma C.1. Assuming the zero knowledge property of the NIZK, $hyb_0$ is computationally indistinguishable from $hyb_1$.

Proof. The only difference between the two hybrids is that in $hyb_0$, the simulator Sim. hyb generates the NIZK proofs in rounds one and five on behalf of the honest parties (and the CRS) as in the real world by running the honest prover algorithm while in $hyb_1$, the proofs are simulated using the NIZK simulator NIZK. Sim. Prove(•) (and the simulated CRS simcrs is generated using the simulator NIZK. Sim. Setup(•)). It is easy to observe that if there exists an adversary $\mathcal{A}$ that can distinguish between these two hybrids with some non-negligible probability $\varepsilon$, a reduction $\mathcal{A}_{NIZK}$ can be produced that can break the zero knowledge property of the NIZK argument which is a contradiction.

Lemma C.2. Assuming the security of the signature scheme, $hyb_1$ is computationally indistinguishable from $hyb_2$.

Proof. The only difference between the two hybrids is if Sim. hyb outputs "Signature Abort" in Round 4 of $hyb_2$ with non-negligible probability which doesn't happen in $hyb_1$. This can happen if, with non-negligible probability, in Round 4, on behalf of some corrupt party, $\mathcal{A}$ sends a valid message-signature pair of the right form that was not the one received from honest Q in Round 3. In more detail, this happens if, with non-negligible probability, $\mathcal{A}$ sends a tuple (msg$^{j \to i}$, $\sigma_{msg}^{j \to i}$) from corrupt party $P_j$ to honest party $P_i$ in Round 4 such that:

msg$^{j \to i} \neq$ msg (AND)

msg$^{j \to i}$ of the form ("Party 1"$\|m_1\| \ldots \|$"Party n"$\|m_n$) (AND)

Verify(vkey$_n$, (msg$^{j \to i}$, $\sigma_{msg}^{j \to i}$))=1

However, if this happens, a reduction $\mathcal{A}_{Sign}$ can be built that breaks the unforgeability of the signature scheme which is a contradiction.

Lemma C.3. Assuming the simulation-extractability property of the NIZK, $hyb_2$ is computationally indistinguishable from $hyb_3$.

Proof. The only difference between the two hybrids is if Sim. hyb outputs "ZK Abort" in Round 3 or 5 of $hyb_3$ with non-negligible probability. This happens if, on behalf of some corrupt party $P_j$:

In Round 1, $\mathcal{A}$ sends ($[\![x_j]\!]$, $\pi_j$, $\sigma_j$) such that the signature verifies, NIZK. Verify(simcrs, $\pi_j$, $st_j$)=1 but NIZK. Sim. Ext(td, $\pi_j$, $st_j$)=$\bot$ where $st_j$=($[\![x_j]\!]$, pk) (OR)

In Round 5, $\mathcal{A}$ sends ($[\![y: sk_j]\!]$, $\pi_j^{dec}$) such that NIZK. Verify(simcrs, $\pi_j^{dec}$, $st_j^{dec}$)=1 but NIZK. Sim. Ext(td, $\pi_j^{dec}$, $st_j^{dec}$)=$\bot$ where $st_j$=($[\![y: sk_j]\!]$, $[\![y]\!]$, pk, j).

However, from the security of the UC-secure NIZK:

Pr[$\pi \leftarrow \mathcal{A}$(simcrs,st);(simcrs,td)←NIZK.Sim.Setup
   ($1^\lambda$)s.t.

NIZK.Verify(crs,$\pi$,x)=1(AND)NIZK.Sim.Ext(td,
   $\pi$,st)$\bot$]≤negl($\lambda$)

Thus, if there exists such an adversary that can cause this bad event to occur with non-negligible probability, a reduction $\mathcal{A}_{NIZK}$ can be built that breaks the simulation-extractibility property of the NIZK argument which is a contradiction.

Lemma C.4. Assuming the correctness of the threshold FHE scheme and the NIZK, $hyb_3$ is computationally indistinguishable from $hyb_4$.

Proof. The only difference between the two hybrids is the manner in which honest Q learns the output. In $hyb_4$, Q learns output $y=f(inp_1, \ldots, inp_n)$ from the ideal functionality $\mathcal{F}$ where $inp_i=x_i$ for every honest party $P_i \in \mathcal{H}$ and $inp_j=x_j$ (or) $\perp$ for every corrupt party $P_j \in \mathcal{S}*$. From the correctness of the extractor NIZK. Sim. Ext, if NIZK. Sim. Ext(•) output $inp_j$, then indeed $inp_j=x_j$. Also, if $inp_j$ is set to $\perp$, then this is because Sim. hyb detected no valid tuple $(0_j, \pi_j, \sigma_j)$ on behalf of party $P_j$.

In $hyb_3$, Q computes the output as in the real world by following the protocol. Observe that due to the presence of an honest majority, from the correctness of the threshold FHE scheme, Q does recover output $y'=f(inp'_1, \ldots, inp'_n)$. For every honest party $P_i \in \mathcal{H}$, it is easy to observe that $inp'_i=x_i$. For every corrupt party $P_j \in \mathcal{S}*$, as in $hyb_4$, from the protocol description in Round 3, observe that $inp_j=\perp$, if Q detects no valid tuple $(\llbracket 0_j \rrbracket, \pi_j, \sigma_j)$ on behalf of party $P_j$. Hence the two hybrids are computationally indistinguishable.

Lemma C.5. $hyb_4$ is identically distributed to $hyb_5$.

Proof. Observe that in Round 5 of the simulation, the list of steps performed in the "pruning down $\mathcal{H}_1$" part are in fact identical to the steps performed by all honest parties in the real world to check that they received one single valid $(msg, \sigma_{msg})$ from Q in Round 3. Thus, the two hybrids are identical.

Lemma C.6. Assuming the security of the signature scheme, $hyb_5$ is computationally indistinguishable from $hyb_6$.

Proof. The only difference between the two hybrids is if Sim. hyb outputs "Signature Abort" in Round 5 of $hyb_6$ with non-negligible probability. This can happen if, with non-negligible probability, in Round 3, on behalf of corrupt party Q, the tuple that $\mathcal{A}$ sends includes a valid message-signature pair for some honest party $P_i$ that was not the pair sent by $P_i$ in Round 1. In more detail, for every honest party $P_i \in \mathcal{H}$, let $(\llbracket 0_j \rrbracket, \pi_j, \sigma_i)$ be the message sent in Round 1. The bad event happens if, with non-negligible probability, in Round 3, $\mathcal{A}$ sends $(msg, \sigma_{msg})$ to every honest party where $Verify(vkey_n, msg, \sigma_{msg})=1$, msg of the form ("Party 1"$\|m_1\| \ldots \|$"Party n"$\|m_n$) and there exists honest party $P_i \in \mathcal{H}$ such that: $m_i=(a_i, b_i, c_i)$ (AND) $(a_i, b_i)\neq(\llbracket 0_i \rrbracket, \pi_i)$ (AND) $Verify(vkey_i, (a_i, b_i), c_i)=1$.

However, if this happens, a reduction $\mathcal{A}_{Sign}$ can be built that breaks the unforgeability of the signature scheme which is a contradiction.

Lemma C.7. $hyb_6$ is identically distributed to $hyb_7$.

Proof. Observe that in Round 5 of the simulation, the list of steps performed in the "second part of pruning down $\mathcal{H}_1$" are in act identical to the step performed by all honest parties $P_i$ in the real world to check that Q did not fail to include a ciphertext on behalf of some party $P_k$ if the honest party did receive a valid ciphertext from $P_k$ in Round one. Thus, the two hybrids are identical.

Lemma C.8. Assuming the simulation-extractibility property of the NIZK, $hyb_7$ is computationally indistinguishable from $hyb_8$.

Proof. This is identical to the proof of Lemma C.3.

Lemma C.9. Assuming the simulation security of the threshold FHE scheme, $hyb_8$ is computationally indistinguishable from $hyb_9$.

Proof. The only difference between the two hybrids is that in $hyb_8$, the simulator Sim. hyb generates the partial decryptions of the threshold FHE scheme on behalf of the honest parties as in the real world while in $hyb_9$, they are simulated by running the simulator dTFHE. Sim. It is easy to observe that if there exists an adversary $\mathcal{A}$ that can distinguish between these two hybrids with some non-negligible probability $\varepsilon$, then a reduction $\mathcal{A}_{dTFHE}$ can be built that can break the simulation security of the threshold FHE scheme which is a contradiction.

Lemma C.10. Assuming the semantic security of the threshold FHE scheme, $hyb_9$ is computationally indistinguishable from $hyb_{10}$.

Proof. The only difference between the two hybrids is that in $hyb_9$, the simulator Sim. hyb generates the encryptions of the threshold FHE scheme on behalf of the honest parties as in the real world while in $hyb_{10}$, they are generated as encryptions of 0. It is easy to observe that if there exists an adversary $\mathcal{A}$ that can distinguish between these two hybrids with some non-negligible probability $\varepsilon$, a reduction $\mathcal{A}_{dTFHE}$ can be built that can break the semantic security of the threshold FHE scheme which is a contradiction.

VIII. SECURITY PROOF FOR T=1 WHEN Q HAS NO INPUT

Theorem 7.4 is proven below. Let NIZK. Sim=(NIZK. Sim. Setup, NIZK. Sim. Prove, NIZK. Sim. Ext) denote the straight-line simulator for the simulation-extractible NIZK argument. Consider a malicious adversary $\mathcal{A}$ that corrupts single party $P_c$. Construct an ideal-world PPT simulator Sim that interacts with $\mathcal{A}$ as follows.

In the setup phase, Sim generates $(simcrs, td) \leftarrow$ NIZK. Sim. Setup($1^\lambda$) and follows the PKI setup honestly to generate the public and secret keys. Sim first invokes $\mathcal{A}$ with the simulated CRS simcrs, public keys (pk, $\{vkey_i\}_{i \in [n]}$), and secret keys $(sk_c, r_c, skey_c)$. Two cases of the corrupted party are considered. In the first case Q is honest and in the second case Q is corrupted.

Case 1: Q is honest. The corrupted party is $P_c$ where $c \in [n-1]$. The strategy of Sim is described as follows:

Let $\tilde{x}:=\perp$ and $k:=\infty$.

Round 1: For each $i \in [n-1] \backslash \{c\}$, do the following:

Compute the following:

$\llbracket 0_i \rrbracket \leftarrow$ dTFHE. Enc(pk, $0_i$).

$\pi_i \leftarrow$ NIZK. Sim. Prove(td, $st_i$) for $st_i \in L_1$ where $st_i=(\llbracket 0_i \rrbracket, pk)$.

$\sigma_i \leftarrow$ Sign(skey$_i$, $(\llbracket 0_i \rrbracket, \pi_i)$).

Send $(\llbracket 0_i \rrbracket, \pi_i, \sigma_i)$ to $\mathcal{A}$ on behalf of party $P_i$.

Receive $(\llbracket x_c \rrbracket^{c \to i}, \pi_c^{c \to i}, \sigma_c^{c \to i})$ from $\mathcal{A}$ on behalf of party $P_i$.

If $i < k$, NIZK. Verify(simcrs, $\pi_c^{c \to i}$, $st_c^{c \to i}$)=1 for $st_c^{c \to i} \in L_1$ where $st_c^{c \to i}=(\llbracket x_c \rrbracket^{c \to i}, pk)$, and Verify(vkey$_c$, $(\llbracket x_c \rrbracket^{c \to i}, \pi_c^{c \to i})$, $\sigma_c^{c \to i}$)=1, then Decrypt $\llbracket x_c \rrbracket^{c \to i}$ by running algorithms dTFHE. PartialDec(•), dTFHE. Combine(•) using dTFHE secret keys to obtain $x_c^{c \to i}$.

Let $\tilde{x} := x_c^{c \to i}$ and $k := i$.
Round 2:

If Sim receives $x_c^{c \to n}$ from $\mathcal{A}$ on behalf of Q, then let $\tilde{x} := x_c^{c \to n}$ if $k = \infty$.

If Sim receives $(\{([\![x_j]\!]^{c \to n}, \pi_j^{c \to n}, \sigma_j^{c \to n})\}_{j \in [n-1]}, [\![y]\!], [\![y: sk_c]\!], \pi_c^{dec})$ from $\mathcal{A}$ on behalf of Q, then verify the following:

NIZK. Verify(simcrs, $\pi_j^{c \to n}$, $st_j^{c \to n}$)=1 for $st_j^{c \to n} \in L_1$ where $st_j^{c \to n} = ([\![x_j]\!]^{c \to n}, pk)$ for all $j \in [n-1]$.

Verify(vkey$_j$, $([\![x_j]\!]^{c \to n}, \pi_j^{c \to n})$, $\sigma_j^{c \to n}$)=1 for all $j \in [n-1]$.

$[\![y]\!]$ =dTFHE. Eval(pk, $f$, $[\![x_1]\!]^{c \to n}$, ..., $[\![x_{n-1}]\!]^{c \to n}$).

NIZK. Verify(simcrs, $\pi_c^{dec}$, $st_c^{dec}$)=1.

If all the above is true, then Decrypt $[\![x_c]\!]^{c \to n}$ by dTFHE secret keys to obtain $x_c^{c \to n}$.

Let $\tilde{x} := x_c^{c \to n}$ if $c < k$.

Finally, send $\tilde{x}$ to the ideal functionality.

Hybrid argument. Now it is shown that $\mathcal{A}$ and Q's output in the real world is computationally indistinguishable from Sim and Q's output in the ideal world.

$hyb_0$: $\mathcal{A}$ and Q's output in the real world.

$hyb_1$: First generate (simcrs, td)←NIZK. Sim. Setup($1^\lambda$) and give simcrs to $\mathcal{A}$ as the CRS. In Round 1, for each $i \in [n-1] \setminus \{c\}$, replace $\pi_i$ sent to $\mathcal{A}$ by a simulated NIZK argument NIZK. Sim. Prove(td, $st_i$).

By the zero-knowledge property of NIZK, $\mathcal{A}$ cannot distinguish between $hyb_0$ and $hyb_1$.

$hyb_2$: If Q receives a valid tuple $(\{([\![x_j]\!], \pi_j, \sigma_j)\}_{j \in [n-1]}, [\![y]\!], [\![y: sk_i]\!], \pi_i^{dec})$ from party $P_i$ in Round 2 (if it holds for multiple parties, then pick the smallest i), then decrypt $\{[\![x_j]\!]\}_{j \in [n-1]}$ by dTFHE secret keys to obtain $(\tilde{x}_1, \ldots, \tilde{x}_{n-1})$. If the decryption fails, then abort.

It is argued that the probability of abort is negligible. First it is known that $\{[\![x_j]\!]\}_{j \in [n-1] \setminus \{c\}}$ are all well-formed encryptions. By the simulation-extractability of NIZK for $L_1$, $(\hat{x}_c, \hat{\rho}_c) \leftarrow$ NIZK. Sim. Ext(td, $\pi_c$, $st_c$) can be run in order to extract $(\hat{x}_c, \hat{\rho}_c)$ with all but negligible probability, hence $x_c$ is also a well-formed encryption. By the correctness of dTFHE, all the ciphertexts $\{x_j\}_{j \in [n-1]}$ can be decrypted with all but negligible probability.

$hyb_3$: Same as $hyb_2$ except that after obtaining $(\tilde{x}_1, \ldots, \tilde{x}_{n-1})$ from dTFHE decryption, Q outputs $f(\tilde{x}_1, \ldots, \tilde{x}_{n-1})$.

By the simulation-extractability of NIZK for $L_2$, $(\hat{sk}_c, \hat{r}_c) \leftarrow$ NIZK. Sim. Ext(td, $\pi_c^{dec}$, $st_c^{dec}$) can be extracted with all but negligible probability, hence $[\![y: sk_c]\!]$ is correctly computed partial decryption. By the evaluation correctness of dTFHE, the output of Q is computationally indistinguishable from $hyb_2$.

$hyb_4$: If Q receives a valid tuple $(\{([\![x_j]\!], \pi_j, \sigma_j)\}_{j \in [n-1]}, [\![y]\!], [\![y: sk_i]\!], \pi_i^{dec})$ from party $P_i$ in Round 2 (if it holds for multiple parties, then pick the smallest i), then decrypt $[\![x_c]\!]$ by dTFHE secret keys to obtain $\tilde{x}$ and output $f(x_1, \ldots, x_{c-1}, \tilde{x}, x_{c+1}, \ldots, x_{n-1})$.

There are two cases of the chosen party $P_i$: (a) $P_i$ is honest, and (b) $P_i$ is corrupted.

If $P_i$ is honest, then $\{[\![x_j]\!]\}_{j \in [n-1] \setminus \{c\}}$ are correctly generated ciphertexts of $\{x_j\}_{j \in [n-1] \setminus \{c\}}$.

If $P_i$ is corrupted, namely $P_i = P_c$, then it is claimed that for each $j \in [n-1] \setminus \{c\}$, $[\![x_j]\!]$ is the same as what $P_j$ sends to $P_c$ in Round 1. If they are different for any $j^*$, then the adversary $\mathcal{A}$ can be used to forge a signature for $P_{j^*}$.

In particular, a PPT $\mathcal{B}$ is constructed to break the unforgeability of the signature scheme as follows. $\mathcal{B}$ first gets a verification key vkey from the challenger. Then $\mathcal{B}$ generates the simulated CRS simcrs and all the public and secret keys except (vkey$_{j^*}$, skey$_{j^*}$), and sets vkey$_{j^*}$:=vkey. $\mathcal{B}$ invokes $\mathcal{A}$ with simcrs, public keys (pk, $\{$vkey$_i\}_{i \in [n]}$), and secret keys ($sk_c$, $r_c$, skey$_c$). $\mathcal{B}$ follows the protocol as in $hyb_4$ except that when computing $\sigma_{j^*}$ in Round 1, it queries the challenger on message $([\![x_{j^*}]\!], \pi_{j^*})$ to obtain a signature $\sigma_{j^*}$.

Next in Round 2, $\mathcal{B}$ receives a valid tuple $([\![x_{j^*}]\!]', \pi_{j^*}', \sigma_{j^*}')$ from $\mathcal{A}$ where $[\![x_{j^*}]\!]' \neq [\![x_{j^*}]\!]$. $\mathcal{B}$ can then output the forged signature $\sigma_{j^*}'$ on message $([\![x_{j^*}]\!]', \pi_{j^*}')$.

By the unforgeability of the signature scheme, $[\![x_j]\!]$ is the same as what $P_j$ sends to $P_c$ in Round 1 for all $j \in [n-1] \setminus \{c\}$, hence $\{[\![x_j]\!]\}_{j \in [n-1] \setminus \{c\}}$ are correctly generated ciphertexts of $\{x_j\}_{j \in [n-1] \setminus \{c\}}$.

By the correctness of dTFHE, $\{x_j\}_{j \in [n-1] \setminus \{c\}}$ are computationally indistinguishable from $\{\tilde{x}_j\}_{j \in [n-1] \setminus \{c\}}$ computed in $hyb_3$. Thus Q's output in this hybrid is computationally indistinguishable from its output in $hyb_3$.

$hyb_5$: If the party $P_i$ picked in $hyb_4$ is an honest party, then $P_i$ must be the party with the smallest index that receives a valid tuple $([\![x_c]\!], \pi_c, \sigma_c)$ from $\mathcal{A}$ in Round 1. Decrypt $[\![x_c]\!]$ by dTFHE secret keys to obtain $\tilde{x}$ and output $f(x_1, \ldots, x_{c-1}, \tilde{x}, x_{c+1}, \ldots, x_{n-1})$.

This hybrid is identical to $hyb_4$ because an honest $P_i$ forwards $([\![x_c]\!], \pi_c, \sigma_c)$ to Q in Round 2.

$hyb_6$: If Q doesn't receive a valid tuple $(\{([\![x_j]\!], \pi_j, \sigma_j)\}_{j \in [n-1]}, [\![y]\!], [\![y: sk_i]\!], \pi_i^{dec})$ from any party $P_i$ in Round 2, then it outputs $f(x_1, \ldots, x_{c-1}, \tilde{x}, x_{c+1}, \ldots, x_{n-1})$ if $\mathcal{A}$ sends $\tilde{x}$ to Q in Round 2, or $f(x_1, \ldots, x_{c-1}, \bot, x_{c+1}, \ldots, x_{n-1})$ otherwise.

This hybrid is identical to $hyb_5$ because an honest party either sends a valid tuple in Round 2, or sends its input in the clear. If Q doesn't receive any valid tuple, then it must have received all the honest parties' inputs and will compute the output accordingly.

$hyb_7$: In Round 1, for each $i \in [n-1] \setminus \{c\}$, replace $[\![x_i]\!]$ sent to $\mathcal{A}$ by $[\![0_i]\!]$.

By the semantic security of dTFHE, $\mathcal{A}$ cannot distinguish between $hyb_6$ and $hyb_7$.

The last hybrid gives the output of Sim and Q in the ideal world.

Case 2: Q is corrupted. Sim directly receives an output y from the ideal functionality (recall that Q has no input). The strategy of Sim is described as follows:

For each $i \in [n-1]$, compute the following:

$[\![0_i]\!] \leftarrow$ dTFHE. Enc(pk, $0_i$).

$\pi_i \leftarrow$ NIZK. Sim. Prove(td, $st_i$) for $st_i \in L_1$ where $st_i = ([\![0_i]\!], pk)$.

$\sigma_i \leftarrow$ Sign(skey$_i$, $([\![0_i]\!], \pi_i)$).

Compute $[\![\tilde{y}]\!] \leftarrow$ dTFHE. Eval(pk, $f$, $[\![0_1]\!], \ldots, [\![0_{n-1}]\!]$).

Compute $[\![\tilde{y}: sk_i]\!]_{i \in [n-1]} \leftarrow$ dTFHE. Sim($f$, y, $[\![0_1]\!], \ldots, [\![0_{n-1}]\!], sk_n$).

For each $i \in [n-1]$, do the following:

Compute $\pi_i^{dec} \leftarrow$ NIZK. Sim. Prove(td, $st_i^{dec}$) for $st_i^{dec} \in L_2$ where $st_i^{dec} = ([\![y: sk_i]\!], [\![\tilde{y}]\!], pk_i, i)$.

Send $(\{([\![0_i]\!], \pi_j, \sigma_j)\}_{j \in [n-1]}, [\![\tilde{y}]\!], [\![\tilde{y}: sk_i]\!], \pi_i^{dec})$ to $\mathcal{A}$ on behalf of party $P_i$ in Round 2.

Finally, output whatever $\mathcal{A}$ outputs.

Hybrid argument. Now it is shown that $\mathcal{A}$'s output in the real world is computationally indistinguishable from Sim's output in the ideal world.

hyb$_0$: $\mathcal{A}$'s output in the real world.

hyb$_1$: First generate (simcrs, td)←NIZK. Sim. Setup($1^\lambda$) and give simcrs to $\mathcal{A}$ as the CRS. For each i∈[n−1], replace $\pi_i$ by a simulated NIZK argument NIZK. Sim. Prove(td, st$_i$) and $\pi_i^{dec}$ by NIZK. Sim. Prove(td, st$_i^{dec}$).

By the zero-knowledge property of NIZK, $\mathcal{A}$ cannot distinguish between hyb$_0$ and hyb$_1$.

hyb$_2$: Compute $\{[\![y\colon sk_i]\!]\}_{i\in[n-1]}$ by dTFHE. Sim($f$, y, $[\![x_1]\!], \ldots, [\![x_{n-1}]\!]$, sk$_n$).

By the simulation security of dTFHE, this hybrid is computationally indistinguishable from hyb$_1$.

hyb$_3$: Sim's output in the ideal world. The only difference between this hybrid and hyb$_2$ is that x$_i$ replaced by $[\![0_i]\!]$ for each i∈[n−1]. Because of the semantic security of dTFHE, hyb$_2$ and hyb$_3$ are computationally indistinguishable to $\mathcal{A}$.

IX. COMPUTER SYSTEM

Figure 15:
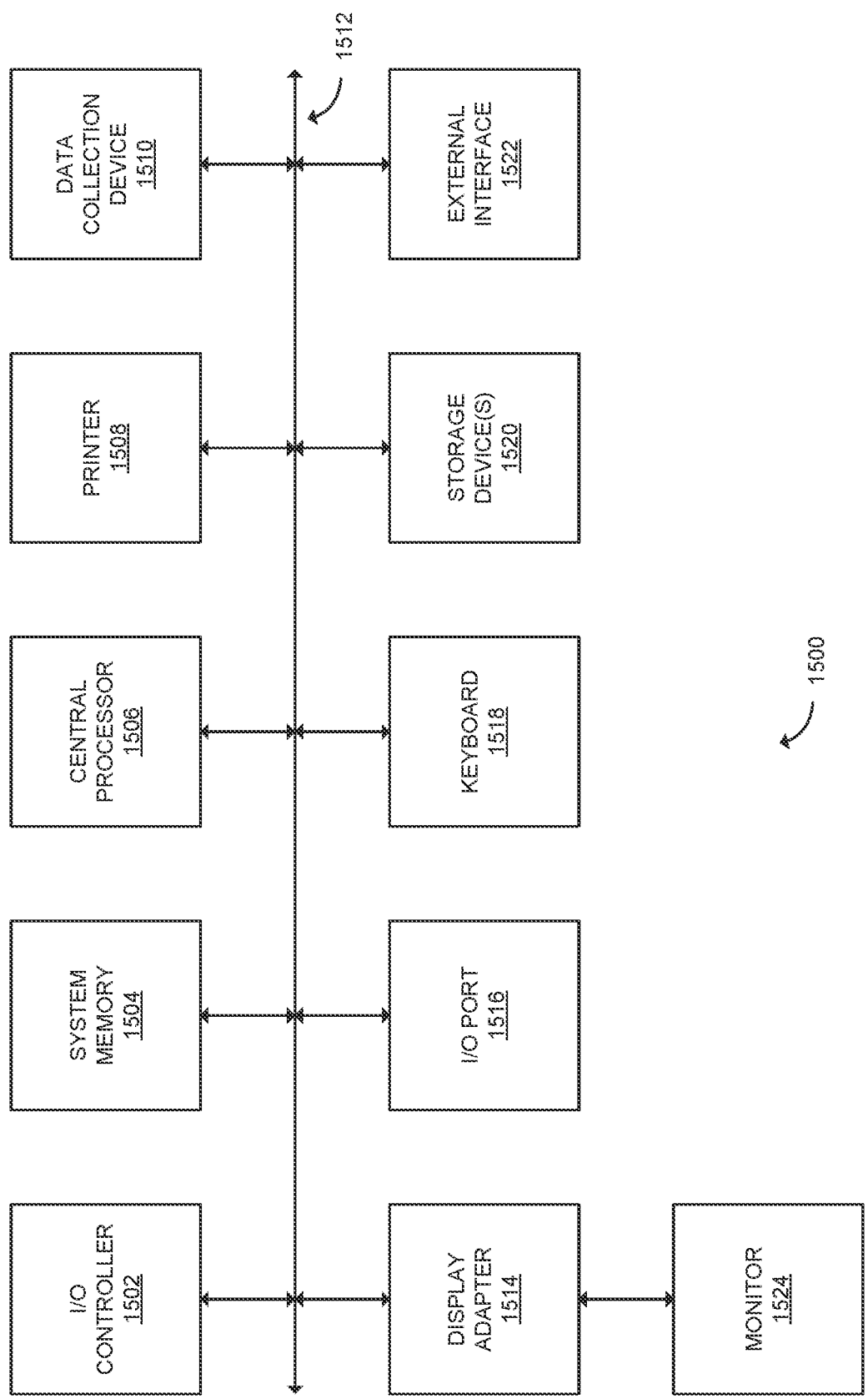
FIG. 15 shows an exemplary computer system according to some embodiments.

Any of the computer systems mentioned herein may utilize any suitable number of subsystems. Examples of such subsystems are shown in FIG. 15 in computer system 1500. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

The subsystems shown in FIG. 15 are interconnected via a system bus 1512. Additional subsystems such as a printer 1508, keyboard 1518, storage device(s) 1520, monitor 1524 (e.g., a display screen, such as an LED), which is coupled to display adapter 1514, and others are shown. Peripherals and input/output (I/O) devices, which couple to I/O controller 1502, can be connected to the computer system by any number of means known in the art such as input/output (I/O) port 1516 (e.g., USB, FireWire®). For example, I/O port 1516 or external interface 1522 (e.g. Ethernet, Wi-Fi, etc.) can be used to connect computer system 1500 to a wide area network such as the Internet, a mouse input device, or a scanner. The interconnection via system bus 1512 allows the central processor 1506 to communicate with each subsystem and to control the execution of a plurality of instructions from system memory 1504 or the storage device(s) 1520 (e.g., a fixed disk, such as a hard drive, or optical disk), as well as the exchange of information between subsystems. The system memory 1504 and/or the storage device(s) 1520 may embody a computer readable medium. Another subsystem is a data collection device 1510, such as a camera, microphone, accelerometer, and the like. Any of the data mentioned herein can be output from one component to another component and can be output to the user.

A computer system can include a plurality of the same components or subsystems, e.g., connected together by external interface 1522, by an internal interface, or via removable storage devices that can be connected and removed from one component to another component. In some embodiments, computer systems, subsystem, or apparatuses can communicate over a network. In such instances, one computer can be considered a client and another computer a server, where each can be part of a same computer system. A client and a server can each include multiple systems, subsystems, or components.

Any of the computer systems mentioned herein may utilize any suitable number of subsystems. In some embodiments, a computer system includes a single computer apparatus, where the subsystems can be components of the computer apparatus. In other embodiments, a computer system can include multiple computer apparatuses, each being a subsystem, with internal components.

A computer system can include a plurality of the components or subsystems, e.g., connected together by external interface or by an internal interface. In some embodiments, computer systems, subsystems, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g., an application specific integrated circuit or field programmable gate array) and/or using computer software with a generally programmable processor in a modular or integrated manner. As used herein a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer or other suitable display for providing any of the results mentioned herein to a user.

Any of the methods described herein may be totally or partially performed with a computer system including one or more processors, which can be configured to perform the steps. Thus, embodiments can be involve computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The specific details of particular embodiments may be combined in any suitable manner without departing from the spirit and scope of embodiments of the invention. However, other embodiments of the invention may be involve specific embodiments relating to each individual aspect, or specific combinations of these individual aspects. The above description of exemplary embodiments of the invention has been presented for the purpose of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications and description mentioned herein are incorporated by reference in their entirety for all purposes. None is admitted to be prior art.

X. REFERENCES

[ACGJ18] Prabhanjan Ananth, Arka Rai Choudhuri, Aarushi Goel, and Abhishek Jain. Round-optimal secure multi-party computation with honest majority. In *Advances in Cryptology—CRYPTO 2018—38th Annual International Cryptology Conference*, Santa Barbara, CA, USA, Aug. 19-23, 2018, *Proceedings, Part II*, pages 395-424, 2018.

[ACJ17] Prabhanjan Ananth, Arka Rai Choudhuri, and Abhishek Jain. A new approach to round-optimal secure multiparty computation. In *Advances in Cryptology—CRYPTO 2017—37th Annual International Cryptology Conference*, Santa Barbara, CA, USA, Aug. 20-24, 2017, *Proceedings, Part I*, pages 468-499, 2017.

[AJL+12] Gilad Asharov, Abhishek Jain, Adriana López-Alt, Eran Tromer, Vinod Vaikun-tanathan, and Daniel Wichs. Multiparty computation with low communication, computation and interaction via threshold FHE. In David Pointcheval and Thomas Johansson, editors, *Advances in Cryptology—EUROCRYPT 2012—31st Annual International Conference on the Theory and Applications of Cryptographic Techniques*, Cambridge, UK, Apr. 15-19, 2012. *Proceedings, volume 7237 of Lecture Notes in Computer Science*, pages 483-501. Springer, 2012.

[AMPR14] Arash Afshar, Payman Mohassel, Benny Pinkas, and Ben Riva. Non-interactive secure computation based on cut-and-choose. In *Advances in Cryptology—EUROCRYPT 2014—33rd Annual International Conference on the Theory and Applications of Cryptographic Techniques*, Copenhagen, Denmark, May 11-15, 2014. *Proceedings*, pages 387-404, 2014.

[BGG+18] Dan Boneh, Rosario Gennaro, Steven Goldfeder, Aayush Jain, Sam Kim, Peter M. R. Rasmussen, and Amit Sahai. Threshold cryptosystems from threshold fully homomorphic encryption. In *Advances in Cryptology—CRYPTO 2018—38th Annual International Cryptology Conference*, Santa Barbara, CA, USA, Aug. 19-23, 2018, *Proceedings, Part I, volume 10991 of Lecture Notes in Computer Science*, pages 565-596. Springer, 2018.

[BGI+17] Saikrishna Badrinarayanan, Sanjam Garg, Yuval Ishai, Amit Sahai, and Akshay Wadia. Two-message witness indistinguishability and secure computation in the plain model from new assumptions. In *Advances in Cryptology—ASIACRYPT 2017—23rd International Conference on the Theory and Applications of Cryptology and Information Security*, Hong Kong, China, Dec. 3-7, 2017, *Proceedings, Part III*, pages 275-303, 2017.

[BGJ+17] Saikrishna Badrinarayanan, Vipul Goyal, Abhishek Jain, Dakshita Khurana, and Amit Sahai. Round optimal concurrent mpc via strong simulation. In TCC, 2017.

[BGJ+18] Saikrishna Badrinarayanan, Vipul Goyal, Abhishek Jain, Yael Tauman Kalai, Dakshita Khurana, and Amit Sahai. Promise zero knowledge and its applications to round optimal MPC. In *Advances in Cryptology—CRYPTO 2018—38th Annual International Cryptology Conference*, Santa Barbara, CA, USA, Aug. 19-23, 2018, *Proceedings, Part II*, pages 459-487, 2018.

[BHP17] Zvika Brakerski, Shai Halevi, and Antigoni Polychroniadou. Four round secure computation without setup. In *Theory of Cryptography—15th International Conference, TCC 2017*, Baltimore, MD, USA, Nov. 12-15, 2017, *Proceedings, Part I*, pages 645-677, 2017.

[BJMS18] Saikrishna Badrinarayanan, Aayush Jain, Nathan Manohar, and Amit Sahai. Threshold multi-key fhe and applications to round-optimal mpc. Cryptology ePrint Archive, Report 2018/580, 2018. https://eprint.iacr.org/2018/580.

[BMR90] Donald Beaver, Silvio Micali, and Phillip Rogaway. The round complexity of secure protocols (extended abstract). In STOC, pages 503-513, 1990.

[CCG+19] Arka Rai Choudhuri, Michele Ciampi, Vipul Goyal, Abhishek Jain, and Rafail Ostrovsky. Round optimal secure multiparty computation from minimal assumptions. Cryptology ePrint Archive, Report 2019/216, 2019. https://eprint.iacr.org/2019/216.

[CCH+19] Ran Canetti, Yilei Chen, Justin Holmgren, Alex Lombardi, Guy N. Rothblum, Ron D. Rothblum, and Daniel Wichs. Fiat-shamir: from practice to theory. In STOC, 2019.

[CGZ20] Ran Cohen, Juan A. Garay, and Vassilis Zikas. Broadcast-optimal two-round MPC. In Anne Canteaut and Yuval Ishai, editors, *Advances in Cryptology—EUROCRYPT 2020—39th Annual International Conference on the Theory and Applications of Cryptographic Techniques*, Zagreb, Croatia, May 10-14, 2020, *Proceedings, Part II, volume 12106 of Lecture Notes in Computer Science*, pages 828-858. Springer, 2020.

[CJS14] Ran Canetti, Abhishek Jain, and Alessandra Scafuro. Practical UC security with a global random oracle. In Proceedings of the 2014 ACM SIGSAC Conference on Computer and Communications Security, Scottsdale, AZ, USA, Nov. 3-7, 2014, pages 597-608, 2014.

[CL14] Ran Cohen and Yehuda Lindell. Fairness versus guaranteed output delivery in secure multiparty computation. In *Advances in Cryptology—ASIACRYPT 2014—20th International Conference on the Theory and Application of Cryptology and Information Security*, Kaoshiung, Taiwan, R.O.C., Dec. 7-11, 2014, *Proceedings, Part II*, pages 466-485, 2014.

[Cle86] Richard Cleve. Limits on the security of coin flips when half the processors are faulty (extended abstract). In *Proceedings of the 18th Annual ACM Symposium on Theory of Computing*, May 28-30, 1986, Berkeley, California, USA, pages 364-369, 1986.

[CMS89] Benny Chor, Michael Merritt, and David B. Shmoys. Simple constant-time consensus protocols in realistic failure models. *J. ACM*, 36(3):591-614, 1989.

[COSV17] Michele Ciampi, Rafail Ostrovsky, Siniscalchi, and Ivan Visconti. Round-optimal secure two-party computation from trapdoor permutations. In *TCC*, 2017.

[CPS20] T.-H. Hubert Chan, Rafael Pass, and Elaine Shi. Sublinear-round byzantine agreement under corrupt majority. In Aggelos Kiayias, Markulf Kohlweiss, Petros Wallden, and Vassilis Zikas, editors, *Public-Key Cryptography—PKC 2020—23rd IACR International Conference on Practice and Theory of Public-Key Cryptography*, Edinburgh, UK, May 4-7, 2020, *Proceedings, Part II*, volume 12111 *of Lecture Notes in Computer Science*, pages 246-265. Springer, 2020.

[DS83] Danny Dolev and H. Raymond Strong. Authenticated algorithms for byzantine agreement. *SIAM Journal on Computing*, 12(4):656-666, 1983.

[FGMO01] Matthias Fitzi, Juan A. Garay, Ueli M. Maurer, and Rafail Ostrovsky. Minimal complete primitives for secure multi-party computation. In Joe Kilian, editor, *Advances in Cryptology—CRYPTO 2001, 21st Annual International Cryptology Conference*, Santa Barbara, California, USA, Aug. 19-23, 2001, *Proceedings*, volume 2139 *of Lecture Notes in Computer Science*, pages 80-100. Springer, 2001.

[FL82] Michael J. Fischer and Nancy A. Lynch. A lower bound for the time to assure interactive consistency. *Inf. Process. Lett.*, 14(4):183-186, 1982.

[FLM86] Michael J. Fischer, Nancy A. Lynch, and Michael Merritt. Easy impossibility proofs for distributed consensus problems. *Distributed Comput.*, 1(1):26-39, 1986.

[FN09] Matthias Fitzi and Jesper Buus Nielsen. On the number of synchronous rounds sufficient for authenticated byzantine agreement. In Idit Keidar, editor, *Distributed Computing, 23rd International Symposium, DISC 2009*, Elche, Spain, Sep. 23-25, 2009. *Proceedings*, volume 5805 *of Lecture Notes in Computer Science*, pages 449-463. Springer, 2009.

[GGJ19] Sanjam Garg, Aarushi Goel, and Abhishek Jain. The broadcast message complexity of secure multiparty computation. In Steven D. Galbraith and Shiho Moriai, editors, Advances in Cryptology—ASIACRYPT 2019—25th International Conference on the *Theory and Application of Cryptology and Information Security*, Kobe, Japan, Dec. 8-12, 2019, *Proceedings, Part I*, volume 11921 *of Lecture Notes in Computer Science*, pages 426-455. Springer, 2019.

[GIKR01] Rosario Gennaro, Yuval Ishai, Eyal Kushilevitz, and Tal Rabin. The round complexity of verifiable secret sharing and secure multicast. In *Proceedings on 33rd Annual ACM Symposium on Theory of Computing*, Jul. 6-8, 2001, Heraklion, Crete, Greece, pages 580-589, 2001.

[GIKR02] Rosario Gennaro, Yuval Ishai, Eyal Kushilevitz, and Tal Rabin. On 2-round secure multiparty computation. In *Advances in Cryptology—CRYPTO 2002, 22nd Annual International Cryptology Conference*, Santa Barbara, California, USA, Aug. 18-22, 2002, *Proceedings*, pages 178-193, 2002.

[GL05] Shafi Goldwasser and Yehuda Lindell. Secure multiparty computation without agreement. *J. Cryptology*, 18(3):247-287, 2005.

[GLS15] S. Dov Gordon, Feng-Hao Liu, and Elaine Shi. Constant-round MPC with fairness and guarantee of output delivery. In *Advances in Cryptology—CRYPTO 2015-35th Annual Cryptology Conference*, Santa Barbara, CA, USA, Aug. 16-20, 2015, *Proceedings, Part II*, pages 63-82, 2015.

[GMPP16] Sanjam Garg, Pratyay Mukherjee, Omkant Pandey, and Antigoni Polychroniadou. The exact round complexity of secure computation. In *Advances in Cryptology—EURO-CRYPT 2016—35th Annual International Conference on the Theory and Applications of Cryptographic Techniques*, Vienna, Austria, May 8-12, 2016, *Proceedings, Part II*, pages 448-476, 2016.

[GMW87] Oded Goldreich, Silvio Micali, and Avi Wigderson. How to play any mental game or A completeness theorem for protocols with honest majority. In *Proceedings of the 19th Annual ACM Symposium on Theory of Computing*, 1987, New York, New York, USA, pages 218-229. ACM, 1987.

[Goy11] Vipul Goyal. Constant round non-malleable protocols using one way functions. In *STOC*, pages 695-704, 2011.

[HHPV18] Shai Halevi, Carmit Hazay, Antigoni Polychroniadou, and Muthuramakrishnan Venki-tasubramaniam. Round-optimal secure multi-party computation. In *Advances in Cryptology—CRYPTO 2018—38th Annual International Cryptology Conference*, Santa Barbara, CA, USA, Aug. 19-23, 2018, *Proceedings, Part II*, pages 488-520, 2018.

[HIK+19] Shai Halevi, Yuval Ishai, Eyal Kushilevitz, Nikolaos Makriyannis, and Tal Rabin. On fully secure MPC with solitary output. In *Theory of Cryptography—17th International Conference, TCC 2019*, Nuremberg, Germany, Dec. 1-5, 2019, *Proceedings, Part I*, volume 11891 *of Lecture Notes in Computer Science*, pages 312-340. Springer, 2019.

[HLP11] Shai Halevi, Yehuda Lindell, and Benny Pinkas. Secure computation on the web: Computing without simultaneous interaction. In *Advances in Cryptology—CRYPTO 2011—31st Annual Cryptology Conference*, Santa Barbara, CA, USA, Aug. 14-18, 2011. *Proceedings*, pages 132-150, 2011.

[IKKP15] Yuval Ishai, Ranjit Kumaresan, Eyal Kushilevitz, and Anat Paskin-Cherniavsky. Secure computation with minimal interaction, revisited. In *Advances in Cryptology—CRYPTO 2015—35th Annual Cryptology Conference*, Santa Barbara, CA, USA, Aug. 16-20, 2015, *Proceedings, Part II*, pages 359-378, 2015.

[IKO+11] Yuval Ishai, Eyal Kushilevitz, Rafail Ostrovsky, Manoj Prabhakaran, and Amit Sahai. Efficient non-interactive secure computation. In *EUROCRYPT*, 2011.

[IKP10] Yuval Ishai, Eyal Kushilevitz, and Anat Paskin. Secure multiparty computation with minimal interaction. In Tal Rabin, editor, *Advances in Cryptology—CRYPTO*

2010, 30*th Annual Cryptology Conference*, Santa Barbara, CA, USA, Aug. 15-19, 2010. Proceedings, volume 6223 of Lecture Notes in Computer Science, pages 577-594. Springer, 2010.

[KO04] Jonathan Katz and Rafail Ostrovsky. Round-optimal secure two-party computation. In *CRYPTO*, pages 335-354, 2004.

[KOS03] Jonathan Katz, Rafail Ostrovsky, and Adam D. Smith. Round efficiency of multi-party computation with a dishonest majority. In *EUROCRYPT*, pages 578-595, 2003.

[KY86] A. R. Karlin and A. C. Yao. Probabilistic lower bounds for byzantine agreement and clock synchronization. *Unpublished manuscript*, 1986.

[LSP82] Leslie Lamport, Robert E. Shostak, and Marshall C. Pease. The byzantine generals problem. *ACM Trans. Program. Lang. Syst.*, 4(3):382-401, 1982.

[MR17] Payman Mohassel and Mike Rosulek. Non-interactive secure 2pc in the offline/online and batch settings. In *Advances in Cryptology—EUROCRYPT 2017—36th Annual International Conference on the Theory and Applications of Cryptographic Techniques*, Paris, France, Apr. 30-May 4, 2017, *Proceedings, Part III*, pages 425-455, 2017.

[MW16] Pratyay Mukherjee and Daniel Wichs. Two round multiparty computation via multi-key FHE. In *Advances in Cryptology—EUROCRYPT 2016—35th Annual International Conference on the Theory and Applications of Cryptographic Techniques*, Vienna, Austria, May 8-12, 2016, *Proceedings, Part II*, pages 735-763, 2016.

[MZ13] Ueli Maurer and Vassilis Zikas. Information-theoretic secure multiparty computation. In Manoj Prabhakaran and Amit Sahai, editors, *Secure Multi-Party Computation*, volume 10 *of Cryptology and Information Security Series*, pages 168-200. IOS Press, 2013.

[PR18] Arpita Patra and Divya Ravi. On the exact round complexity of secure three-party computation. In *Advances in Cryptology—CRYPTO 2018—38th Annual International Cryptology Conference*, Santa Barbara, CA, USA, Aug. 19-23, 2018, *Proceedings, Part II*, pages 425-458, 2018.

[PS19] Chris Peikert and Sina Shiehian. Noninteractive zero knowledge for NP from (plain) learning with errors. 2019.

[PSL80] Marshall C. Pease, Robert E. Shostak, and Leslie Lamport. Reaching agreement in the presence of faults. J. ACM, 27(2):228-234, 1980.

[Wee10] Hoeteck Wee. Black-box, round-efficient secure computation via non-malleability amplification. In *FOCS*, pages 531-540, 2010.

[WXSD20] Jun Wan, Hanshen Xiao, Elaine Shi, and Srinivas Devadas. Expected constant round byzantine broadcast under dishonest majority. Cryptology ePrint Archive, Report 2020/590, 2020. https://eprint.iacr.org/2020/590.

[Yao86] Andrew Chi-Chih Yao. How to generate and exchange secrets (extended abstract). In *27th Annual Symposium on Foundations of Computer Science*, Toronto, Canada, 27-29 Oct. 1986, pages 162-167. IEEE Computer Society, 1986.

What is claimed is:

1. A computer-implemented method for secure multiparty computation performed by a receiving device comprising:
   transmitting a public key to a plurality of input devices;
   receiving a plurality of other public keys from the plurality of input devices;
   encrypting an input comprising a masking value using the public key and the plurality of other public keys to form an encrypted input;
   transmitting the encrypted input to the plurality of input devices;
   receiving a plurality of other encrypted inputs from the plurality of input devices, wherein the plurality of other encrypted inputs were formed by the plurality of input devices encrypting a plurality of input shares using the public key and the plurality of other public keys;
   forming an encrypted output using the encrypted input and the plurality of other encrypted inputs;
   decrypting the encrypted output with a secret key corresponding to the public key to form a partially decrypted output;
   receiving a plurality of other partially decrypted outputs from the plurality of input devices, wherein the plurality of other partially decrypted outputs were formed by the plurality of input devices computing the encrypted output, and decrypting the encrypted output with a plurality of other secret keys to form the plurality of other partially decrypted outputs, wherein the plurality of other secret keys correspond to the plurality of other public keys;
   combining the partially decrypted output and the plurality of other partially decrypted outputs to form a masked output; and
   unmasking the masked output with the masking value to form an output, wherein the receiving device comprises a hardware processor.

2. The computer-implemented method of claim 1, further comprising:
   broadcasting the partially decrypted output to the plurality of input devices.

3. The computer-implemented method of claim 1, wherein:
   transmitting the public key to the plurality of input devices comprises broadcasting the public key to the plurality of input devices; and
   transmitting the encrypted input to the plurality of input devices comprises broadcasting the encrypted input to the plurality of input devices.

4. The computer-implemented method of claim 1, wherein the input comprises an input share in addition to the masking value.

5. The computer-implemented method of claim 1, wherein the plurality of other public keys and the plurality of other secret keys were generated by the plurality of input devices, and wherein the computer-implemented method further comprises generating the public key and the secret key.

6. The computer-implemented method of claim 1, wherein the plurality of other public keys and the plurality of other secret keys are stored by the plurality of input devices, and wherein the computer-implemented method further comprises storing the public key, the secret key, and the masking value.

7. The computer-implemented method of claim 1, wherein the plurality of input devices each formed the encrypted output using the encrypted input and the plurality of other encrypted inputs using a garbled circuit, and wherein the step of forming the encrypted output using the encrypted input and the plurality of other encrypted inputs is performed using the garbled circuit.

8. The computer-implemented method of claim 1, wherein the masking value comprises a random number, and wherein the computer-implemented method further comprises generating the random number.

9. The computer-implemented method of claim 1, further comprising:
receiving a plurality of first non-interactive zero-knowledge proofs from the plurality of input devices, wherein the plurality of first non-interactive zero-knowledge proofs correspond to the plurality of other encrypted inputs, wherein each first non-interactive zero-knowledge proof of the plurality of first non-interactive zero-knowledge proofs proves that a corresponding other encrypted input of the plurality of other encrypted inputs was encrypted correctly; and
verifying the plurality of first non-interactive zero-knowledge proofs using a common reference string, thereby verifying that one or more input devices of the plurality of input devices correctly encrypted one or more corresponding other encrypted inputs of the plurality of other encrypted inputs.

10. The computer-implemented method of claim 9, further comprising:
generating a second non-interactive zero-knowledge proof based on the encrypted input, wherein the second non-interactive zero-knowledge proof proves that the encrypted input was encrypted correctly; and
transmitting the second non-interactive zero-knowledge proof to the plurality of input devices, wherein each input device of the plurality of input devices verifies that the encrypted input was encrypted correctly using the second non-interactive zero-knowledge proof and the common reference string.

11. The computer-implemented method of claim 1, further comprising:
generating a signature using the encrypted input and the secret key;
transmitting the signature to the plurality of input devices, wherein the plurality of input devices verify the encrypted input using the signature and the public key;
receiving a plurality of other signatures corresponding to the plurality of other encrypted inputs from the plurality of input devices, wherein the plurality of other signatures were formed by the plurality of input devices using the plurality of other encrypted inputs and the plurality of other secret keys; and
verifying the plurality of other encrypted inputs using the plurality of other signatures and the plurality of other public keys.

12. The computer-implemented method of claim 1, wherein the public key, the plurality of other public keys, the secret key, and the plurality of other secret keys comprise distributed threshold fully homomorphic encryption (dTFHE) cryptographic keys.

13. The computer-implemented method of claim 1, wherein the plurality of other encrypted inputs were formed by the plurality of input devices encrypting the plurality of input shares using a combined public key formed by combining the public key and the plurality of other public keys, and wherein encrypting the input using the public key and the plurality of other public keys comprises:
generating the combined public key by combining the public key and the plurality of other public keys; and
encrypting the input using the combined public key to form the encrypted input.

14. The computer-implemented method of claim 1, wherein the masked output comprises a sum of the output and the masking value, and wherein unmasking the masked output with the masking value comprises subtracting the masking value from the masked output to produce the output.

15. The computer-implemented method of claim 1, wherein the masked output comprises an exclusive-or (XOR) of the output and the masking value, and wherein unmasking the masked output with the masking value comprises forming the output by determining an exclusive-or of the masked output and the masking value.

16. The computer-implemented method of claim 1, wherein:
each input device of the plurality of input devices transmits a respective other public key of the plurality of other public keys to each other input device of the plurality of input devices; and
each input device of the plurality of input devices transmits a respective other encrypted input of the plurality of other encrypted inputs to each other input device of the plurality of input devices.

17. The computer-implemented method of claim 16, wherein:
each input device of the plurality of input devices transmits a respective other partially decrypted output of the plurality of other partially decrypted outputs to each other input device of the plurality of input devices.

18. A receiving device comprising:
a processor; and
a non-transitory computer readable medium coupled to the processor, the non-transitory computer readable medium comprising code or instructions, executable by the processor for performing:
transmitting a public key to a plurality of input devices;
receiving a plurality of other public keys from the plurality of input devices;
encrypting an input comprising a masking value using the public key and the plurality of other public keys to form an encrypted input;
transmitting the encrypted input to the plurality of input devices;
receiving a plurality of other encrypted inputs from the plurality of input devices, wherein the plurality of other encrypted inputs were formed by the plurality of input devices encrypting a plurality of input shares using the public key and the plurality of other public keys;
forming an encrypted output using the encrypted input and the plurality of other encrypted inputs;
decrypting the encrypted output with a secret key corresponding to the public key to form a partially decrypted output;
receiving a plurality of other partially decrypted outputs from the plurality of input devices, wherein the plurality of other partially decrypted outputs were formed by the plurality of input devices computing the encrypted output, and decrypting the encrypted output with a plurality of other secret keys to form the plurality of other partially decrypted outputs, wherein the plurality of other secret keys correspond to the plurality of other public keys;
combining the partially decrypted output and the plurality of other partially decrypted outputs to form a masked output; and
unmasking the masked output with the masking value to form an output.

19. A computer-implemented method for secure multi-party computation performed by an input device comprising:
transmitting a public key to a plurality of other devices, including one or more other input devices and a receiving device;
receiving a plurality of other public keys from the plurality of other devices;

encrypting an input share using the public key and the plurality of other public keys to form an encrypted input;

transmitting the encrypted input to the plurality of other devices;

receiving one or more other encrypted inputs from the one or more other input devices, wherein the one or more other encrypted inputs were formed by the one or more other input devices encrypting a plurality of other input shares using the public key and the plurality of other public keys;

receiving a receiving encrypted input from the receiving device, wherein the receiving encrypted input comprises a random number encrypted using the public key and the plurality of other public keys;

forming an encrypted output using the encrypted input, the one or more other encrypted inputs, and the receiving encrypted input;

decrypting the encrypted output using a secret key corresponding to the public key to form a partially decrypted output; and transmitting the partially decrypted output to the receiving device, wherein the input device comprises a hardware processor.

20. The computer-implemented method of claim 19, wherein encrypting the input share using the public key and the plurality of other public keys to form the encrypted input comprises:

generating a combined public key by combining the public key and the plurality of other public keys; and encrypting the input share using the combined public key.

* * * * *